(12) United States Patent
Sakamoto et al.

(10) Patent No.: US 7,787,193 B2
(45) Date of Patent: Aug. 31, 2010

(54) IMAGING DEVICE AND CAMERA

(75) Inventors: Keiji Sakamoto, Osaka (JP); Takayuki Hayashi, Kyoto (JP); Eiichi Nagaoka, Hyogo (JP); Kenichi Hayashi, Nara (JP); Daisuke Ito, Osaka (JP); Akio Konishi, Hyogo (JP); Keishi Iwasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 47 days.

(21) Appl. No.: 12/092,505

(22) PCT Filed: Nov. 2, 2006

(86) PCT No.: PCT/JP2006/321979

§ 371 (c)(1),
(2), (4) Date: May 2, 2008

(87) PCT Pub. No.: WO2007/052751

PCT Pub. Date: May 10, 2007

(65) Prior Publication Data

US 2009/0122421 A1    May 14, 2009

(30) Foreign Application Priority Data

Nov. 4, 2005   (JP) .............................. 2005-321090
Feb. 13, 2006  (JP) .............................. 2006-034945

(51) Int. Cl.
*G02B 15/14* (2006.01)
*G03B 15/00* (2006.01)

(52) U.S. Cl. ...................... 359/696; 359/694; 359/699; 359/700; 359/704; 359/726; 359/738; 396/351; 396/379; 348/335; 348/341; 348/374; 348/345

(58) Field of Classification Search ......... 359/694–704, 359/352, 634, 726, 733; 396/55, 72, 73, 396/84, 85, 79, 96, 351, 379, 386, 448; 348/208.5, 348/333.09, 335, 340, 341, 360; 369/112.23, 369/112.24

See application file for complete search history.

(56) References Cited

U.S. PATENT DOCUMENTS 4,114,171 A * 9/1978 Altman ....................... 396/351

(Continued)

FOREIGN PATENT DOCUMENTS

JP           11-258678           9/1999

*Primary Examiner*—Loha Ben
(74) *Attorney, Agent, or Firm*—McDermott Will & Emery LLP

(57) ABSTRACT

The present invention aims to provide an imaging device and a camera realizing simultaneously a high magnification zoom lens system and the miniaturization of the device. The imaging device (2) includes a first lens group (G1), a second group frame unit (42), a first group frame unit (41), a motor unit (32), a third lens group (G3), and a CCD unit (33). The first lens group (G1) takes in a light flux incident along a first optical axis (A1). The second group frame unit (42) bends the light flux incident along the first optical axis (A1) to a direction along a second optical axis (A2). The first group frame unit (41) retains the first lens group (G1), and moves the first lens group (G1) in the direction along the first optical axis (A1). The motor unit (32) drives the first group frame unit (41). The first group frame unit (41) includes a driving frame (51) movable in the direction along the first optical axis (A1), and a first group frame retaining the first lens group (G1) and able to move in the direction along the first optical axis (A1) with respect to the driving frame (51).

18 Claims, 37 Drawing Sheets

U.S. PATENT DOCUMENTS

| | | | |
|---|---|---|---|
| 5,822,626 A * | 10/1998 | Kosako | 396/84 |
| 6,829,011 B1 * | 12/2004 | Higuchi et al. | 348/340 |
| 6,934,095 B2 | 8/2005 | Mihara | |
| 7,123,423 B2 * | 10/2006 | Takahashi et al. | 359/698 |
| 7,248,419 B2 * | 7/2007 | Takahashi et al. | 359/698 |
| 7,321,470 B2 * | 1/2008 | Matsumoto et al. | 359/694 |
| 7,333,270 B1 * | 2/2008 | Pochapsky et al. | 359/634 |
| 7,369,333 B2 * | 5/2008 | Chigasaki et al. | 359/819 |
| 7,391,460 B2 * | 6/2008 | Abe et al. | 348/341 |
| 7,426,085 B2 * | 9/2008 | Yoshitsugu et al. | 359/819 |
| 7,483,219 B2 * | 1/2009 | Hayashi et al. | 359/697 |
| 2009/0116123 A1 * | 5/2009 | Hashi et al. | 359/704 |
| 2009/0195890 A1 * | 8/2009 | Miyamoto | 359/700 |

FOREIGN PATENT DOCUMENTS

| | | |
|---|---|---|
| JP | 2001-242507 | 9/2001 |
| JP | 2003-169236 | 6/2003 |
| JP | 2004-102089 | 4/2004 |
| JP | 2004-240420 | 8/2004 |
| WO | WO 2007/013523 A1 | 2/2007 |

* cited by examiner

IMAGING DEVICE AND CAMERA

FIELD OF THE INVENTION

The present invention relates to an imaging device and a camera. In particular, the present invention relates to an imaging device and a camera having a bending optical system.

BACKGROUND ART

Digital cameras which make use of image sensors such as a CCD (Charge Coupled Device) or CMOS (Complementary Metal Oxide Semiconductor) sensor to convert an optical image into an electrical signal, and to record by digitizing the electrical signal, have become very popular in recent years. In this kind of digital camera, there is a need not only for increasing the number of pixels of the CCD or CMOS sensor, but also for improving the performance of the lens barrel which forms the optical image on these image sensors. More specifically, there is a need for a lens barrel equipped with a higher power zoom lens system.

On the other hand, in the field of the digital camera, there is a need for a smaller size body in order to improve portability. To this end, there is a need for reduced size in an image pickup apparatus equipped with a lens barrel and image sensors, which is believed to contribute greatly to reducing the size of the housing. In these efforts to reduce the size of an image pickup apparatus, what is known as a bending optical system has been proposed, in which the apparatus is reduced in size by bending the zoom lens system at some point along the optical path, without changing the optical length.

For example, Patent Document 1 discloses a bending optical system in which the light path is bent using a reflecting mirror. More specifically, the lens barrel disclosed in Patent Document 1 includes, in order from the side of the object, a first lens group and a second lens group, on the side of the reflecting mirror facing the object, and in order from the side of the reflecting mirror, a third lens group and a fourth lens group, on the side of the reflecting mirror facing the image sensor. The first lens group is fixed. The second lens group and the third lens group are movable in the optical axis direction, and make up the zoom lens system in cooperation with each other. The fourth lens group is used for adjusting the focus.

In addition, Patent Document 2 discloses a bending optical system in which the light path is bent using a prism. More specifically, the lens barrel disclosed in Patent Document 2 includes a lens group on the side of the object with respect to the prism. The lens group is movable in the optical axis direction between the in-use position and the retracted position. Furthermore, the prism is movable so that the space in which the lens group is accommodated is secured when the lens group is located at the retracted position.

Furthermore, in Patent Document 3, the configuration of a lens group used in a bending optical system is disclosed.

Patent Document 1: Japan Patent Laid-Open Publication No. H11-258678
Patent Document 2: Japan Patent Laid-Open Publication No. 2003-169236
Patent Document 3: Japan Patent Laid-Open Publication No. 2004-102089

DISCLOSURE OF THE INVENTION

However, with a raising demand for simultaneously realizing, a high power zoom lens system and miniaturization of the device, further improvement is required.

More specifically, with the configuration disclosed in Patent Documents 1 and 2, it is difficult to configure a high magnification zoom lens system while realizing miniaturization of the device. Furthermore, even by the lens configuration disclosed in Patent Document 3 is adopted, there is a problem of the specific device configuration being unclear since a configuration to miniaturize the device.

It is an object of the present invention to provide an imaging device and a camera simultaneously realizing a high magnification zoom lens system and the miniaturization of the device.

The imaging device according to a first aspect of the present invention includes a first lens group, a bending unit, a first movement mechanism, a driving unit, a second lens group, and an imaging unit. The first lens group takes in a light flux incident along a first optical axis. The bending unit bends the light flux incident along the first optical axis to a direction along a second optical axis intersecting with the first optical axis. The first movement mechanism retains the first lens group, and relatively moves the first lens group and the bending unit in the direction along the first optical axis. The driving unit drives the first movement mechanism. The second lens group takes in the light flux bent by the bending unit. The imaging unit receives the light flux passing through the second lens group. The first movement mechanism includes a first movement body relatively movable in the direction along the first optical axis with respect to the bending unit, and a second movement body retaining the first lens group and relatively movable in the direction along the first optical axis with respect to the first movement body.

Here, the phrase "along the first optical axis" means, for example, being parallel to the first optical axis. In addition, the phrase "along the second optical axis" means, for example, being parallel to the second optical axis. The bending unit, for example, includes a member having a reflecting surface, and more specifically, may include a prism, a mirror or the like. The driving unit may include, for example, a motor to generate a driving force, and a driving force transmitting unit such as a driving gear transmitting the generated driving force to the first movement mechanism. The imaging unit may be, for example, a CCD or CMOS receiving light electrically, but is not limited thereto, and may be a film or the like.

With the imaging device of the present invention, the relative positions between the first lens group and the bending unit change by the first movement mechanism. In other words, via the first movement mechanism, the relative positions along the optical path between the first lens group and the imaging unit change. Furthermore, the first movement mechanism includes a first movement body and a second movement body. The relative position of the first movement body with respect to the bending unit is variable in the direction along the first optical axis. The second movement body retains the first lens group, and the relative position thereof with respect to the first movement body is variable in the direction along the first optical axis. In other words, the relative position of the first lens group with respect to the bending unit is variable in the direction along the first optical axis, by the first movement body and the second movement body. Consequently, the relative position of the first lens group with respect to the imaging unit is variable along the optical path, by the first movement body and the second movement body.

With the imaging device of the present invention, the relative position of the first lens group with respect to the imaging unit is variable along the optical path, by the first movement body and the second movement body. In other words, since the relative position of the first lens group with respect to the imaging unit can be changed by the multistage of the first movement body and the second movement body, it is possible to make the length of the optical path from the first lens group to the imaging unit longer. Therefore, it is possible to configure a high magnification zoom lens system.

Furthermore, with the imaging device of the present invention, a bending optical system is adopted. Therefore, compared to a device not adopting the bending optical system, it is possible to configure an optical system with the same optical path length to be more compact. In addition, with the imaging device of the present invention, the length of the optical path is changed by the multistage of the first movement body and the second movement body. Therefore, compared to the case in which the length of the optical path is not changed by the multistage, it is possible to configure an optical system with the same optical path length to be more compact.

The imaging device according to a second aspect of the present invention is the imaging device of the first aspect, wherein the first lens group and the second lens group include at least a portion of a zoom lens system with variable imaging magnification in the imaging unit by changing the relative positions of the first lens group and the second lens group with respect to the imaging unit on the pathway of the light flux.

In the imaging device of the present invention, the first lens group moves in the direction along the first optical axis, and the second lens group moves in the direction along the second optical axis. By doing so, the relative positions of the first lens group and the second lens group with respect to the imaging unit are changed on the optical path.

According to the imaging device of the present invention, it is possible to configure a zoom lens system to be optically more sophisticated, while configuring a high magnification zoom lens system.

The imaging device according to a third aspect of the present invention is the imaging device of the first or the second aspect, wherein the first movement body relatively moves with respect to the bending unit in the direction along the first optical axis by being driven to rotate around the first optical axis by the driving unit as well as relatively moving the second movement body with respect to the first movement body in the direction along the first optical axis.

With the imaging device of the present invention, the driving unit drives the first movement body to rotate. By being driven to rotate, the first movement body relatively moves with respect to the bending unit in the direction along the first optical axis. In addition, as the first movement body is driven to rotate, the second movement body receives the driving force, and relatively moves with respect to the first movement body in the direction along the first optical axis.

With the imaging device of the present invention, the driving force generated in the driving unit is transmitted to the second movement body via the first movement body. Therefore, it is possible to move the first movement body and the second movement body relatively with respect to the bending unit in the direction along the first optical axis without providing a special device for driving the second movement body. In other words, it is possible to configure the imaging device more simply.

The imaging device according to a fourth aspect of the present invention is the imaging device of any one of the first to third aspects, wherein the first movement mechanism is substantially fixed to the bending unit, and further includes a fixing member supporting the first movement body and the second movement body to be movable in the direction along the first optical axis.

With the imaging device of the present invention, the first movement body and the second movement body are supported by the fixing member. The fixing member is substantially fixed to the bending unit. Here, the phrase "the fixing member being substantially fixed to the bending unit" means that the fixing member is directly fixed to the bending unit, or indirectly fixed via another member, for example.

The fixing member supporting the first movement body and the second movement body is substantially fixed to the bending unit. Therefore, the first movement body and the second movement body can be located with respect to the bending unit with a high degree of accuracy. In other words, the first lens group can be located with respect to the bending unit with a high degree of accuracy, and it becomes possible to configure a zoom lens system to be optically more sophisticated.

The imaging device according to a fifth aspect of the present invention is the imaging device of the fourth aspect, wherein a first cam groove and a straight-movement groove extending in the direction along the first optical axis are formed on the inner surface of the fixing member. A first engagement portion engaging with the first cam groove is formed on the outer surface of the first movement body, and a second cam groove is formed on the inner surface of the first movement body. A second engagement portion engaging with the second cam groove, and a third engagement portion engaging with the straight-movement groove are formed on the outer surface of the second movement body.

With the imaging device of the present invention, the first movement body is disposed inside the fixing member, and the second movement body is disposed inside the first movement body. The first movement body is movable in the direction along the first optical axis, while the first engagement portion engages with the first cam groove of the fixing member. The second movement body is movable in the direction along the first optical axis by engaging the second engagement portion with the second cam groove of the first movement body, and further by engaging the third engagement portion engages with the straight-movement groove of the fixing member.

With the imaging device of the present invention, the third engagement portion of the second movement body engages with the straight-movement groove of the fixing member, thereby preventing the second movement body from rotating around the first optical axis. Therefore, in the imaging device of the present invention, it is not necessary to provide a straight-movement frame for making the second movement body to move straight. Consequently, it is possible to configure the device more simply, and it becomes possible to realize the miniaturization of the device.

The imaging device according to a sixth aspect of the present invention is the imaging device of the fourth aspect, wherein a portion of the outer surface of the fixing member on the side of the second lens group is cut out not to interfere with a movement portion integrally movable in the direction along the second optical axis with the second lens group.

Here, the movement portion is a member such as a retaining frame retaining the second lens group, or an exposure-adjustment mechanism moving integrally with the retaining frame, for example.

With the imaging device of the present invention, the outer surface of the fixing member is cut out not to interfere with the movement portion. When a cutout is not formed, for example, it is necessary to provide the fixing member and the movement portion in a way which the positions of the fixing member and the movement portion do not overlap in the direction along the first optical axis, or to arrange the fixing member and the movement portion in a way which the positions of the fixing member and the movement portion do not overlap in the direction perpendicular to the first optical axis. Therefore, it is difficult to sufficiently reduce the size of the imaging device in the direction along the first optical axis, or the size thereof in the direction perpendicular to the first optical axis. On the other hand, when a cutout is provided like the present invention, it is possible to solve this kind of problem, and it becomes possible to realize the miniaturization of the imaging device.

The imaging device according to a seventh aspect of the present invention is the imaging device of any one of the first to the sixth aspects, further including a second movement mechanism retaining the second lens group, and for relatively moving the second lens group and the bending unit in the direction along the second optical axis. The first movement mechanism and the second movement mechanism are functionally coupled via the driving unit.

With the imaging device of the present invention, the first movement mechanism and the second movement mechanism are functionally coupled via the driving unit. For example, the driving unit to drive the first movement mechanism also drives the second movement mechanism. Consequently, it is not necessary to provide a separate driving unit for operating each of the first movement mechanism and the second movement mechanism, and it is possible to configure the imaging device more simply, and the imaging device can be miniaturized. Further in addition to the above aspects, since the first movement mechanism and the second movement mechanism are functionally coupled via the driving unit, compared to the case where a separate driving unit are provided, it is possible to more easily move the first movement mechanism and the second movement mechanism in concert with each other. And further in addition to the above aspects, since it is not necessary to provide the separate driving unit, it is possible to realize a more silent device.

The imaging device according to an eighth aspect of the present invention is the imaging device of the seventh aspect, wherein the second movement mechanism includes a conversion mechanism for converting the drive transmitted from the driving unit to a drive in the direction along the second optical axis, and a third movement body retaining the second lens group, as well as being functionally coupled to the conversion mechanism and able to move in the direction along the second optical axis.

The conversion mechanism is, for example, a mechanism which converts the rotational drive from the driving unit to a translational movement in the direction along the second optical axis, or the like.

The imaging device of the present invention includes the conversion mechanism, and it becomes possible to convert the drive from the driving unit to the direction along the second optical axis. Thus, it becomes possible to drive the first movement mechanism which moves the first lens group in the direction along the first optical axis, and the second movement mechanism which moves the second lens group in the direction along the second optical axis which is different from the first optical axis with the same driving unit. Therefore, it is possible to configure the imaging device more simply.

The imaging device according to a ninth aspect of the present invention is the imaging device of the eighth aspect, wherein the second movement mechanism further includes an elastic coupling mechanism elastically coupling the conversion mechanism and the third movement body. When the third movement body is located in proximity to a first end of the movable range along the second optical axis, the elastic coupling mechanism elastically presses the third movement body towards the first end.

The elastic coupling mechanism presses the third movement body located in proximity to the first end in the movable range towards the first end. Therefore, it is possible to prevent the third movement body located in proximity to the first end from moving to a second end, and to suppress shaking of the third movement body in the direction along the second optical axis, as well as the positioning of the third movement body to be done in high precision. In addition, since it is possible to suppress the shaking of the third movement body, it is possible to prevent components of the device from being damaged.

The imaging device according to a tenth aspect of the present invention is the imaging device of the ninth aspect, wherein when the third movement body is located in proximity to the second end of the movable range along the second optical axis, the elastic coupling mechanism elastically presses the third movement body towards this other end.

The elastic coupling mechanism presses the third movement body located in proximity to the first end within the movable range towards this first end, and presses the third movement body located in proximity to the second end within the movable range towards this other end. Therefore, it is possible to prevent the third movement body located in proximity to the first end from moving to the second end, and prevent the third movement body located in proximity to the second end from moving to this first end. As a result, shaking of the third movement body in the direction along the second optical axis is suppressed, and it is possible to be located the third movement body with a high degree of accuracy. In addition, since the shaking of the third movement body can be suppressed, it is possible to prevent the components of the device from being damaged.

The imaging device according to an eleventh aspect of the present invention is the imaging device of the ninth aspect, wherein when the third movement body is located at the first end, the first lens group is located at a position nearest to the bending unit in the movable range along the first optical axis.

With the imaging device of the present invention, when the third movement body is located at the first end, the length of the optical path becomes shortest from the first lens group to the imaging unit, and the zoom lens system is located on the wide angle side. Therefore, in the imaging device of the present invention, it is possible for the positioning of the third movement body when the zoom lens system is located on the wide angle side to be done in high precision. In addition, when the first lens group is located in a position nearest to the bending unit in a state where the imaging device is not being used, it is possible to prevent the third movement body from shaking in this unused state, and at the time of carrying in this unused state or the like, it is possible to prevent the components of the device from being damaged.

The imaging device according to a twelfth aspect of the present invention is the imaging device of the ninth aspect, wherein when the third movement body is located on the first end side, the first lens group is located at a position farthest from the bending unit within the movable range along the first optical axis.

With the imaging device of the present invention, when the third movement body is located at the first end, the length of the optical path becomes the longest from the first lens group to the imaging unit, and the zoom lens system is located on the telephoto side. Therefore, in the imaging device of the present invention, it is possible for the positioning of the third movement body when the zoom lens system is located on the telephoto side to be done in high precision.

The imaging device according to a thirteenth aspect of the present invention is the imaging device of the eighth aspect, further including an elastic member disposed between the third movement body and either the bending unit or the imaging unit, and biases the third movement body in the second optical axis direction with respect to the bending unit or the imaging unit.

The elastic member biases the third movement body in the direction of the second optical axis. Therefore, the shaking of the third movement body in the direction along the second optical axis is suppressed, and it is possible for the positioning of the third movement body to be done in high precision. In addition, since the shaking of the third movement body can be suppressed, it is possible to prevent the components of the device from being damaged.

The imaging device according to a fourteenth aspect of the present invention is the imaging device of any one of the first to thirteenth aspects, further including a guiding unit substantially fixed to the bending unit, and guides the second lens group in the direction along the second optical axis.

The guiding unit is, for example, a pole or a groove or the like for guiding the second lens group.

With the imaging device of the present invention, the second lens group is guided to the direction along the second optical axis by the guiding unit. The guiding unit is substantially fixed to the bending unit. Here, the phrase "the guiding unit is substantially fixed to the bending unit" encompasses, for example, a case in which the guiding unit is directly fixed to the bending unit, or a case in which indirectly fixed via another member.

The guiding unit guiding the second lens group in the direction along the second optical axis is substantially fixed to the bending unit. Therefore, it is possible to be positioned the second lens group with respect to the bending unit with a high degree of accuracy. In other words, it is possible to configure a zoom lens system to be optically more sophisticated.

The imaging device according to a fifteenth aspect of the present invention is the imaging device of any one of the first to fourteenth aspects, wherein at least a portion of the driving unit is disposed in a space formed across a bending surface included in the bending unit and bending the light flux incident along the first optical axis to a direction along the second optical axis from the second lens group.

With the imaging device of the present invention, at least a portion of the driving unit, for example, a motor or the like included in the driving unit is disposed in a space across the bending surface from the second lens group. This allows utilization efficiency of the space to improve, and it is possible to miniaturize the imaging device.

The imaging device according to a sixteenth aspect of the present invention is the imaging device of any one of the first to the fifteenth aspects, further including an exposure-adjustment mechanism disposed between the bending unit and the second lens group to be movable integrally with the second lens group, and for performing shutter operation. On the main body of the exposure-adjustment mechanism, two protruding portions separated in the direction along an perpendicular axis which is perpendicular to the first optical axis and the second optical axis and protruding out toward the bending unit are formed. One portion of the bending unit fits in between the two protruding portions when the main body of the exposure-adjustment mechanism is located at a position nearest to the bending unit.

With the imaging device of the present invention, a portion of the bending unit is formed to fit in between the two protruding portions when the main body of the exposure-adjustment mechanism is located at a position nearest to the bending unit. Therefore, it is possible to miniaturize the imaging device. In particular, in the sizes of the imaging device, the sizes in the direction along the second optical axis in which the exposure-adjustment mechanism is movable can be reduced.

The imaging device according to a seventeenth aspect of the present invention is the imaging device of any one of the first to the sixteenth aspects, wherein the bending unit includes a bending member, a third lens group, a retaining member, and an opening member. The bending member includes a bending surface to bend the light flux incident along the first optical axis to a direction along the second optical axis. The third lens group is made up of at least one piece of lens disposed on the second optical axis. The retaining member retains the reflecting member and the lens. The opening member is a member with which an opening disposed on the second optical axis is provided, and is fixed to the retaining member to support the third lens group toward the bending member.

Here, examples of the bending member include a reflecting mirror and a prism.

With the imaging device of the present invention, the opening member has an opening on the second optical axis whose periphery portion prevents unwanted light to be transmitted to the side of the imaging unit. Furthermore, the opening member is fixed to the retaining member to support the third lens group to face the bending member. This allows the third lens group to be fixed by the opening member without providing a special member for fixing the third lens group. Consequently, it is possible to reduce constructional members of the imaging device and to reduce the cost.

The camera according to an eighteenth aspect of the present invention includes the imaging device of any one of the first to the seventeenth aspects, a visual unit for making an image to be captured by the imaging device visible, a control unit for controlling the imaging device, and a chassis accommodating the imaging device.

Since the camera of the present invention includes the imaging device of any one of the first to the sixteenth aspects, the same effects as the first to the sixteenth aspects can be provided. It becomes possible to provide a camera which simultaneously realizes a high magnification zoom lens system and the miniaturization of the device.

DESCRIPTION OF REFERENCE NUMERALS

Figure 1:
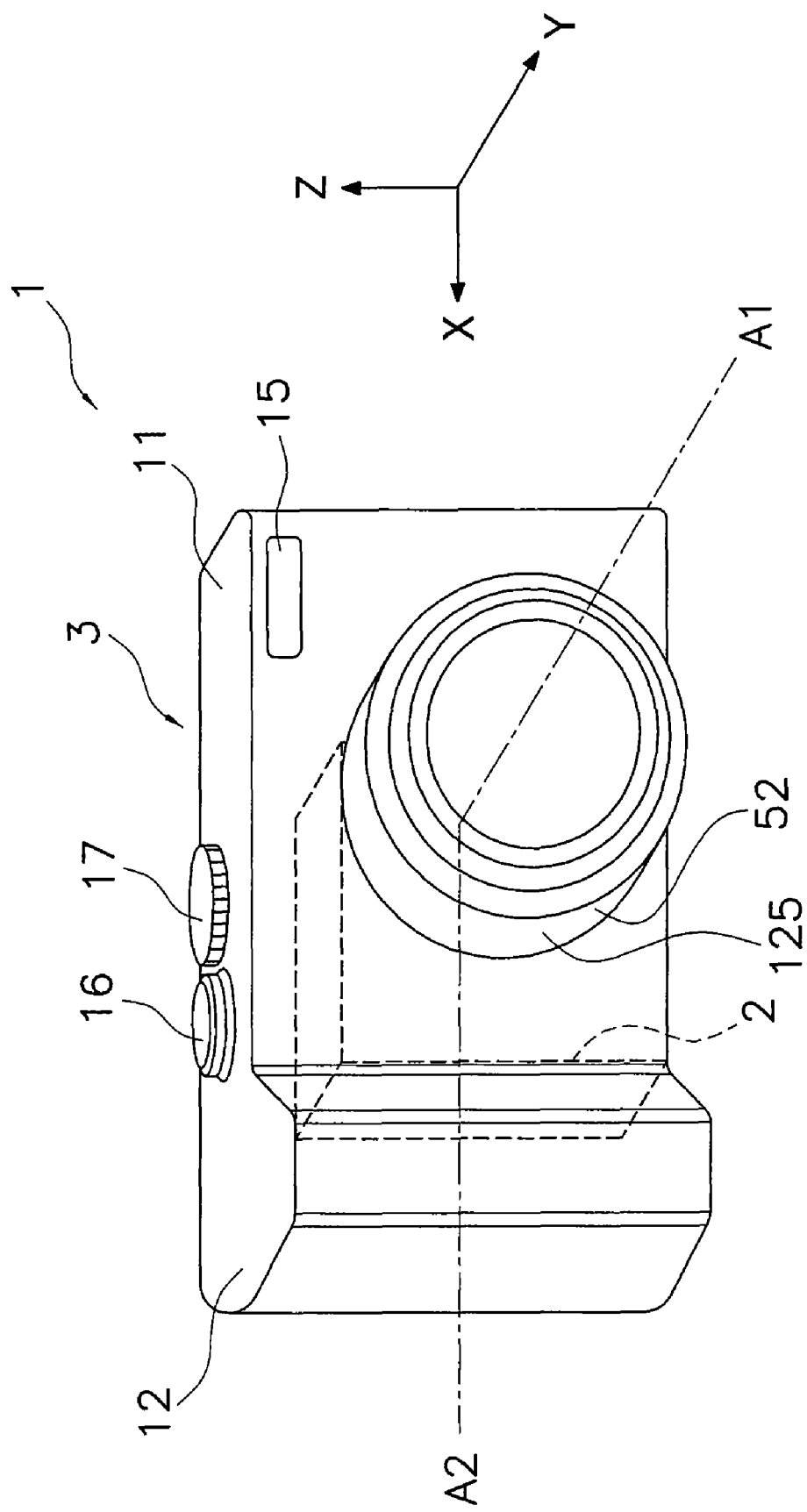
FIG. 1 is a perspective view showing the outside of a digital camera.

1 Digital camera
2 Imaging device
11 Outer case
18 Image display unit
31 Lens barrel
32 CCD unit
41 First group frame unit
42 Second group frame unit
G1 First lens group
G3 Third lens group
A1 First optical axis
A2 Second optical axis

BEST MODE FOR CARRYING OUT THE INVENTION

1: Brief Summary

An embodiment of the present invention will be described with reference to FIGS. 1 through 30.

The digital camera of the present invention includes the bending optical system in the optical system, and is configured so that lens barrel can be extended in multistage to the side of the object. This allows the high magnification zoom lens system and the miniaturization of the device to be simultaneously realized.

2: Digital Camera

The digital camera in a first embodiment of the present invention will be described with reference to FIGS. 1 to 3.

2.1: Configuration of the Digital Camera

FIG. 1 is a perspective view showing the exterior outside of a digital camera 1 in the first embodiment of the present invention.

The digital camera 1 includes an imaging device 2 and a main body 3. The imaging device 2 has a bending optical system bending the light flux incident along the first optical axis A1 to a direction along a second optical axis A2 perpendicular to the first optical axis A1 and leading the light flux to an image sensor. The main body 3 accommodates the imaging device 2, and performs control or the like on the imaging device 2.

First, before describing detailed configuration of the imaging device 2, the configuration of the main body 3 will be described.

In addition, in the following description, the six faces of the digital camera 1 will be defined as follows.

The side facing the subject during image capture with the digital camera 1 is termed the front side, while the opposite side is termed the rear side. When image capture is performed so that the vertical top and bottom of the subject coincide with the top and bottom in the short side direction of the rectangular image captured with the digital camera 1 (the aspect ratio (ratio of long side to short side) is generally, 3:2, 4:3, 16:9, etc.), the side facing upward in the vertical direction is termed the top side. The side opposite to the top side is termed the bottom side. Furthermore, when image capture is performed so that the vertical top and bottom of the subject coincide with the top and bottom in the short side direction of the rectangular image captured with the digital camera 1, the side on the left when viewed from the subject side is termed the left side, and the opposite side is termed the right side. The above definitions do not limit the orientation in which the digital camera 1 is used.

According to the above definitions, FIG. 1 is a perspective view showing the front side, top side, and left side.

In addition, to the six sides of the digital camera 1, the six sides of the various constituent components disposed in the digital camera 1 are also defined likewise. In other words, the above definitions are applied to the six sides of the various constituent components in a state of being disposed in digital camera 1.

Furthermore, as shown in FIG. 1, the three dimensional perpendicular coordinate system (right-handed system) having a Y axis parallel to the first optical axis A1 and an X axis parallel to the second optical axis A2 will be defined. According to this definition, the Y axis positive direction is the direction from the rear side to the front side along the first optical axis A1, the X axis positive direction is the direction from the right side to the left side along the second optical axis A2, and the Z axis positive direction is the direction from the bottom side to the upper side along the perpendicular axis perpendicular to the first optical axis A1 and the second optical axis A2.

A description will be made below based on this XYZ coordinate system in each figure. In other words, the X axis positive direction, Y axis positive direction, and Z axis positive direction in each figure are each showing the same direction.

2.2: Configuration of the Main Body

The configuration of the main body 3 will be described with reference to FIG. 1, FIG. 2, and FIGS. 3A to 3C.

Figure 2:
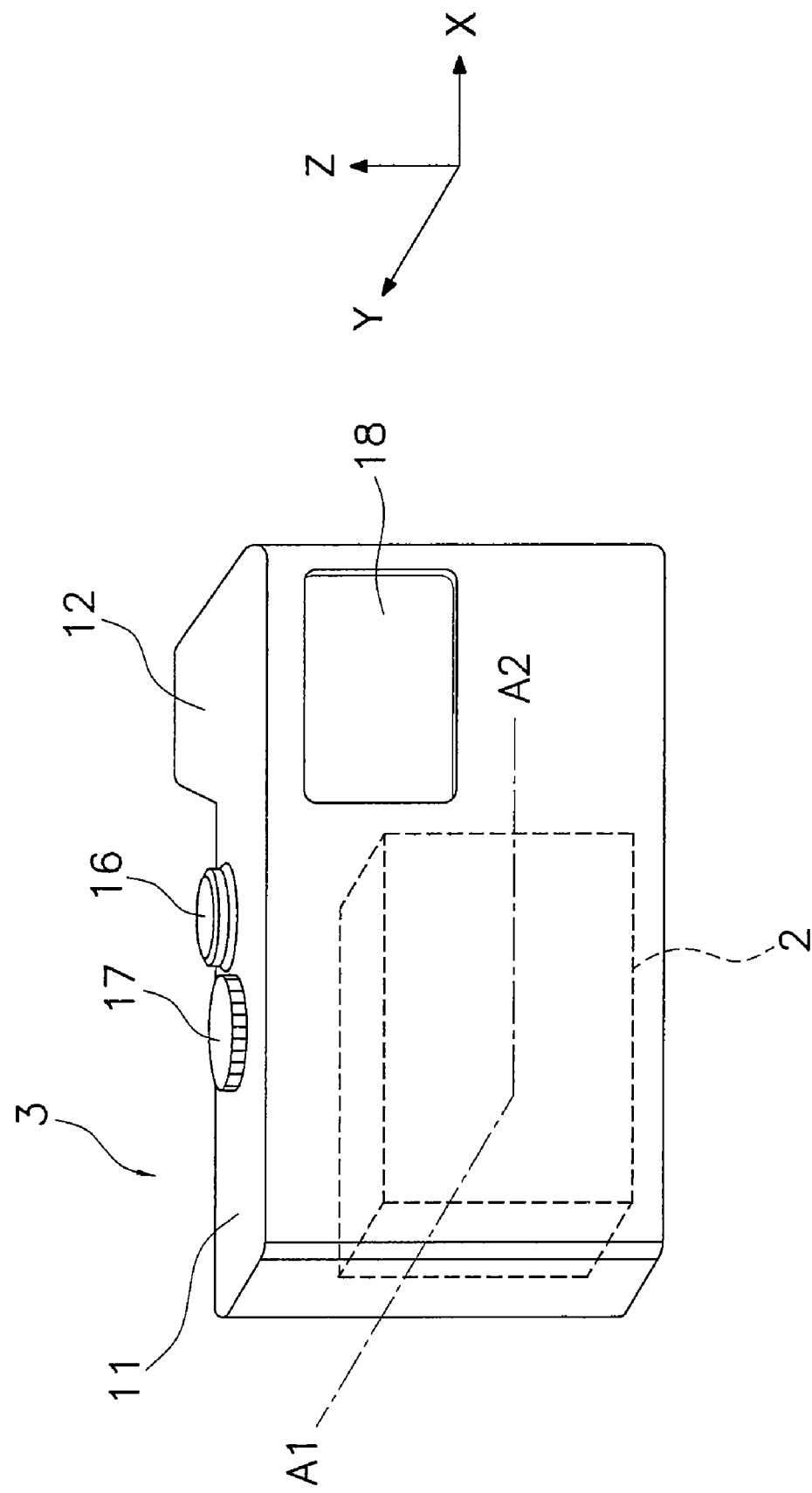
FIG. 2 is a perspective view showing the outside of a digital camera.

FIG. 2 is a perspective view showing the exterior outside of the rear side, upper side, and right side of the digital camera 1.

Figure 3A:
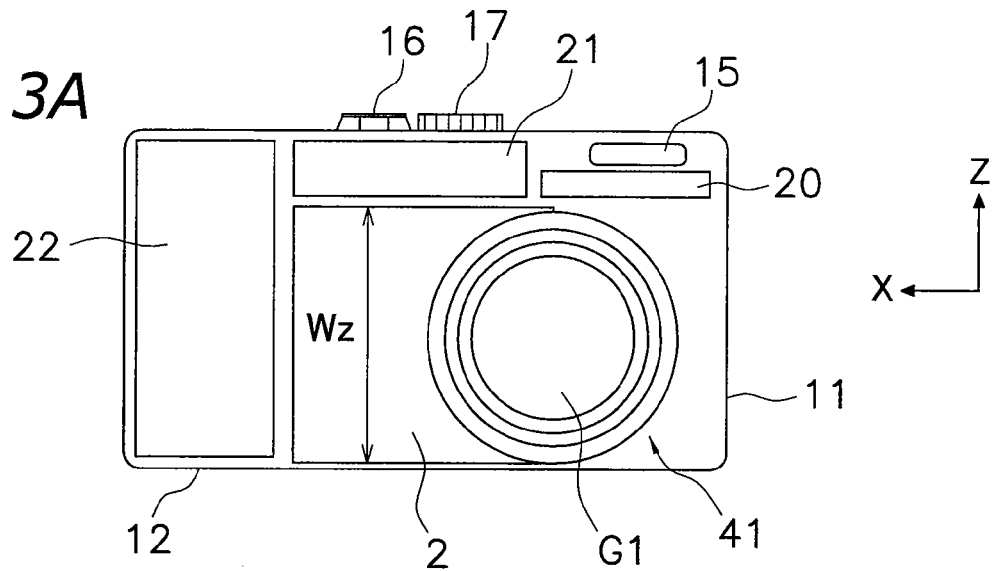
FIGS. 3A to 3C are perspective plans showing the general configuration of the main body.
Figure 3B:
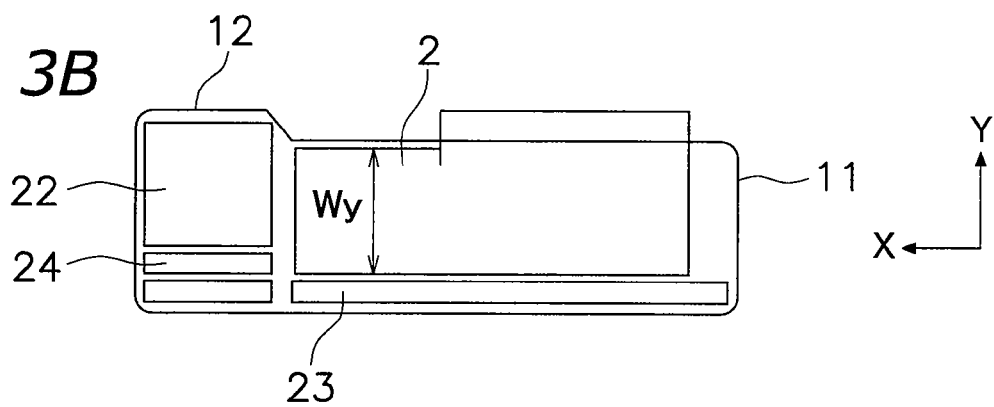
Figure 3C:
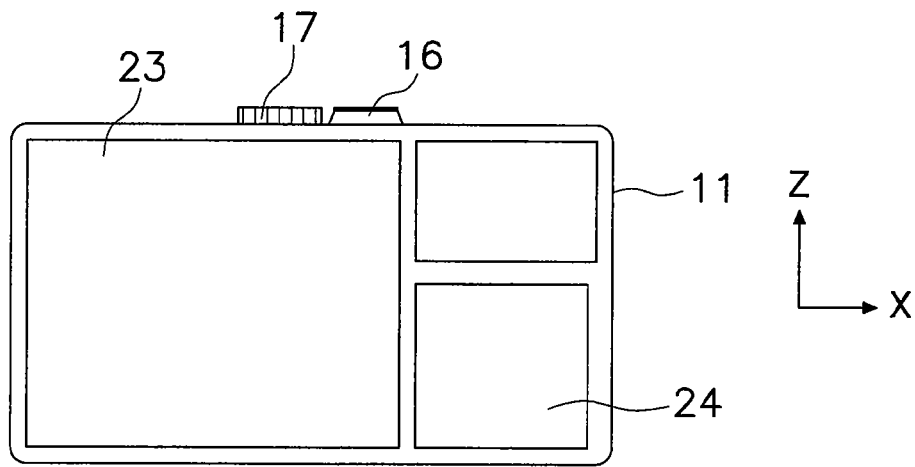

FIGS. 3A to 3C are perspective plans roughly showing the configuration of the main body 3. FIG. 3A is a perspective plan showing the configuration of a member disposed on the Y axis direction positive side (front side). FIG. 3B is a perspective plan showing the configuration of a member disposed on the Z axis direction negative side (bottom side). FIG. 3C is a perspective plan showing the configuration of a member disposed on the Y axis direction negative side (rear side).

As shown in FIGS. 1 to 3C, the main body 3 mainly includes an outer case 11 and a grip portion 12 forming the chassis for storing the imaging device 2, a flash lamp 15 disposed on the surface of the outer case 11, a release button 16, an operation dial 17 and an image display unit 18, a main condenser 20 disposed inside the chassis formed by the outer case 11 and the grip portion 12, a sub-substrate 21, a battery 22, a main substrate 23 and a memory card 24.

As shown in FIG. 1, the outer case 11 is a housing which is substantially in a rectangular parallelepiped shape, long in the second optical axis A2 direction. On the X axis direction positive side, the grip portion 12 is disposed to protrude out in the Y axis direction from the outer case 11 so that the user can hold on to it when photographing. This makes the outer case 11 and the grip portion 12 form a hollow chassis which is substantially in an L-shape. From the outer case 11, a stationary frame 52 (refer to FIG. 9) of the imaging device 2, which will be described later makes a portion of the cylindrical portion 125 thereof (refer to FIG. 10) protrude to the Y axis direction positive side. In addition, on the front side of the outer case 11, the flash lamp 15 is disposed. The flash lamp 15 flashes when necessary such as when the object is dark, and irradiates the object to aid the exposure thereof. In addition, on the upper side of the outer case 11 on the side of the grip portion 12, the release button 16 and the operation dial 17 are disposed. The release button 16 is pressed down toward the Z axis direction negative side when executing a photographing operation. The operation dial 17 is used to set various settings such as the setting for the photographing operation.

Furthermore, as shown in FIG. 2, on the rear side of the outer case 11, the image display portion 18 is provided as a visual unit for a user or the like to view the image captured by the imaging device 2. The image display portion 18 has a rectangular outer shape such as, for example, an aspect ratio (ratio of long side to narrow side) of 3:2, 4:3, 16:9 or the like, and is provided so that the long side direction thereof is substantially parallel to the direction along the second optical axis A2 (X axis direction).

Note that, FIG. 1 and FIG. 2 show only the main members disposed on the surface of the outer case 11, and members other than the above described members may be provided.

Next, the interior configuration of the main body 3 will be described with reference to FIG. 3.

As shown in FIG. 3A, on the Y axis direction positive side inside the main body 3, the imaging device 2 which is long in the second optical axis A2 direction (X axis direction positive side) is disposed so that the longitudinal direction thereof follows along the longitudinal direction of the outer case 11. The imaging device 2 is disposed in the main body 3 so that a first group frame unit 41 retaining a first lens group G1 facing the object is located on the X axis direction negative side of the imaging device 2. By doing so, the distance in the X axis direction from the first lens group G1 to the grip portion 12 is secured.

Furthermore, on the Z axis direction positive side of the imaging device 2, the flash lamp 15, the main condenser 20, and the sub-substrate 21 are disposed. The main condenser 20 provides flash light energy to the flash lamp 15, through the electric charge from a battery 22 which will be described later. The sub-substrate 21 transforms voltage when necessary of the electric power from the battery 22 which will be described later, and controls the flash lamp 15. In addition, on the Y axis direction positive side inside the grip portion 12, the battery 22 is disposed as the electric power supply for operating the digital camera 1.

Furthermore, as shown in FIGS. 3B and 3C, a main substrate 23 is disposed on the Y axis direction negative side of the imaging device 2. An image processing circuit which processes image signals from the imaging device 2, a control circuit for controlling the imaging device 2, or the like are implemented in the main substrate 23. In addition, a memory card 24 is disposed on the Y axis direction negative side of the battery 22. The memory card 24 records image signals from the imaging device 2.

In addition, as shown in FIGS. 3A and 3B, the imaging device 2 is formed to have a width in the Z axis direction thereof (Wz) which is greater than the width in the Y axis direction (Wy).

3: Imaging Device 3.1: Configuration of the Imaging Device

The configuration of the imaging device 2 attached in the digital camera 1 will be described with reference to FIGS. 4A and 4B.

Figure 4A:
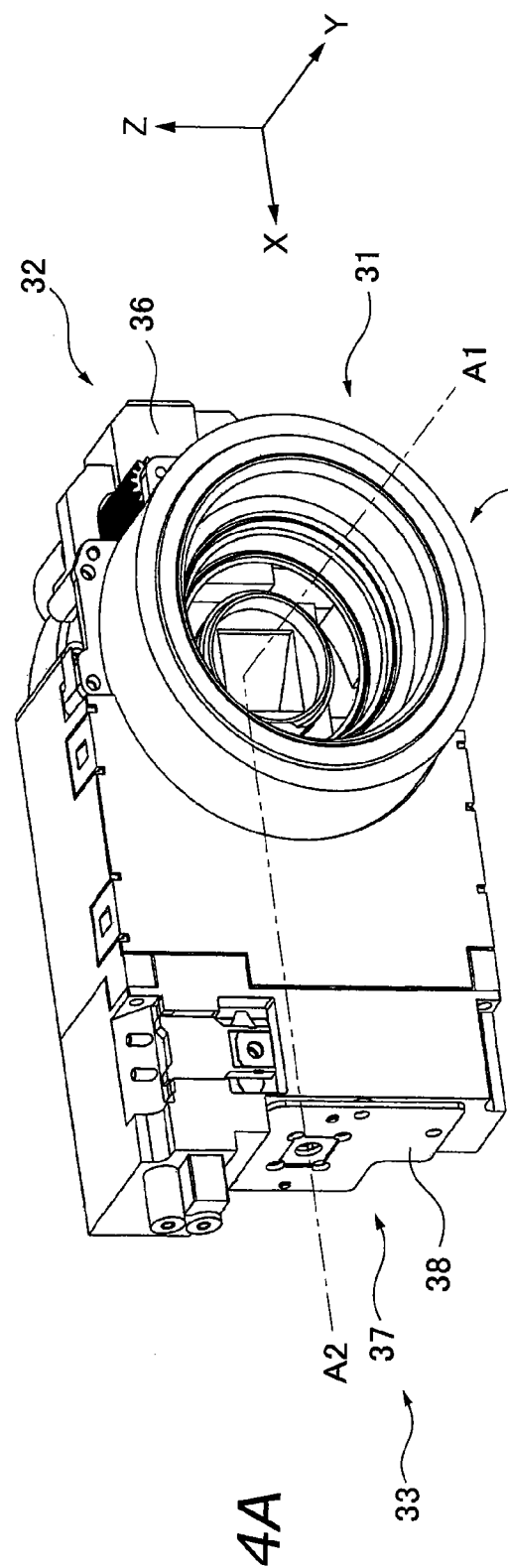
FIGS. 4A and 4B are perspective views of the assembly of the imaging device.
Figure 4B:
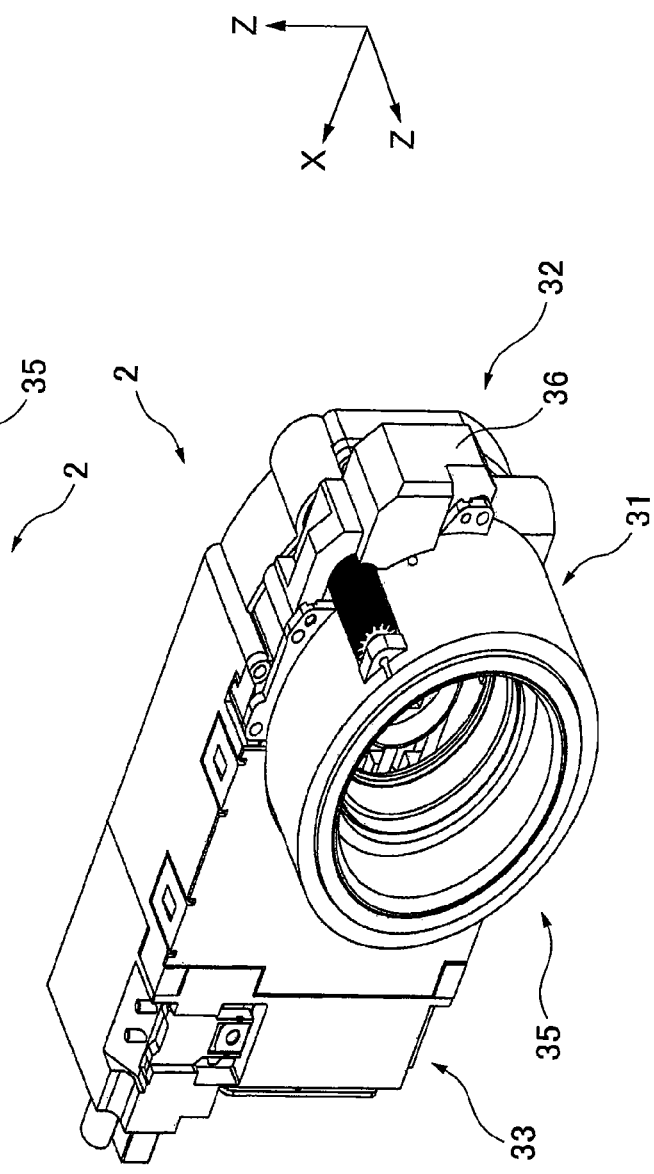

FIGS. 4A and 4B are perspective views of the assembly of the imaging device 2. FIG. 4A is a perspective view showing the front side, upper side, and the left side of the imaging device 2, and FIG. 4B is a perspective view showing the front side, upper side, and the right side of the imaging device 2.

The imaging device 2 includes a lens barrel 31 having an optical system 35, a motor unit 32 having a zoom motor 36 which drives the lens barrel 31, and a CCD unit 33 having a CCD 37 as an imaging unit receiving the light flux passing through the lens barrel 31.

The lens barrel 31 is mechanistically characterized in that it includes a multistage retractable lens frame which is retractable and extendable in multistage in the first optical axis A1 direction, and is optically characterized in which it includes an optical system 35 which includes the bending optical system. The optical system 35 includes 5 groups including 12 pieces of optical elements (lens and prisms) which realize a high magnification zoom which is beyond 3 times optical zoom (for example, in the range of 6 times to 12 times optical zoom). With this configuration, the lens barrel 31 takes in the light flux incident along the first optical axis A1, and bends the light flux incident along the first optical axis A1 in a direction along the second optical axis A2 intersecting with the first optical axis A1, and furthermore, leads the light flux bent in the direction along the second optical axis A2 to CCD 37.

The motor unit 32 mainly includes, for example, a zoom motor 36 such as a DC motor, a flexible printed circuit board (FPC) (not shown in the figure) electrically connecting the zoom motor 36 to the main substrate 23 (refer to FIG. 3), and a photo sensor (not shown in the figure) provided to measure the position from the original point of the lens in the lens barrel 31 by the measurement of the motor rotation frequency of the zoom motor 36. The zoom motor 36 drives the lens barrel 31, and moves the optical system 35 between the wide angle end and the telephoto end. By doing so, the optical system 35 included in the lens barrel 31 operates as a zoom lens system to change the imaging magnification of the light flux in CCD 37. The photo sensor operates as follows. The photo sensor is a pair of transmission type photo sensor provided entering from the outside of the motor box (gear box). The photo sensor has a square U-shape, and a pair of light emitting element and light receiving element are provided on the opposite ends of the photo sensor. It is so configured that a gear directly coupled to the zoom motor 36 passes through between the light emitting element and the light receiving element, and by counting the number of times which the gear interrupts the space between this light emitting element and light receiving element per unit time, and therefore it is possible to count the number of rotations of the zoom motor without contact.

The CCD unit 33 is mainly made up of the CCD 37 which converts the received light flux passing through the lens barrel 31 into an electrical signal, a CCD plate 38 for fixing CCD 37 to the lens barrel 31, and an FPC (not shown in the figure) electrically connecting CCD 37 to the main substrate 23 (refer to FIG. 3).

3.2: Optical System 3.2.1: Configuration of Optical System

Before describing in detail the configuration of the imaging device 2, the configuration of the optical system 35 included in the lens barrel 31 will be described with reference to FIGS. 5 to 8.

Figure 5:
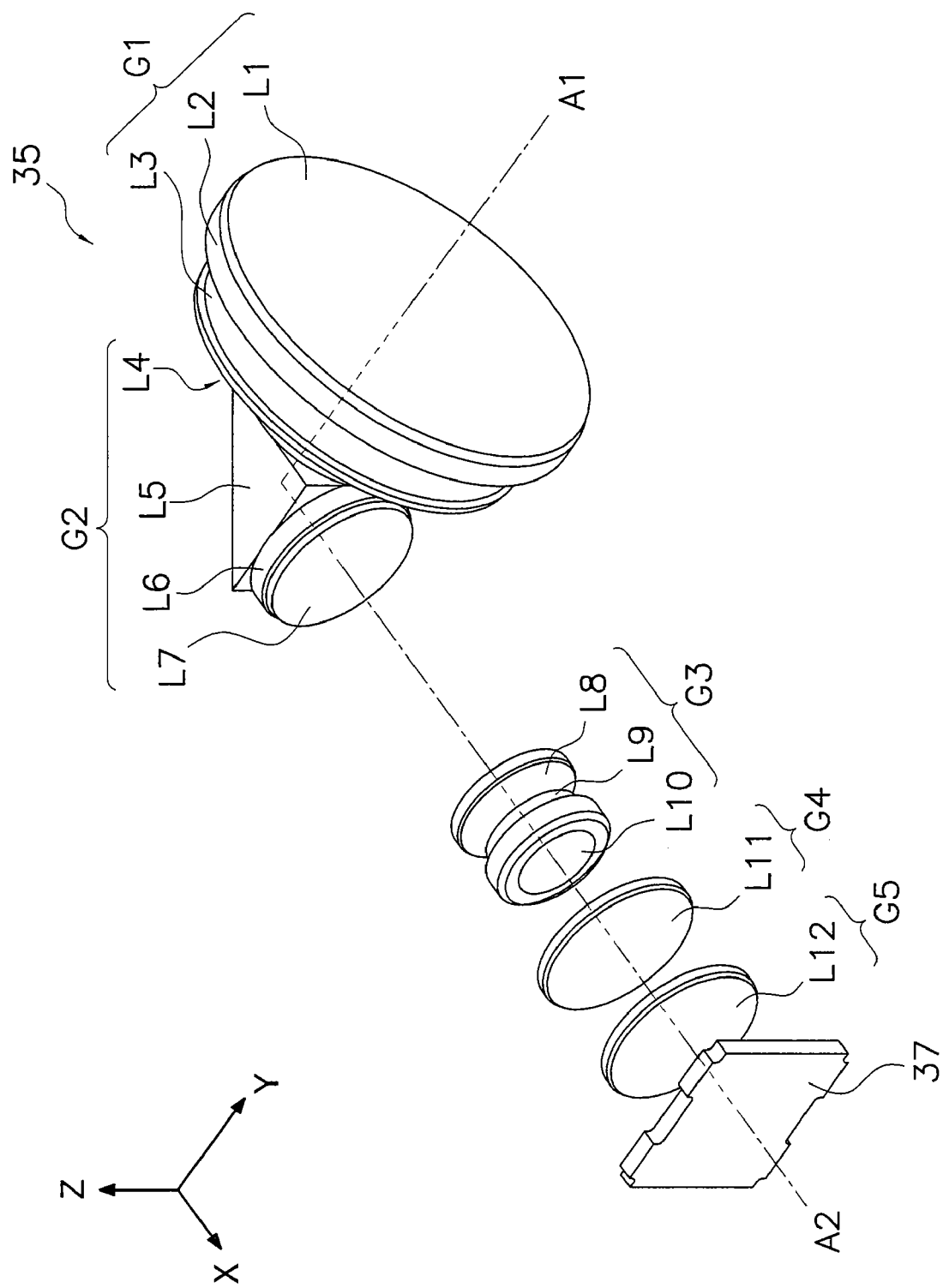
FIG. 5 is an illustration showing the configuration of the optical system (wide angle end)
Figure 6:
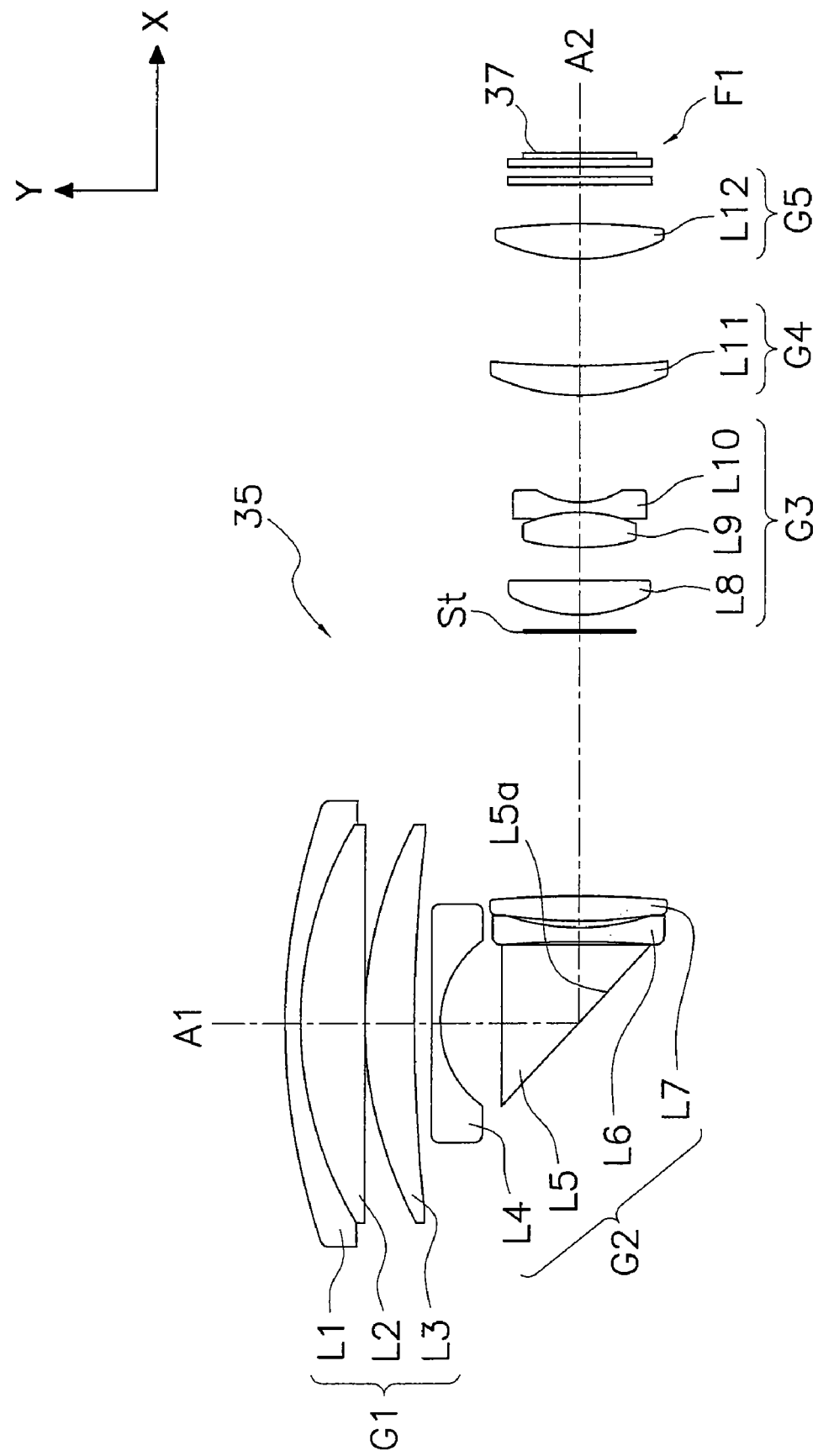
FIG. 6 is an illustration showing the configuration of the optical system (wide angle end)
Figure 7:
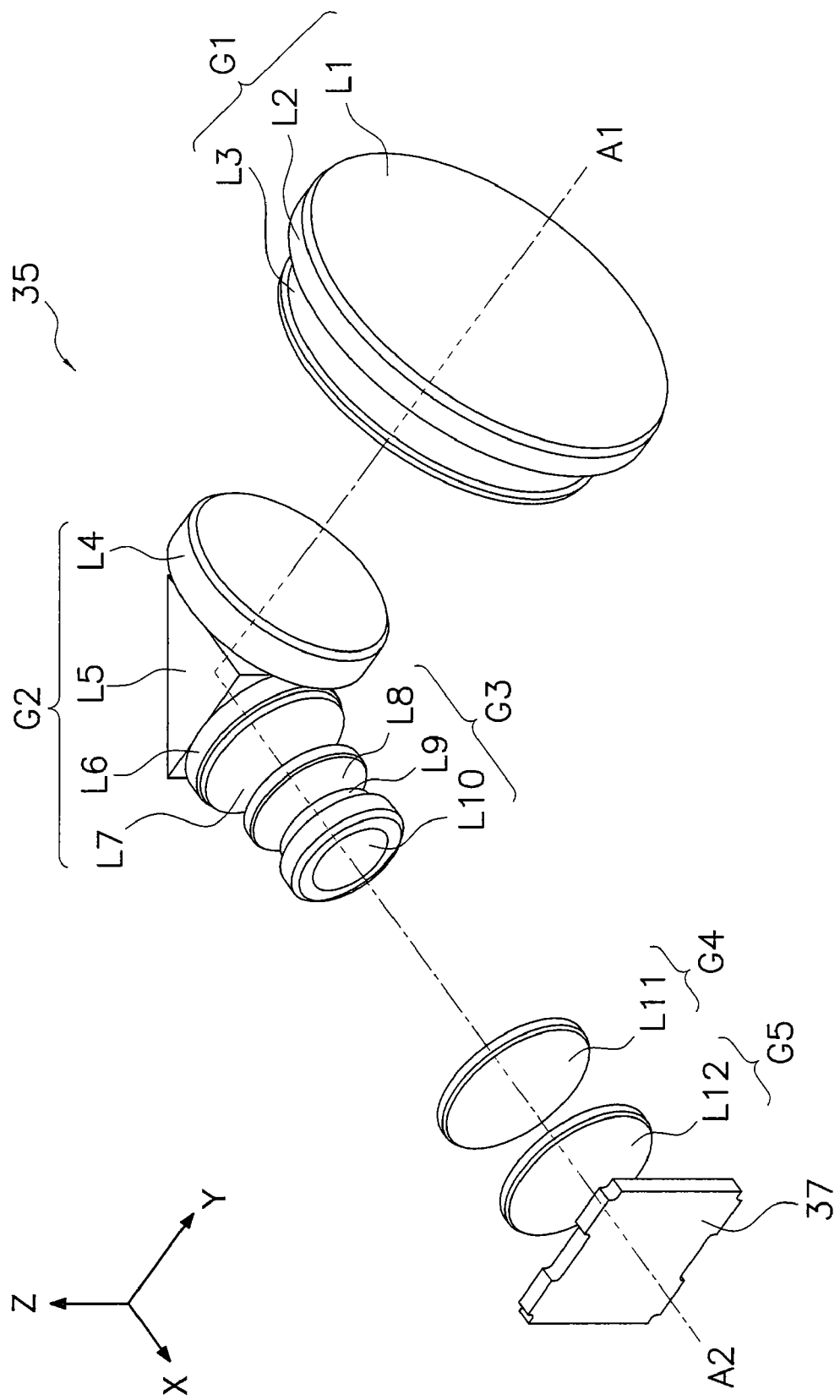
FIG. 7 is an illustration showing the configuration of the optical system (telephoto end)
Figure 8:
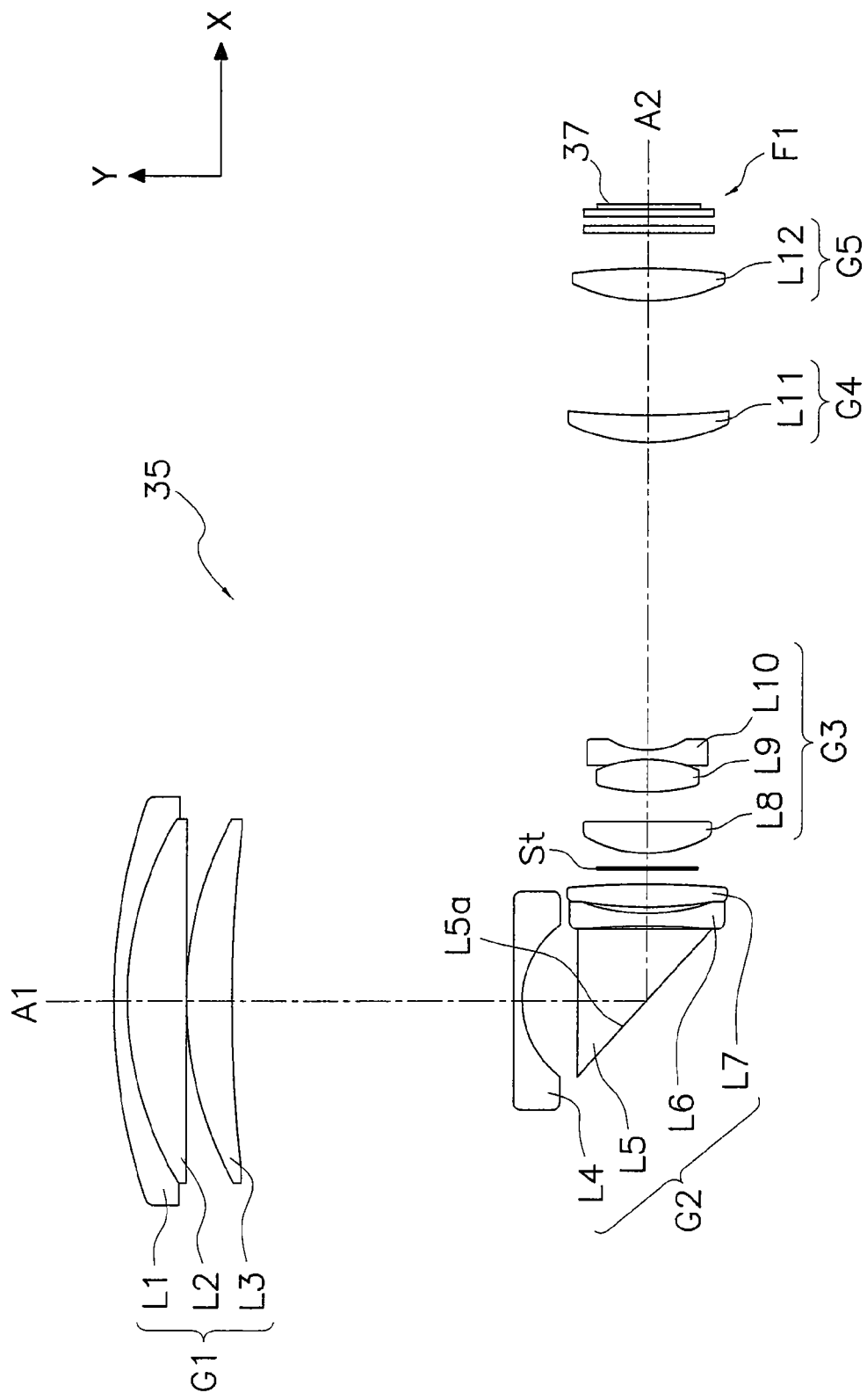
FIG. 8 is an illustration showing the configuration of the optical system (telephoto end)

FIGS. 5 to 8 show the configuration of the optical system 35 included in the lens barrel 31. FIGS. 5 and 6 show the arrangement of the optical system 35 when the optical system 35 is located at the wide angle end. FIGS. 7 and 8 show the arrangement of the optical system 35 when the optical system 35 is located at the telephoto end. FIGS. 5 and 7 show the arrangement of the optical system 35 when viewed from the same point as in FIGS. 4A and 4B. FIGS. 6 and 8 are sectional views in a plane including the optical axes of the optical system 35 shown in FIGS. 5 and 7.

As shown in FIGS. 5 to 8, the optical system 35 is made up of a first lens group G1, a second lens group G2, an exposure-adjustment member St (refer to FIG. 6 or FIG. 8), a third lens group G3, a fourth lens group G4, a fifth lens group G5 and an IR filter F1 (refer to FIG. 6 or FIG. 8) in order from the side of the object, and the optical system 35 is so configured that the light flux incident from the first lens group G1 passes through each of the lens groups G1 through G5 and the IR filter F1, and is conducted to the CCD 37. In addition, each of the lens groups G1 to G5 configures the zoom lens system by changing the distance between each of the lens groups.

The first lens group G1 has positive optical power as a whole, and includes a first lens L1, a second lens L2 and a third lens L3 disposed in order from the side of the object on the first optical axis A1.

The first lens L1 is a concave meniscus lens having the convex surface facing to the side of the object. The second lens L2 is a plane-convex lens having the convex surface facing to the side of the object. The third lens L3 is a convex meniscus lens having the convex surface facing to the side of the object.

The second lens group G2 has negative optical power as a whole, and includes a fourth lens L4 disposed on the first optical axis A1, a prism L5 bending the light flux incident along the first optical axis A1 to a direction along the second optical axis A2 which is substantially perpendicular to the first optical axis A1, a sixth lens L6 disposed on the second optical axis A2, and a seventh lens L7.

The fourth lens L4 is a concave meniscus lens with the convex surface facing the side of the object. The prism L5 includes a reflecting surface L5a (refer to FIG. 6 or FIG. 8) which reflects the light flux incident along the first optical axis A1 to a direction along the second optical axis A2 which is substantially perpendicular to the first optical axis A1. In addition, although a prism L5, in particular, an internal reflection prism is here used, any of a surface reflection prism, an internal reflection mirror and a surface reflection mirror with the same functions may be adopted. The sixth lens L6 is a biconcave lens. The seventh lens L7 is a biconvex lens.

The exposure-adjustment member St (refer to FIG. 6 or FIG. 8) is disposed on the second optical axis A2, and is a member such as an aperture or a shutter adjusting the amount of light incident into the CCD 37 along the second optical axis A2.

The third lens group G3 has positive optical power as a whole, and includes an eighth lens L8, a ninth lens L9 and a tenth lens L10.

The eighth lens L8 is a plane-convex lens having the convex surface facing to the side of the prism L5. The ninth lens L9 is a biconvex lens. The tenth lens L10 is a biconcave lens.

The fourth lens group G4 is used for focusing, and includes an eleventh lens L11 disposed on the second optical axis A2. The eleventh lens L11 is a convex meniscus lens having the convex surface facing to the side of the prism L5.

The fifth lens group G5 includes a twelfth lens L12 disposed on the second optical axis A2. The twelfth lens L12 is a biconvex lens.

The IR filter F1 (refer to FIG. 6 or FIG. 8) is a filter blocking off invisible light in the infrared region incident into the CCD 37. In addition, in the optical system 35, an optical lowpass filter may be disposed in the second optical axis A2 direction of the IR filter F1 (X axis direction positive side). The optical lowpass filter is a filter for removing the high spatial frequency component of the light flux incident into the CCD 37, and it is a filter for eliminating false color.

In addition, the configurations of the lenses including each of the lens groups G1 to G5 are not limited to those described above. It is possible to adopt another lens configuration, as long as the configuration has the same optical effects.

3.2.2: Operation of the Optical System

With Reference to FIGS. 6 and 8, the operation of the optical system 35 will be described.

As described above, FIG. 6 shows the arrangement of each of the lens groups G1 to G5 when the optical system 35 is located at the wide angle end. FIG. 8 shows the arrangement of each of the lens groups G1 to G5 when the optical system 35 is located at the telephoto end.

The first lens group G1 is movable in the first optical axis A1 direction. When the optical system 35 is located at the wide angle end, it is located at a place nearest to the second lens group G2 (refer to FIG. 6) within the movable range. When the optical system 35 is located at the telephoto end, it is located at a place farthest away from the second lens group G2 (refer to FIG. 8) within the movable range.

The second lens group G2, as shown in FIGS. 6 and 8, is relatively stationary with respect to the CCD 37, at the time of zooming of the optical system 35 from the wide angle end to the telephoto end.

The third lens group G3 is movable with the exposure-adjustment member St in the second optical axis A2 direction. When the optical system 35 is located at the wide angle end, the third lens group G3 is located at a place farthest away from the second lens group G2 (refer to FIG. 6) within the movable range. When the optical system 35 is located at the telephoto end, the third lens group G3 is located at a place nearest to the second lens group G2 (refer to FIG. 8) within the movable range.

The fourth lens group G4 is movable in the second optical axis A2 direction. The fourth lens group G4 performs the focusing operation, and corrects the out-of-focus state caused by the changes in imaging magnification due to the movement of first lens group G1 and the third lens group G3.

As shown in FIGS. 6 and 8, the fifth lens group G5 and the IR filter F1 are relatively stationary with respect to the CCD 37, when zooming with the optical system 35 from the wide angle end to the telephoto end.

Each of the lens groups G1 to G5 operates as described above. In particular, the first lens group G1 and the third lens group G3 moves in cooperation with each other, and changes the imaging magnification in the CCD 37.

In addition, in the lens barrel 31, the location of each of the lens groups G1 to G5 when the multistage retractable lens frame is retracted corresponds to the location of each of the lens groups G1 to G5 when the optical system 35 is located at the wide angle end.

4: Lens Barrel 4.1: Configuration of the Lens Barrel

The configuration of the imaging device 2, mainly the configuration of the lens barrel 31 will be described with reference to FIG. 9.

Figure 9:
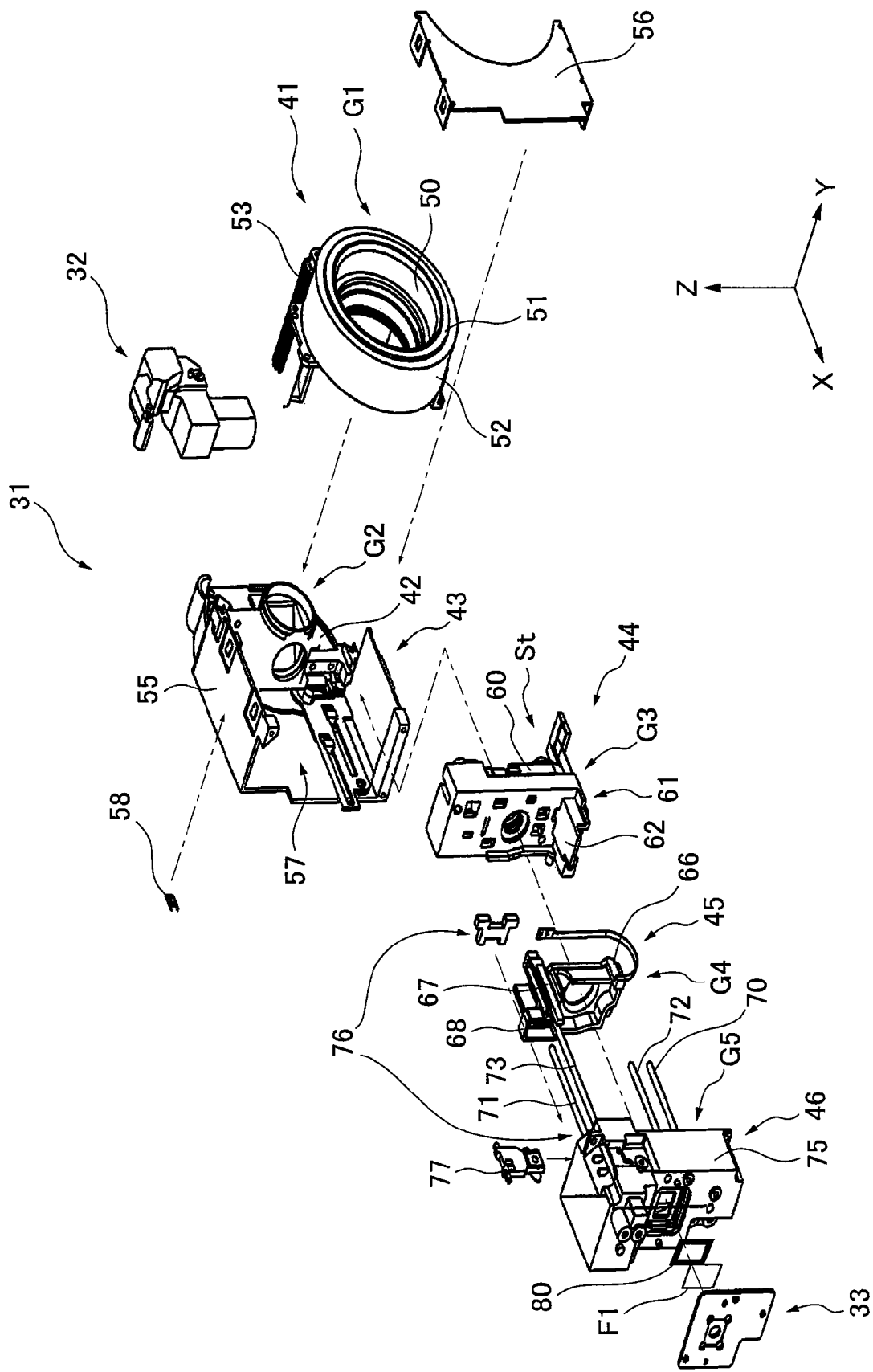
FIG. 9 is an exploded perspective view of the imaging device.

FIG. 9 is an exploded perspective view of the imaging device 2 when viewed from the same point as in FIG. 4A.

The lens barrel 31 is made up of a first group frame unit 41 retaining the first lens group G1, a base unit 43 to which a second group frame unit 42 retaining the second lens group G2 is fixed, a third group frame unit 44 retaining the exposure-adjustment member St and the third lens group G3, a fourth group frame unit 45 retaining the fourth lens group G4, and a master flange unit 46 retaining the fifth lens group G5.

The first group frame unit 41 is mainly made up of the first lens group G1 disposed on the first optical axis A1, a first group frame 50 retaining the first lens group G1, a driving frame 51 supporting the first group frame 50 to be movable in the first optical axis A1 direction (Y axis direction), a stationary frame 52 supporting the driving frame 51 to be movable in the first optical axis A1 direction (Y axis direction), and a driving gear 53 disposed to be rotatable along the Y axis direction between the stationary frame 52 and the base unit 43 and transmitting the driving force of the motor unit 32 to the driving frame 51.

The stationary frame 52 is fixed to the second group frame unit 42 retaining the second lens group G2. When the stationary frame 52 is fixed, the positions in the Z axis direction and X axis direction are determined so that the optical axis of the first lens group G1 and the optical axis of the fourth lens L4 of the second lens group G2 coincide with each other.

The base unit 43 is mainly made up of a base 55 making up the chassis of the lens barrel 31, a cover 56 making up the chassis with the base 55 and covering the front side of the base 55, the second group frame unit 42 fixed to the base 55, a third group movement mechanism 57 moving the third group frame unit 44 accommodated inside the chassis made up of the base 55 and the cover 56 along the second optical axis A2 direction (X axis direction), and a photo sensor 58 detecting the X axis direction position of the third group frame unit 44.

A motor unit 32 driving the driving gear 53 to rotate is attached on the X axis direction negative side of the base unit 43. The driving force of the motor unit 32 is transmitted to the third group movement mechanism 57 via the driving gear 53. The master flange unit 46 covering the X axis direction positive side of the base unit 43 is fixed on the X axis direction positive side of the base unit 43.

The third group frame unit 44 is mainly made up of a shutter unit 60 provided on the second optical axis A2 and including the exposure-adjustment member St performing the shutter operation and the aperture operation, the third lens group G3, an image blur correction mechanism 61 retaining the third lens group G3 to be movable in the Y axis direction and the Z axis direction, and a third group frame 62 supporting the shutter unit 60 and the image blur correction mechanism 61.

The third group frame 62 is fixed to the third group movement mechanism 57 of the base unit 43, and is driven to the X axis direction. When the third group frame 62 is fixed, the positions in the Y axis direction and the Z axis direction are determined so that the optical axis when the third lens group G3 is located at the center in the movable range coincides with the optical axes of the sixth lens L6 and the seventh lens L7 of the second lens group G2. Furthermore, the third group frame 62 is slidably fitted to third group guide poles 70, 71 extending on the X axis direction negative side from the master flange unit 46 which will be described later. This allows the third group frame unit 44 to move only in the X axis direction, that is, the second optical axis A2 direction.

The fourth group frame unit 45 is mainly made up of the fourth lens group G4, the fourth group frame 66 retaining the fourth lens group G4, a sensor magnet 67 and a coil 68 fixed to the fourth group frame 66.

The fourth group frame 66 is slidably fitted to the fourth group guide poles 72, 73 extending on the X axis direction negative side from the master flange unit 46 which will be described later. As a result, the fourth group frame 66 is positioned in the Y axis direction and the Z axis direction so that the optical axis of the fourth lens group G4 coincides with the optical axes of the sixth lens L6 and the seventh lens L7 of the second lens group G2, and is movable only in the X axis direction, that is, the second optical axis A2 direction.

The master flange unit 46 is mainly made up of the fifth lens group G5, a master flange 75 retaining the fifth lens group G5, the third group guide poles 70, 71 and the fourth group guide poles 72, 73 extending on the X axis direction negative side and fixed to the master flange 75, the IR filter F1 attached from the X axis direction positive side via a cushion rubber 80, a magnetic member 76 driving the fourth group frame unit 45 in cooperation with the coil 68, and an MR sensor 77 detecting the magnetism of the sensor magnet 67 and senses the X direction position of the fourth group frame unit 45.

The master flange 75 is fixed on the X axis direction positive side of the base 55. When the master flange 75 is fixed, the positions in the Y axis direction and the Z axis direction are determined so that the optical axis of the fifth lens group G5 coincides with the optical axes of the sixth lens L6 and the seventh lens L7 of the second lens group G2. Furthermore, a CCD unit 33 is fixed on the X axis direction positive side of the master flange unit 46.

The components included in the lens barrel 31 will be described in detail below.

4.2: First Group Frame Unit

4.2.1: Configuration of the First Group Frame Unit

The configuration of the first group frame unit 41 will be described in detail with reference to FIG. 10.

Figure 10:
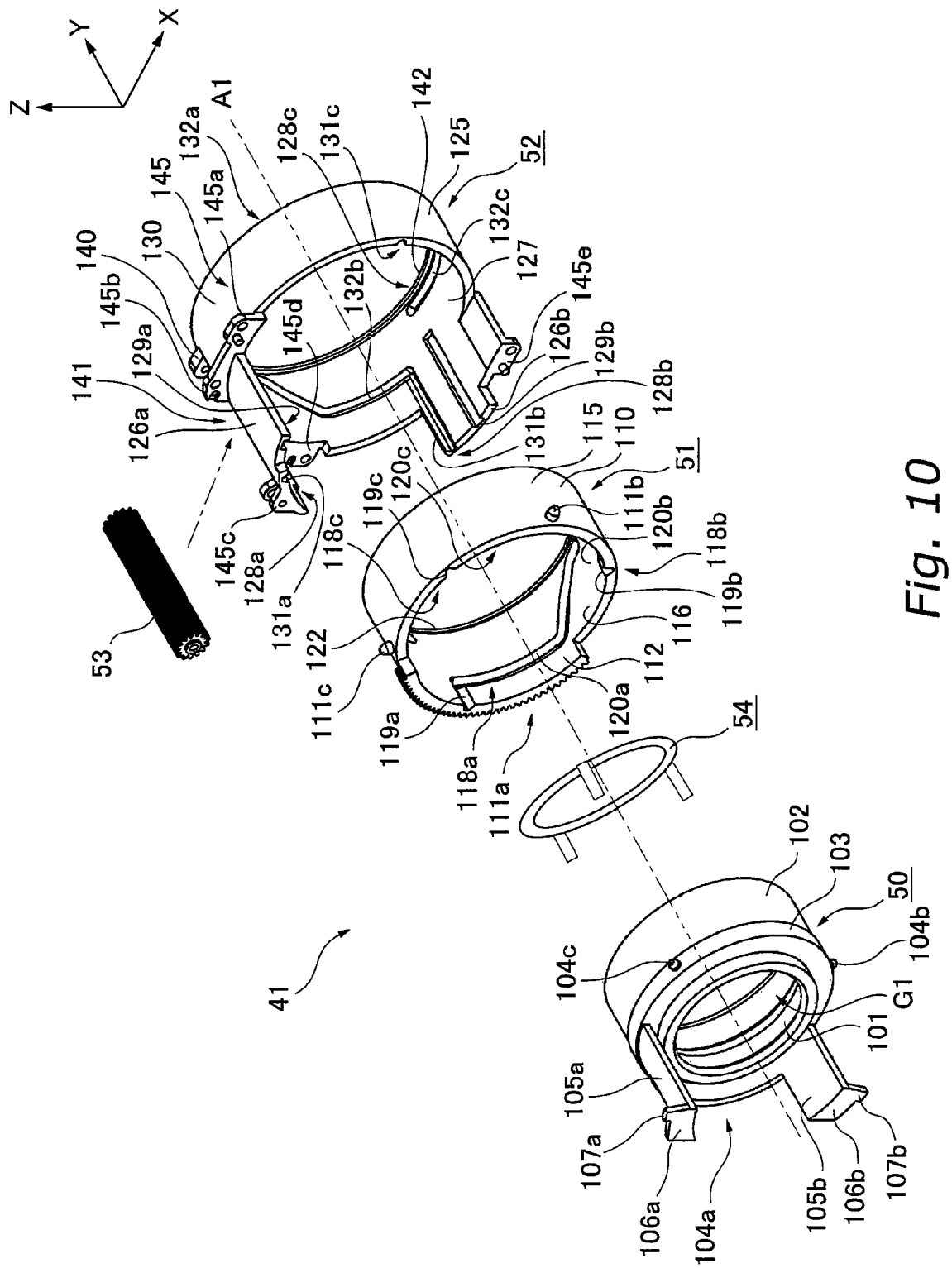
FIG. 10 is an exploded perspective view of the first group frame unit.

FIG. 10 is an exploded perspective view of the first group frame unit 41. The first group frame unit 41 supports the first lens group G1 with the multistage retractable frame body.

As shown in FIG. 10, the first group frame unit 41 is made up of the first lens group G1, the first group frame 50 retaining the first lens group, a first group DR (design ring) 54 attached to the first group frame 50, the driving frame 51 supporting the first group frame 50 to be movable, the stationary frame 52 supporting the driving frame 51 to be movable, and the driving gear 53 transmitting the driving from the motor unit 32 (refer to FIG. 9) to the driving frame 51.

The first lens group G1 is fixed to the inner peripheral surface 101 of the first group frame 50 by adhesive bonding or thermal caulking. Furthermore, on the inner peripheral surface 101 of the first group frame 50, the first group DR 54 is attached on the Y axis direction positive side of the first lens group G1. As a result, unwanted light is prevented from entering in the first lens group G1. In addition, by mounting the first group DR 54, the fixation mark (adhesion mark) of the first lens group G1 on the first group frame 50 is covered, and the quality of the exterior outside is ensured.

The first group frame 50 includes a cylindrical portion 102, a flange portion 103, cam pins 104a to 104c, extension portions 105a, 105b, and engagement portions 106a, 106b.

The cylindrical portion 102 has the circular inner peripheral surface 101 on which the first lens group G1 is attached. The flange portion 103 has an outer peripheral surface formed on the edge of the cylindrical portion 102 on the Y axis direction negative side and having a diameter greater than that of the cylindrical portion 102. The cam pins 104a to 104c are provided to be spaced at a predetermined angle (for example, 120 degrees) away in the circumferential direction at a plurality of circumferential positions on the outer peripheral surface of the flange portion 103 (for example, three locations: for example, three o'clock, seven o'clock and eleven o'clock positions when viewed from the Y axis direction positive side), and protrude out in the radiation direction of the first optical axis A1. The extension portions 105a and 105b are arc-shaped members extending toward the Y axis direction negative side and formed with a predetermined circumferential width (for example, 30 degrees) with two circumferential points (for example, one o'clock and five o'clock positions when viewed from the Y axis direction positive side) at the edge of the flange portion 103 on the Y axis direction negative side as the centers. The engagement portions 106a and 106b are formed to extend in the radiation direction of the first optical axis A1 on the tips of each of the extension portions 105a and 105b, and end portions 107a and 107b are formed with a circumferential width narrower than the other portions at the ends of the engagement portions 106a and 106b in the radiation direction and at the ends thereof on the X axis direction positive side.

The driving frame 51 has a cylindrical portion 110, cam pins 111a to 111c, and a ring gear 112.

The cam pins 111a to 111c are provided to be spaced at a predetermined circumferential angle (for example, 120 degrees) at a plurality of circumferential positions on the outer surface 115 of the cylindrical portion 110 (for example, three positions, one o'clock, five o'clock and nine o'clock positions when viewed from the Y axis direction positive side), and protrude out in the radiation direction of the first optical axis A1. The ring gear 112 is formed integrally with the cylindrical portion 110 at a circumferential portion of the edge of the cylindrical portion 110 on the Y axis direction negative side (for example, from one o'clock position to five o'clock position when viewed from the Y axis direction positive side) so that the tooth tips protrude in the radiation direction of the first optical axis A1 compared to the outer surface 115. The radius of an imaginary circle which connects the tips of the cam pins 111a to 111c is formed larger than the radius of an imaginary circle which connects the tooth tips of the ring gear 112.

The circular inner surface 116 of the cylindrical portion 110 and the ring gear 112 has a radius larger than the radius of the flange portion 103 of the first group frame 50, and has a radius smaller than the radius of the imaginary circle which connects the tips of the cam pins 104a to 104c of the first group frame 50. Therefore, by engaging cam pins 104a to 104c with cam grooves 118a to 118c formed on the inner surface 116, it becomes possible to arrange the first group frame 50 inside the driving frame 51.

In addition, a circular flange portion 122 extending inward in the radiation direction of the first optical axis A1 is formed at the edge portion of the cylindrical portion 110 on the Y axis direction positive side. The radius of the inner surface of the flange portion 122 is formed to be substantially the same size as the radius of the outer peripheral surface of the cylindrical portion 102 of the first group frame 50. As a result, unwanted light is prevented from entering into the interior of the lens barrel 31 through the gap formed between the first group frame 50 and the driving frame 51 in the radiation direction of the first optical axis A1.

Cam grooves 118a to 118c are formed in the inner surface 116 to be spaced at a predetermined circumferential angle (for example, 120 degrees). The cam grooves 118a to 118c have conducting ends opening at three positions (for example, three o'clock, seven o'clock and eleven o'clock positions) on the end portion of the inner surface 116 on the Y axis direction negative side for conducting cam pins 104a to 104c to the cam grooves 118a to 118c. In addition, the cam grooves 118a to 118c have conducting grooves 119a to 119c extending to the Y axis direction positive side from the conducting ends, and sloped grooves 120a to 120c respectively continuing from the conducting grooves 119a to 119c and extending toward the Y axis direction positive side and clockwise when viewed from the Y axis direction positive side. In addition, the conducting groove 119a of the cam groove 118a with the conducting end formed on the side of the ring gear 112 on the inner surface 116 has the length in the Y axis direction longer by the width size in the Y axis direction of the ring gear 112 compared to the other conducting grooves 119b and 119c.

The stationary frame 52 includes a cylindrical portion 125, and extension portions 126a, 126b. On the inner surface 127 of the cylindrical portion 125 and the extension portions 126a and 126b, cam grooves 128a to 128c and straight-movement grooves 129a and 129b are formed.

On a predetermined position in the circumferential direction of the outer surface 130 of the cylindrical portion 125 (for example, two o'clock position when viewed from the Y axis direction positive side), a protrusion portion 140 protruding in the radiation direction of the first optical axis A1, and a penetration groove 141 extending from the Y axis direction negative side of the protrusion portion 140 and passing through the cylindrical portion 125 in the radiation direction of the first optical axis A1 are formed. The protrusion portion 140 rotatably supports the end portion of the driving shaft of the driving gear 53 on the Y axis direction positive side. Furthermore, the end portion of the driving shaft of the driving gear 53 on the Y axis direction negative side is rotatably supported by a fixing portion 145c which will be described later. By doing so, the both ends of the driving gear 53 are rotatably supported on the stationary frame 52, and are disposed along the Y axis direction with the same level of accuracy as the processing accuracy of the stationary frame 52. In the penetration groove 141, the driving gear 53 is disposed along the Y axis direction. The tooth tips of the driving gear 53 enter into the inner side of the cylindrical portion 125 and mesh with the ring gear 112 of the driving frame 51 disposed inside the stationary frame 52.

In addition, on the edge portion of the cylindrical portion 125 on the Y axis direction positive side, a circular flange portion 142 extending inward in the radiation direction of the first optical axis A1 is formed. The radius of the inner surface of the flange portion 142 is formed to be substantially the same size as the radius of the outer surface 115 of the cylindrical portion 110 of the driving frame 51. As a result, unwanted light is prevented from entering into the interior of the lens barrel 31 through the gap in the radiation direction of the first optical axis A1 between the driving frame 51 and the stationary frame 52.

On the edge portion of the cylindrical portion 125 on the Y axis direction negative side, a flange 145 extending outward in the radiation direction of the first optical axis A1 is formed on a portion in the circumferential direction. Fixing portions 145a and 145b are formed on the flange 145. The fixing portion 145a is positioned on a fixing portion 164c of the second group frame unit 42 which will be described later, and is fixed to the fixing portion 164c by screws or the like. The fixing portion 145b is positioned on an arm portion formed integrally with the motor unit 32, and is fixed thereto by screws or the like.

Extension portions 126a, 126b are arc-shaped members extending toward the Y axis direction negative side and formed with a predetermined circumferential width with two circumferential positions at the edge portion of the cylindrical portion 125 on the Y axis direction negative side. More specifically, the extension portions 126a and 126b each has an end portion on the X axis direction positive side at twelve o'clock position and six o'clock position when viewed from the Y axis direction positive side, and are formed with a predetermined circumferential width. Here, the predetermined width is a width which is sufficient to form each of the conducting grooves 131a and 131b and straight-movement grooves 129a and 129b of the cam grooves 128a and 128b which will be described later, on the inner surface 127 of the extension portions 126a and 126b.

On the end portion of the extension portion 126a on the Y axis direction negative side, a fixing portion 145c extending outward in the radiation direction of the first optical axis A1 is formed. The fixing portion 145c rotatably supports the end portion of the driving shaft of the driving gear 53 on the Y axis direction negative side, and is accommodated in a driving shaft accommodating portion 175 of the base 55 which will be described later. A fixing portion 145d extending outward in the radiation direction of the first optical axis A1 is formed between the extension portion 126a and extension portion 126b in the circumferential direction to be adjacent to the extension portion 126a. The fixing portion 145d is positioned with respect to the front side of the motor unit 32 and fixed thereto by a screw or the like. Furthermore, a fixing portion 145e extending outward in the radiation direction of the first optical axis A1 is formed to be adjacent to the extension portion 126b in the circumferential direction. The fixing portion 145e is positioned with respect to a fixing portion 165d of the second group frame unit 42 which will be described later, and fixed by a screw or the like.

The circular inner surface 127 of the cylindrical portion 125 and the extension portions 126a and 126b has a radius larger than the radius of the imaginary circle which connects the ends of the ring gear 112 of the driving frame 51, and has a radius smaller than the radius of the imaginary circle which connects the ends of the cam pins 111a to 111c of the driving frame 51. For this reason, it becomes possible to arrange the driving frame 51 inside the driving frame 51, by engaging the cam pins 111a to 111c with the cam grooves 128a to 128c which are formed on the inner surface 127.

The cam grooves 128a to 128c are formed in the inner surface 127 to be spaced at a predetermined circumferential angle (for example, 120 degrees). The cam grooves 128a to 128c have conducting ends opening at three positions (for example, one o'clock, five o'clock and nine o'clock positions) on the end portion of the inner surface 127 on the Y axis direction negative side for conducting the cam pins 111a to 111c to the cam grooves 128a to 128c. In addition, the cam grooves 128a to 128c have conducting grooves 131a to 131c extending to the Y axis direction positive side from the conducting ends, and has sloped groove 132a to 132c respectively continuing from the conducting grooves 131a to 131c and extending toward the Y axis direction positive side in the and counterclockwise when viewed from the Y axis direction positive side. In addition, the conducting grooves 131a and 131b of the cam grooves 128a and 128b with the conducting ends formed on the end of the extension portions 126a and 126b on the Y axis direction negative side have the length in the Y axis direction longer by the length of the extension portions 126a and 126b in the Y axis direction compared to the other conducting groove 131c.

The straight-movement grooves 129a and 129b engage with the end portions 107a and 107b of the first group frame 50, guide the first group frame 50 to move in the first optical axis A1 direction, and prevent the first group frame 50 from relatively rotating with respect to the stationary frame 52.

4.2.2: Operation of the First Group Frame Unit

The operation of the first group frame unit 41 having the above described configuration will be described.

First, when the optical system 35 is located at the wide angle end (refer to FIG. 5 or FIG. 6), the first group frame 50 is disposed inside the driving frame 51, in a state where the cam pins 104a to 104c engage with the end portion of the conducting grooves 119a to 119c of the driving frame 51 on the Y axis direction positive side. Furthermore, the driving frame 51 is disposed inside the stationary frame 52, in a state where the cam pins 111a to 111c engage with the end portion of the conducting grooves 131a to 131c of the stationary frame 52 on the Y axis direction positive side. In proximity to the end portion of the straight-movement grooves 129a and 129b of the stationary frame 52 on the Y axis direction negative side, end portions 107a and 107b of the first group frame 50 are engaged.

At this time, the Y axis direction position of the end portions of each of the cylindrical portion 102 of the first group frame 50 on the Y axis direction positive side, the cylindrical portion 110 of the driving frame 51, and the cylindrical portion 125 of the stationary frame 52 substantially coincides with each other, and the arrangement of each configuration of the first group frame unit 41 is the same as the arrangement (retracting state) of the first group frame unit 41 when not using the imaging device 2.

Next, when the driving gear 53 is driven to rotate in the clockwise direction when viewed from the Y axis direction positive side in the by the motor unit 32 (refer to FIG. 9), the driving in the counterclockwise direction when viewed from the Y axis direction positive side is transmitted to the driving frame 51 via the ring gear 112 meshing with the driving gear 53. A cylinder cam mechanism is formed between the driving frame 51 and the stationary frame 52. For this reason, when the driving frame 51 is driven to rotate, the driving frame 51 rotates around the first optical axis A1 with respect to the stationary frame 52, and moves in the direction along the first optical axis A1 (the Y axis direction positive side). In addition, a cylinder cam mechanism is formed between the driving frame 51 and the first group frame 50. Furthermore, the relative rotation of the first group frame 50 around the first optical axis A1 with respect to the stationary frame 52 is restricted by the engagement between the first group frame 50 and the stationary frame 52. As a result, when the driving frame 51 is driven to rotate, the first group frame 50 relatively moves in the first optical axis A1 direction (the Y axis direction positive side) with respect to the driving frame 51.

Finally, when the optical system 35 is located at the telephoto end, most part of the cylindrical portion 102 of the first group frame 50 extends to the Y axis direction positive side compared to the cylindrical portion 110 of the driving frame 51, under the state where the cam pins 104a to 104c engage with the end portions of the sloped grooves 120a to 120c of the driving frame 51 on the Y axis direction positive side. Furthermore, most part of the cylindrical portion 110 of the driving frame 51 extends to the Y axis direction positive side compared to the cylindrical portion 125 of the stationary frame 52, under the state where the cam pins 111a to 111c engages with the end portion of the sloped grooves 132a to 132c of the stationary frame 52 on the Y axis direction positive side. In other words, compared to the case which the optical system 35 is located at the wide angle end, when the optical system 35 is located at the telephoto end, the first lens group G1 moves to the Y axis direction positive side by the sum of the moving distance of the cylinder cam mechanism provided between the first group frame 50 and the driving frame 51 and the moving distance of the cylinder cam mechanism provided between the driving frame 51 and the stationary frame 52. Furthermore, in this state, the end portions 107a and 107b of the first group frame 50 are located in proximity to the end portion of the straight-movement grooves 129a and 129b on the Y axis direction positive side. In other words, the first lens group G1 moves in the first optical axis A1 direction substantially by the length of the straight-movement grooves 129a and 129b in the Y axis direction, compared to the case which the optical system 35 is located at the wide angle end.

In addition, while the above described first group frame unit 41 moves from the wide angle end to the telephoto end, a space is secured on the Y axis direction negative side of the cylindrical portion 125 of the stationary frame 52 and on the X axis direction positive side of the extension portions 126a and 126b, because each member of the first group frame unit 41 does not enter. For this reason, the third group frame unit 44 which will be described later can enter into this space.

4.3: Base Unit 4.3.1: Configuration of the Base Unit

The configuration of the base unit 43 will be described with reference to FIG. 11.

Figure 11:
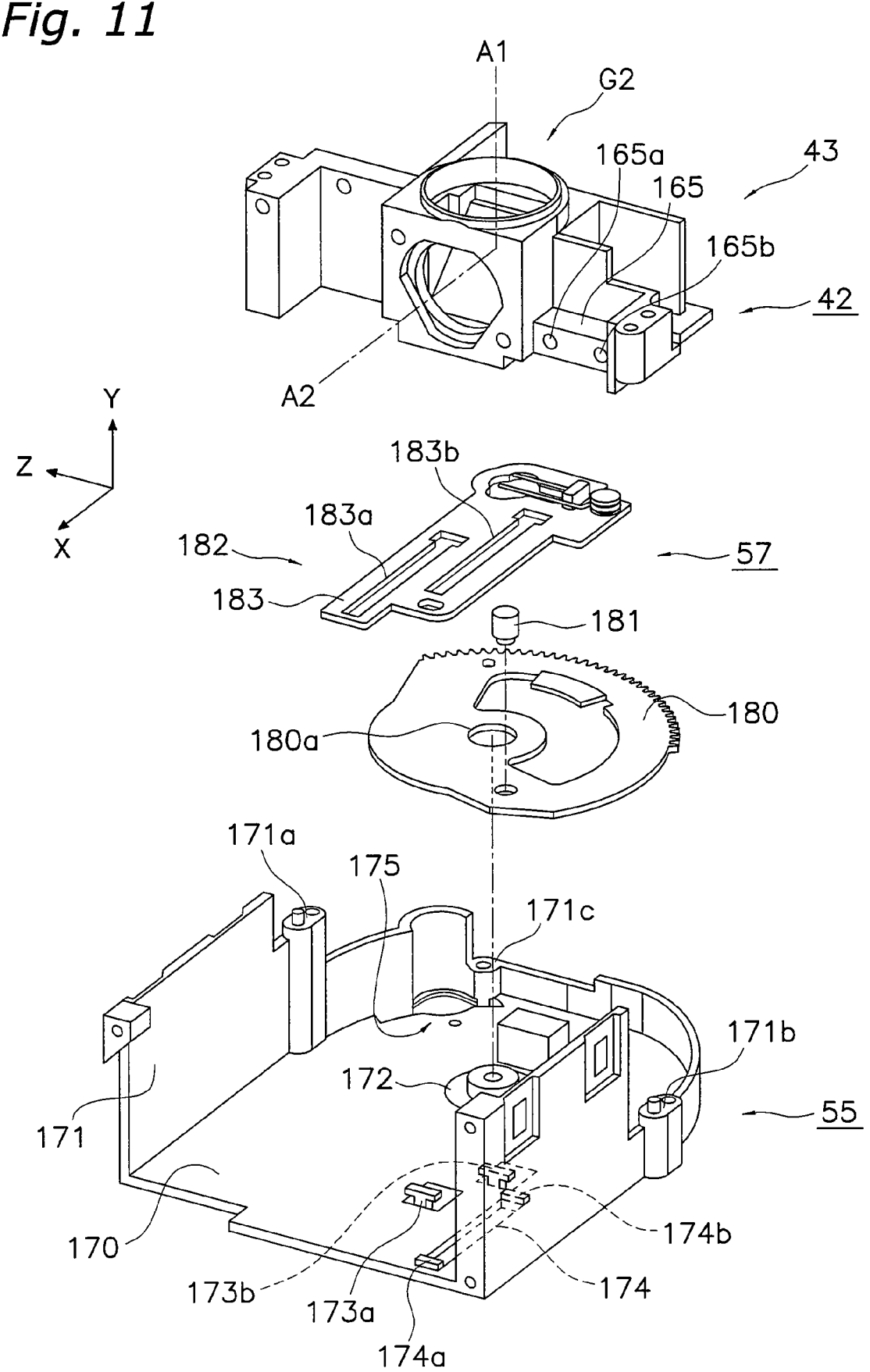
FIG. 11 is an exploded perspective view of the base unit.

FIG. 11 is an exploded perspective view of the base unit 43. The base unit 43 retains the second lens group G2 bending the light flux incident along the first optical axis A1 to the direction along the second optical axis perpendicular to the first optical axis A1. In addition, the base unit 43 includes a mechanism for moving the third lens group G3 (refer to FIGS. 5 to 8) making up the zoom lens system together with the first lens group G1 in the second optical axis A2 direction.

FIG. 11 shows the second group frame unit 42, the base 55 fixedly supporting the second group frame unit 42 from the Y axis direction negative side, and the third group movement mechanism 57 attached to the base 55 and disposed between the second group frame unit 42 and the base 55 in the Y axis direction, among the configurations of the base unit 43 described with reference to FIG. 9.

Detailed configurations of the second group frame unit 42, the base 55, and the third group movement mechanism 57 will be described below.

4.3.2: Configuration of the Second Group Frame Unit

The configuration of the second group frame unit 42 will be described with reference to FIGS. 11 to 13.

Figure 12:
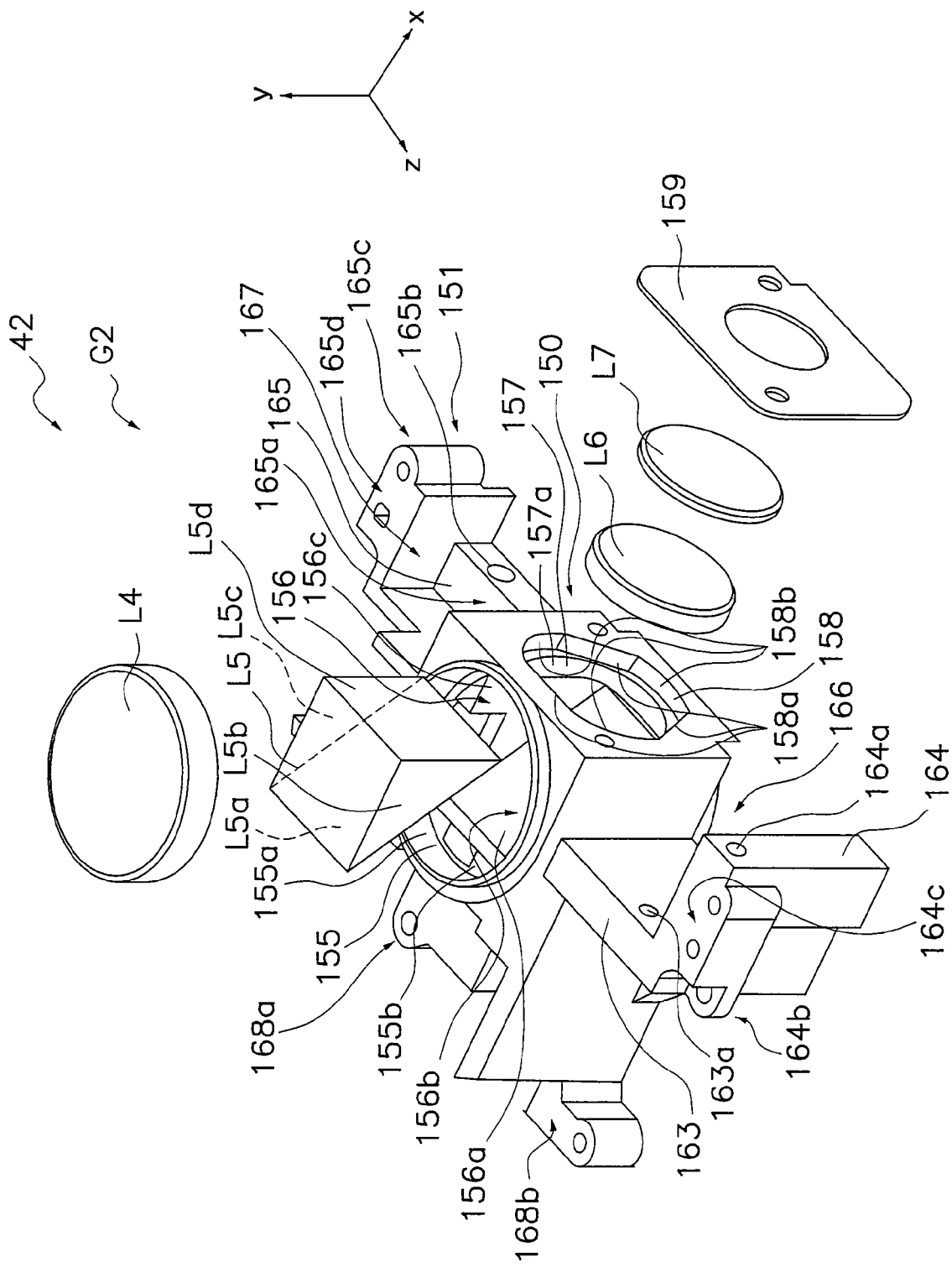
FIG. 12 is an exploded perspective view of the second group frame unit.

FIG. 12 is an exploded perspective view of the second group frame unit 42.

Figure 13:
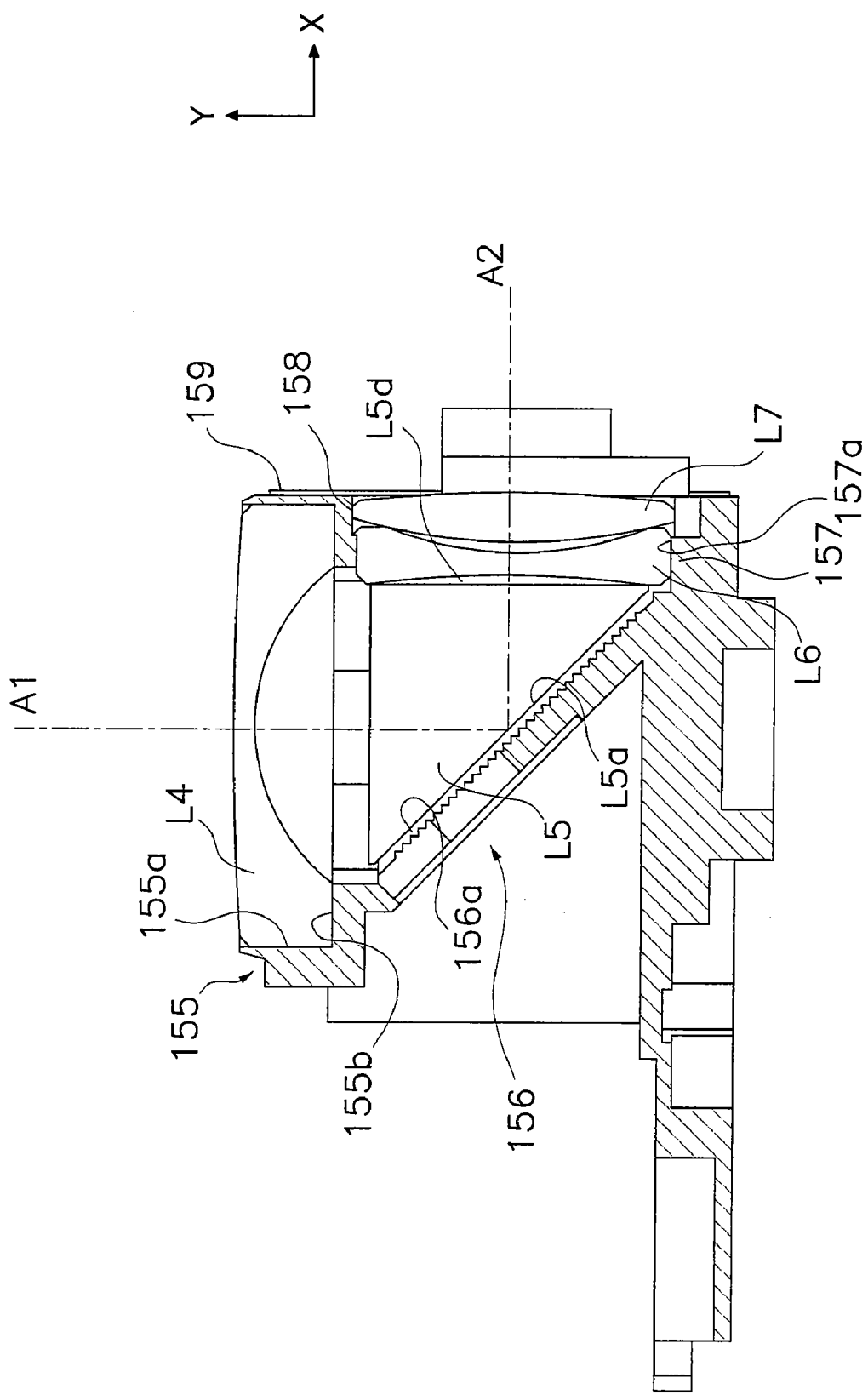
FIG. 13 is a sectional view of the second group frame unit.

FIG. 13 is a sectional view of the second group frame unit 42 in a plan including the first optical axis A1 and the second optical axis A2.

As shown in FIG. 12, the second group frame unit 42 includes the second lens group G2, the second group frame 150 retaining the second lens group G2, and a support portion 151 supporting the second group frame 150 and attached to the base 55.

Since details on the second lens group G2 have been described with reference to FIGS. 5 to 8, a description thereof will be omitted here.

The second group frame 150 is mainly made up of a fourth lens retaining frame 155 retaining the fourth lens L4, a prism retaining frame 156 retaining the prism L5, a sixth lens retaining frame 157 retaining the sixth lens L6, and a seventh lens retaining frame 158 retaining the seventh lens L7.

The fourth lens retaining frame 155 has a radius substantially coincides with the radius of the fourth lens L4, and has a circular inner peripheral surface 155a extending in the Y axis direction. The fourth lens L4 is disposed to fit in the inner peripheral surface 155a, and fixed by an adhesive or the like. In addition, on the inner peripheral side of the end portion of the inner peripheral surface 155a on the Y axis direction negative side, a support surface 155b (refer to FIG. 13) which is perpendicular to the Y axis and supports the fourth lens L4 toward the Y axis direction positive side is formed. The fourth lens L4 is disposed so that the surface thereof on the Y axis direction negative side contacts with this support surface 155b, and is positioned in the Y axis direction (first optical axis A1 direction).

The prism retaining frame 156 is a frame body interiorly accommodating the prism L5 and opening in the first optical axis A1 direction and the second optical axis A2 direction, and is formed integrally with the fourth lens retaining frame 155 on the Y axis direction negative side thereof. Inside the prism retaining frame 156, a sloped surface 156a (refer to FIG. 13) disposed to be opposite to the reflecting surface L5a (refer to FIG. 13) of the prism L5 and downward inclined at forty five degrees toward the X axis direction positive side, and opposed surfaces 156b and 156c extending to perpendicularly intersect with the Z axis from the both ends of the sloped surface 156a in the Z axis direction and disposed to be opposite to the upper surface L5b and the bottom side L5c of the prism L5 respectively are formed. The prism L5 is accommodated and fixed by an adhesive or the like in the space formed in the prism retaining frame 156 by the sloped surface 156a and the opposed surfaces 156b and 156c.

The sixth lens retaining frame 157 is formed integrally with the prism retaining frame 156 on the X axis direction positive side of the prism retaining frame 156. The sixth lens retaining frame 157 has a radius substantially coincides with the radius of the sixth lens L6, and has a circular inner peripheral surface 157a extending in the X axis direction. The sixth lens L6 is disposed to fit in the inner peripheral surface 157a and fixed by an adhesive or the like. In addition, an output surface L5d of the prism L5 is disposed on the X axis direction negative side of the inner peripheral surface 157a (refer to FIG. 13). The sixth lens L6 is disposed so that the surface thereof on the X axis direction negative side contacts with the output surface L5d, and is positioned in the X axis direction (second optical axis A2 direction).

The seventh lens retaining frame 158 is formed integrally with the sixth lens retaining frame 157 on the X axis direction positive side of the sixth lens retaining frame 157. The seventh lens retaining frame 158 includes sloped surfaces 158a having a portion of each of the side surfaces of an imaginary equilateral-triangular prism having the seventh lens L7 as the inscribed circle, and arc-shaped surfaces 158b connecting smoothly with each of the sloped surfaces around the second optical axis A2. The seventh lens L7 is disposed so that the outer peripheral surface thereof contacts with each of the sloped surfaces 158a, and fixed by an adhesive. In addition, the surface of the sixth lens L6 on the X axis direction positive side is disposed on the X axis direction negative side of the seventh lens L7 (refer to FIG. 13). The seventh lens L7 is disposed so that the surface thereof on the X axis direction negative side contacts with the surface of the sixth lens L6 on the X axis direction positive side, and is positioned in the X axis direction (second optical axis A2 direction).

On the end surface of the seventh lens retaining frame 158 on the X axis direction positive side, an opening member 159 which is a plate member having an opening at the center portion is fixed by a screw or the like. The opening member 159 is a member for blocking off unwanted light going toward unwanted directions, out of the light outputted from the second group frame unit 42 along the second optical axis A2. The opening member 159 has a circular opening disposed substantially at the center, and is attached to the seventh lens retaining frame 158 so that the center of the opening coincides with the second optical axis A2 (refer to FIG. 13). Furthermore, the edge of the opening of the opening member 159 supports the seventh lens L7 to the X axis direction negative side.

The support portion 151 is mainly formed by a first member 163 formed toward the Z axis direction positive side from the center position of the second group frame 150 in the X axis direction and having a surface facing the X axis direction positive side, a second member 164 extending to the X axis direction positive side at the end portion of the first member 163, a third member 165 having a surface facing the X axis direction positive side and formed on the Z axis direction negative side of the second group frame 150, and fixing portions 168a and 168b formed at the end portion on the X axis direction negative side.

The first member 163 includes an hole portion 163a for fitting and fixing the fourth group guide pole 73 (refer to FIG. 9) on the surface facing the X axis direction positive side.

The second member 164 includes an hole portion 164a at substantially the same position in the Y axis direction as the hole portion 163a on the surface facing the X axis direction positive side, for fitting and fixing the third group guide pole 71 (refer to FIG. 9). In addition, on the end portion of the second member 164 on the Z axis direction positive side, a fixing portion 164b is formed for fixing the second group frame unit 42 to the base 55, and a fixing portion 164c is formed for fixing the first group frame unit 41 to the second group frame unit 42. The fixing portion 164b is positioned with respect to the fixing portion 171a formed on the base 55, and is fixed by a screw or the like. The fixing portion 164c is positioned with respect to the fixing portion 145a formed on the stationary frame 52 of the first group frame unit 41, and is fixed by a screw or the like.

As described above, the first member 163 is formed toward the Z axis direction positive side from the center position of the second group frame 150 in the X axis direction. The second member is formed toward the X axis direction positive side at the end portion of the first member 163. For this reason, between the surface of the second group frame 150 on the Z axis direction positive side and the surface of the second member on the Z axis direction negative side, a concaved space 166 is secured on the X axis direction negative side with respect to the end surface of the second group frame 150 on the X axis direction positive side. A aperture actuator 202 protruding to the X axis direction negative side of a shutter unit 60 (which will be described later) can enter into this concaved space 166. This will be described later with reference to FIGS. 27 to 29.

The third member 165 is formed toward the Z axis direction negative side from near the end portion of the second group frame 150 on the Y axis direction negative side, and includes an opening portion 165a (refer to FIG. 11) for fitting and fixing the fourth group guide pole 72, and an opening portion 165b for fitting and fixing the third group guide pole 70 in the order from the Z axis direction positive side on the surface facing the X axis direction positive side. In addition, a fixing portion 165c for fixing the second group frame unit 42 to the base 55 and a fixing portion 165d for fixing the first group frame unit 41 to the second group frame unit 42 are formed on the end portion of the third member 165 on the Z axis direction negative side. The fixing portion 165c is positioned with respect to the fixing portion 171b formed on the base 55, and is fixed by a screw or the like. The fixing portion 165d is positioned with respect to the fixing portion 145e formed on the stationary frame 52 of the first group frame unit 41, and is fixed by a screw or the like.

As described above, the third member 165 is formed toward the Z axis direction negative side from near the end portion of the second group frame 150 on the Y axis direction negative side. For this reason, a concaved space 167 adjacent to the second group frame 150 on the Z axis direction negative side is secured on the Y axis direction positive side of the third member 165. A shutter actuator 203 protruding on the X axis direction negative side of a shutter unit 60 (described later) can enter into this concaved space 167. This will be described later with reference to FIGS. 27 to 29.

The fixing portion 168a is positioned and fixed with respect to a fixing portion provided on the rear side of the motor unit 32.

The fixing portion 168b is positioned with respect to the fixing portion 171c formed on the base 55, and fastened by a screw or the like.

4.3.3: Configuration of the Base

The configuration of the base 55 will be described with reference to FIG. 11.

The base 55 mainly includes a rear side 170 including the rear side of the lens barrel 31, and a side surface 171 extending to the Y axis direction positive side from the rear side 170.

On the rear side 170, a bearing portion 172 for rotatably supporting a center opening 180a of the ring gear 180 of the third group movement mechanism 57 (described later), guide pins 173a and 173b for guiding the translational movement of the rod unit 182 of the third group movement mechanism 57 (described later) to the X axis direction, a restricting portion 174 restricting the movement of the rod unit 182 to the X axis direction, and a driving shaft accommodating portion 175 accommodating the driving gear 53 are formed.

The bearing portion 172 is a cylindrical convex portion protruding to the Y axis direction positive side and is inserted into the center opening 180a provided in the rotation center of the ring gear 180, and supports the ring gear 180 to be rotatable.

The guide pins 173a and 173b are members protruding to the Y axis direction positive side and formed to have a predetermined space in both the X axis direction and the Z axis direction, and are inserted into guide grooves 183a and 183b respectively formed along the longitudinal direction of the rod unit 182, and guide the movement of the rod unit 182 to the X axis direction.

The restricting portion 174 is a longitudinal groove with a base and extends in the X axis direction. End portions 174a and 174b rising up to the Y axis direction positive side from the bottom of the groove of the restricting portion 174 are formed on the two ends thereof in the X axis direction.

The driving shaft accommodating portion 175 accommodates the driving gear 53 of the first group frame unit 41 and the fixing portion 145c rotatably supporting the driving gear 53.

Fixing portions 171a to 171c for fixing the second group frame unit 42 to the base 55 are formed on the side surface 171. The fixing portions 171a, 171b, and 171c are positioned with respect to the fixing portions 164b, 165c, and 168b of the second group frame unit 42 respectively, and are fixed by screws or the like.

4.3.4: Configuration of the Third Group Movement Mechanism

The configuration of the third group movement mechanism 57 will be described with reference to FIG. 11. The third group movement mechanism 57 is a mechanism for moving the third group frame unit 44 to the direction along the second optical axis A2, and is driven by receiving the driving from the motor unit 32 (refer to FIG. 9).

The third group movement mechanism 57 is mainly made up of the ring gear 180 for converting the rotational drive transmitted from the motor unit 32 via the driving gear 53 into a drive to the direction along the second optical axis A2, the rod unit 182 in which the translational movement thereof in the direction along the second optical axis A2 is possible integrally with the third group frame unit 44, and a ring gear pin 181 functionally coupling the ring gear 180 and the rod unit 182.

The ring gear 180 is a plate member in which teeth are formed in an arc on the outer periphery thereof to mesh with the driving gear 53, and rotates within a predetermined rotational angle range. The ring gear 180 includes a center opening 180a in the rotational center thereof, and is attached to the base 55 by fitting the center opening 180a to the bearing portion 172 of the base 55.

The ring gear pin 181 is a cylindrical member having a predetermined length in the Y axis direction, and the end portion thereof on the Y axis direction negative side is fixed to the ring gear 180 by caulking or the like.

The rod unit 182 is functionally coupled to the ring gear 180 by engaging with the ring gear pin 181, and includes the slider crank mechanism together with the ring gear 180.

Figure 14:
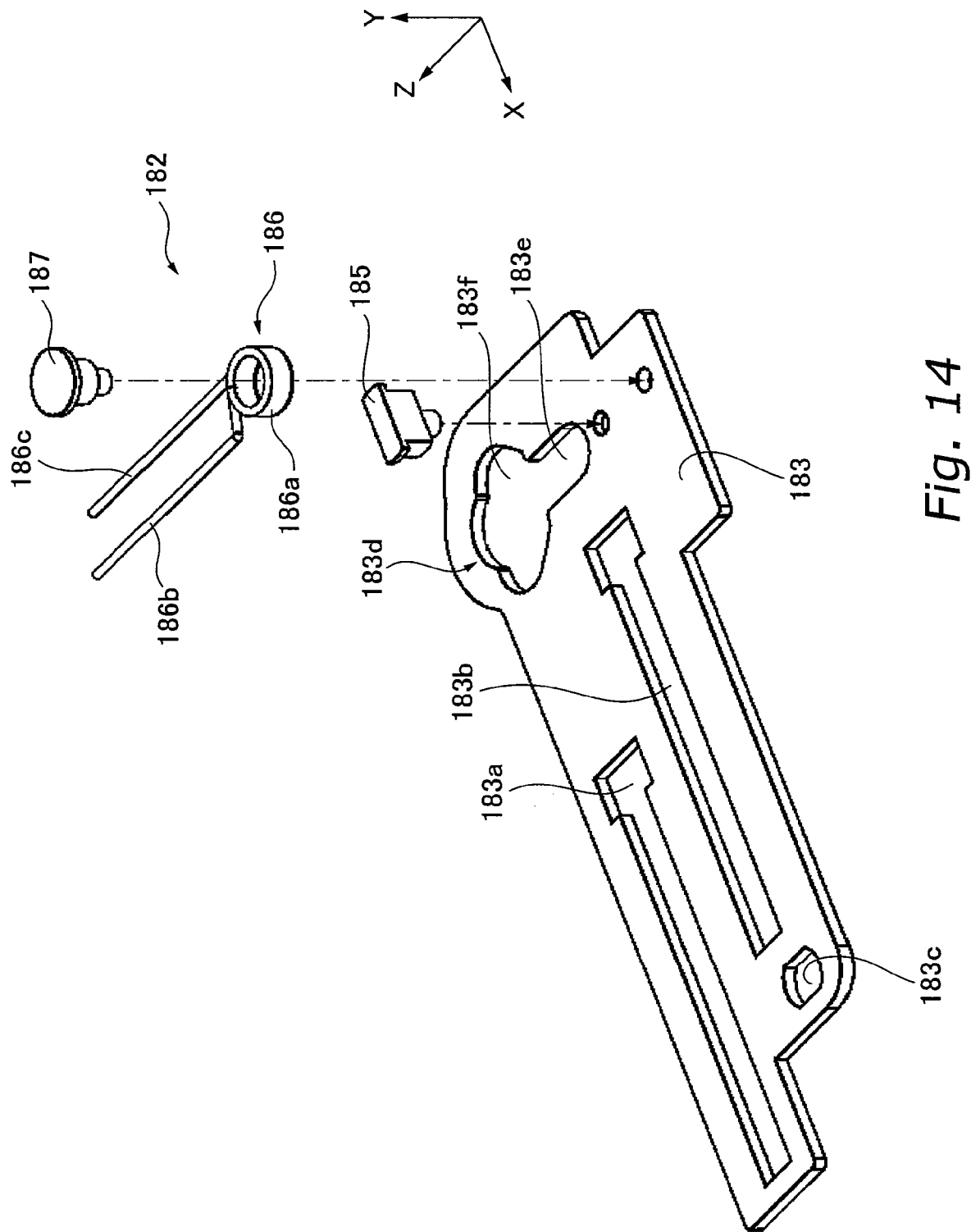
FIG. 14 is an exploded perspective view of the rod unit.

The configuration of the rod unit 182 will be described with reference to FIG. 14. FIG. 14 is an exploded perspective view of the rod unit 182.

As shown in FIG. 14, the rod unit 182 is mainly made up of a rod 183, a crimp spring 186 fixed to the rod 183, a spring pin 187 for fixing the crimp spring 186 to the rod 183, and a crimp spring restricting pin 185 restricting the crimp movement of the crimp spring 186. The elastic coupling mechanism is made up of the crimp spring 186, the spring pin 187, and the crimp spring restricting pin 185 elastically coupling the ring gear 180 and the rod unit 182.

The rod 183 is a plate member which is long in the X axis direction. Two guide grooves 183a and 183b extending in the longitudinal direction, a through-hole 183c formed on the X axis direction positive side of the guide groove 183b, and an engagement opening 183d formed on the X axis direction negative side of the guide grooves 183a and 183b are formed in the rod 183.

As described with reference to FIG. 11, guide pins 173a and 173b formed on the base 55 are inserted in the guide grooves 183a and 183b, respectively. The guide grooves 183a and 183b are formed to be spaced at the same distance in the Z axis direction as the distance between the guide pins 173a and 173b in the Z axis direction. As a result, the movement of the rod 183 is restricted only to a translational movement in the X axis direction.

A protrusion portion 65 of the third group frame unit 44 which will be described later is inserted from the Y axis direction positive side into the through-hole 183c. The protrusion portion 65 is inserted so that the end thereof protrudes out to the Y axis direction negative side of the rod 183.

The ring gear pin 181 is inserted from the Y axis direction negative side into the engagement opening 183d. The engagement opening 183d includes first engagement opening 183e extending in the Z axis direction and having a larger width in the X axis direction than the diameter of the ring gear pin 181, and a second engagement opening 183f formed to be continuous with the first engagement opening 183e on the Z axis direction positive side thereof and having a larger width in the X axis direction than the first engagement opening 183e.

The crimp spring 186 is a torsion coil spring or the like made up of a coil 186a and two arm portions 186b and 186c which extend from the coil 186a. Each of the arm portions 186b and 186c is formed to be able to support the load in the direction toward each other when the crimp spring 186 elastically deformed to involve the coil 186a.

The spring pin 187 is a member inserted into the coil 186a of the crimp spring 186 and having one end thereof fitted and fixed to an opening formed on the rod 183, and fixes the crimp spring 186 to the rod 183. The spring pin 187 is disposed on the Z axis direction negative side of the first engagement opening 183e.

The crimp spring restricting pin 185 is a member for maintaining the crimp spring 186 in a predetermined elastically deformed state, is disposed between the arm portions 186b and 186c, and receives the crimping forces in directions toward the other arm portion 186c, 186b respectively from each of the arm portions 186b and 186c. The crimp spring restricting pin 185 is disposed on the Z axis direction negative side of the first engagement opening 183e. In addition, the X axis direction width of the contact surface with the crimp spring 186 on the crimp spring restricting pin 185 is wider than the X axis direction width of the first engagement opening 183e.

Figure 15:
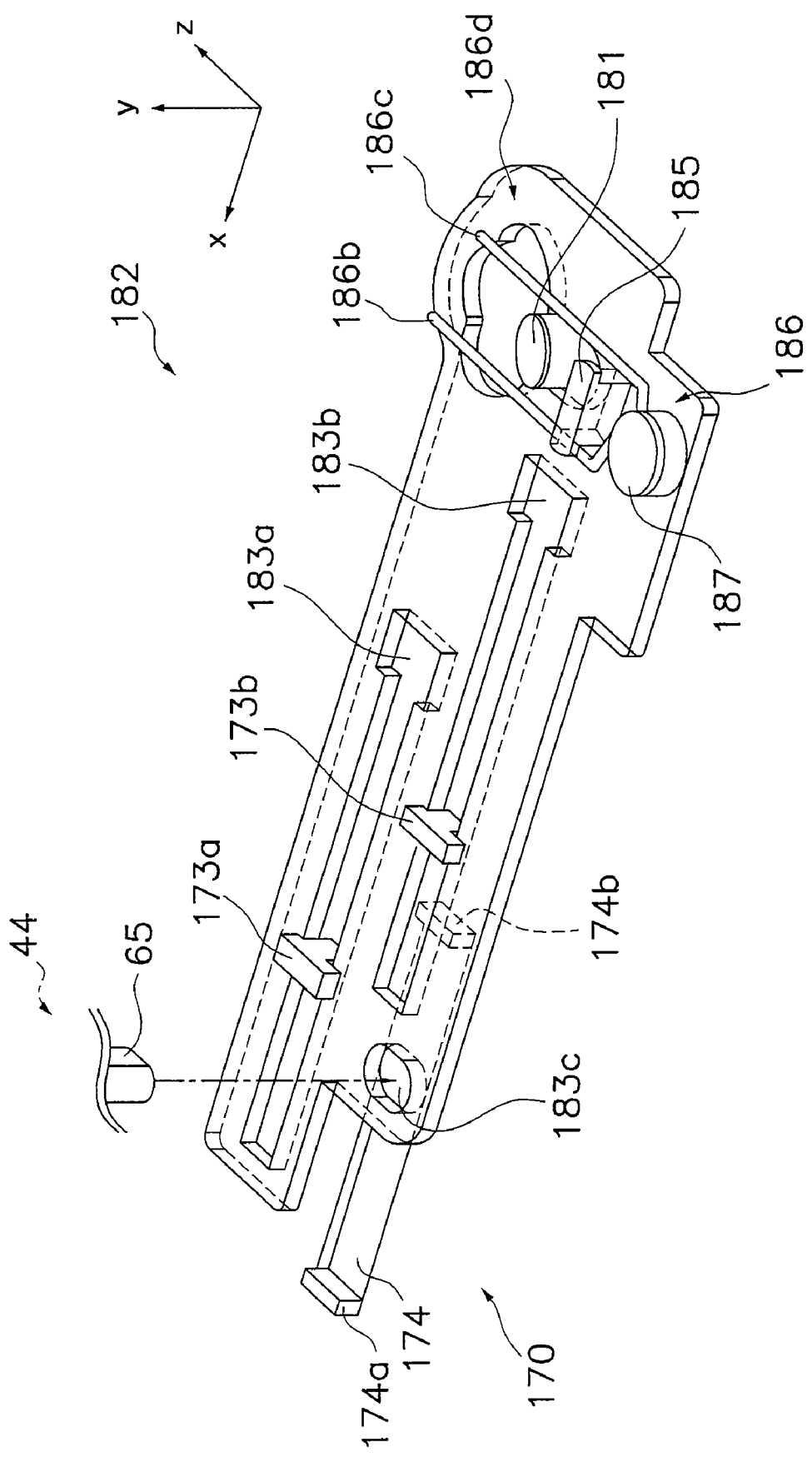
FIG. 15 is a perspective view of the assembly of the rod unit.

The assembling state of the third group movement mechanism 57 will be described with reference to FIG. 15. FIG. 15 is a perspective view showing mainly the assembling state of the rod unit 182.

As shown in FIG. 15, in the rod unit 182, the crimp spring 186 is fixed to the rod 183 by the spring pin 187. In an elastically deformed state, the crimp spring 186 is fixed via the crimp spring restricting pin 185 between each of the arm portions 186b and 186c. In this attached state, the arm portion 186b located on the X axis direction positive side contacts with the surface of the crimp spring restricting pin 185 on the X axis direction positive side, which a crimping force acts toward the X axis direction negative side with respect to the crimp spring restricting pin 185. On the other hand, the arm portion 186c located on the X axis direction negative side contacts with the surface of the crimp spring restricting pin 185 on the X axis direction negative side, and applies a crimping force toward the X axis direction positive side with respect to the crimp spring restricting pin 185.

The ring gear pin 181 fixed to the ring gear 180 (refer to FIG. 11) is inserted from the Y axis direction negative side into engagement opening 183d of the rod unit 182, in the middle in the X axis direction between the arm portions 186b and 186c of the crimp spring 186. As a result, if the ring gear 180 is driven to rotate and the X axis direction position of the ring gear pin 181 changes, the rod 183 is driven in the X axis direction while the opening edge of the engagement opening 183d slides against the outer periphery of the ring gear pin 181.

Each of the guide pins 173a and 173b formed on the base 55 (refer to FIG. 11) is inserted from the Y axis direction negative side into the guide grooves 183a and 183b which extend in the X axis direction of the rod 183. As a result, the rod 183 receiving the drive is in translational movement in the X axis direction.

The through-hole 183c of the rod 183 is located to be opposed to the Y axis direction positive side of the restricting portion 174 formed on the base 55. The protrusion portion 65 of the third group frame unit 44 which will be described later is inserted from the Y axis direction positive side into the through-hole 183c. The end of the protrusion portion 65 protrudes out to the Y axis direction negative side of the rod 183, and furthermore, is inserted into the restricting portion 174.

Figure 16:
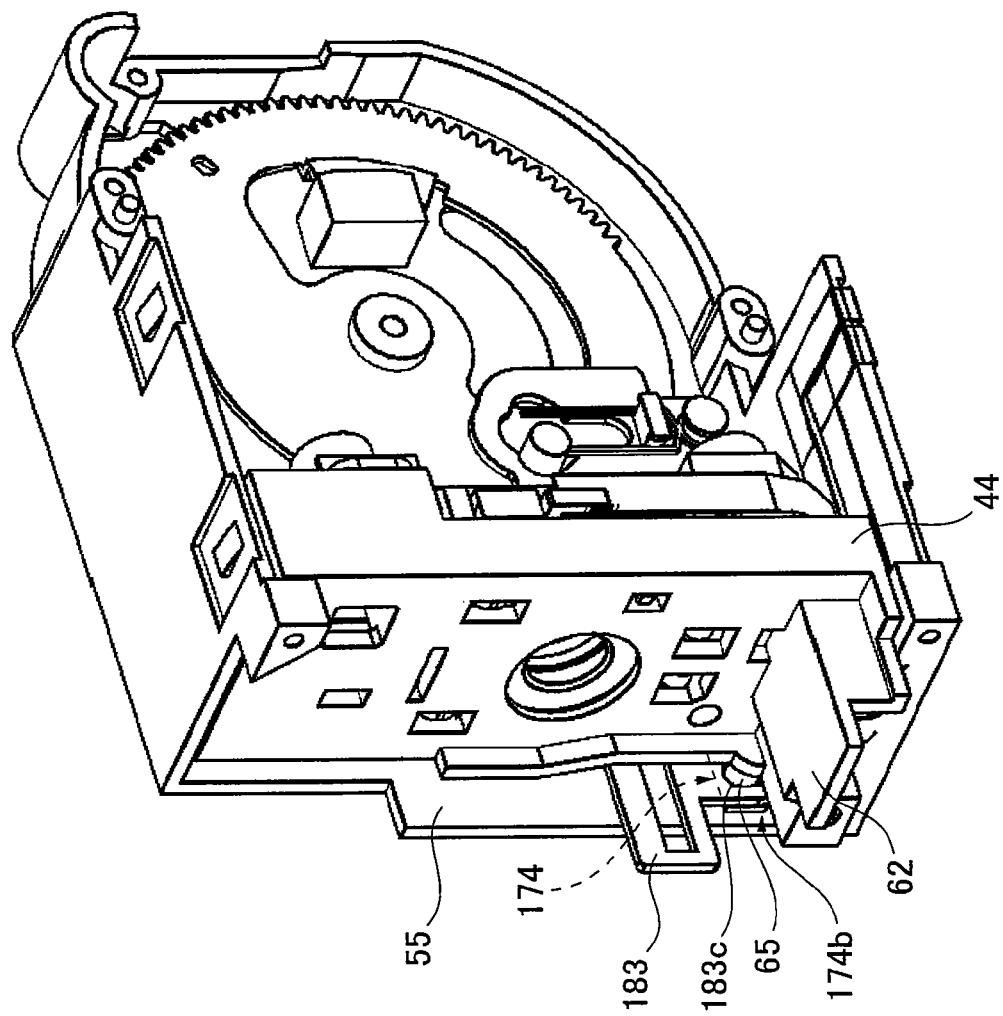
FIG. 16 is an perspective view showing the assembling state of the third group frame unit and the base unit.

FIG. 16 shows the engagement state of the protrusion portion 65 of the third group frame unit 44, the rod 183, and the restricting portion 174. As shown in the figure, the protrusion portion 65 protruding on the Y axis direction negative side formed on the third group frame 62 of the third group frame unit 44 is inserted into the through-hole 183c formed on the rod 183, and furthermore, the end thereof is inserted into the restricting portion 174 of the base 55.

As a result, the rod 183 is movable all the way to the position at which the protrusion portion 65 contacts with the end portion 174a on the X axis direction positive side, and is movable all the way to the position at which the protrusion portion 65 contacts with the end portion 174b on the X axis direction negative side (refer to FIG. 11 or FIG. 15).

4.3.5: Operation of the Base Unit

The operation of the base unit 43, in particular, the operation of the third group movement mechanism 57 will be described with reference to FIGS. 17 to 22.

Figure 17:
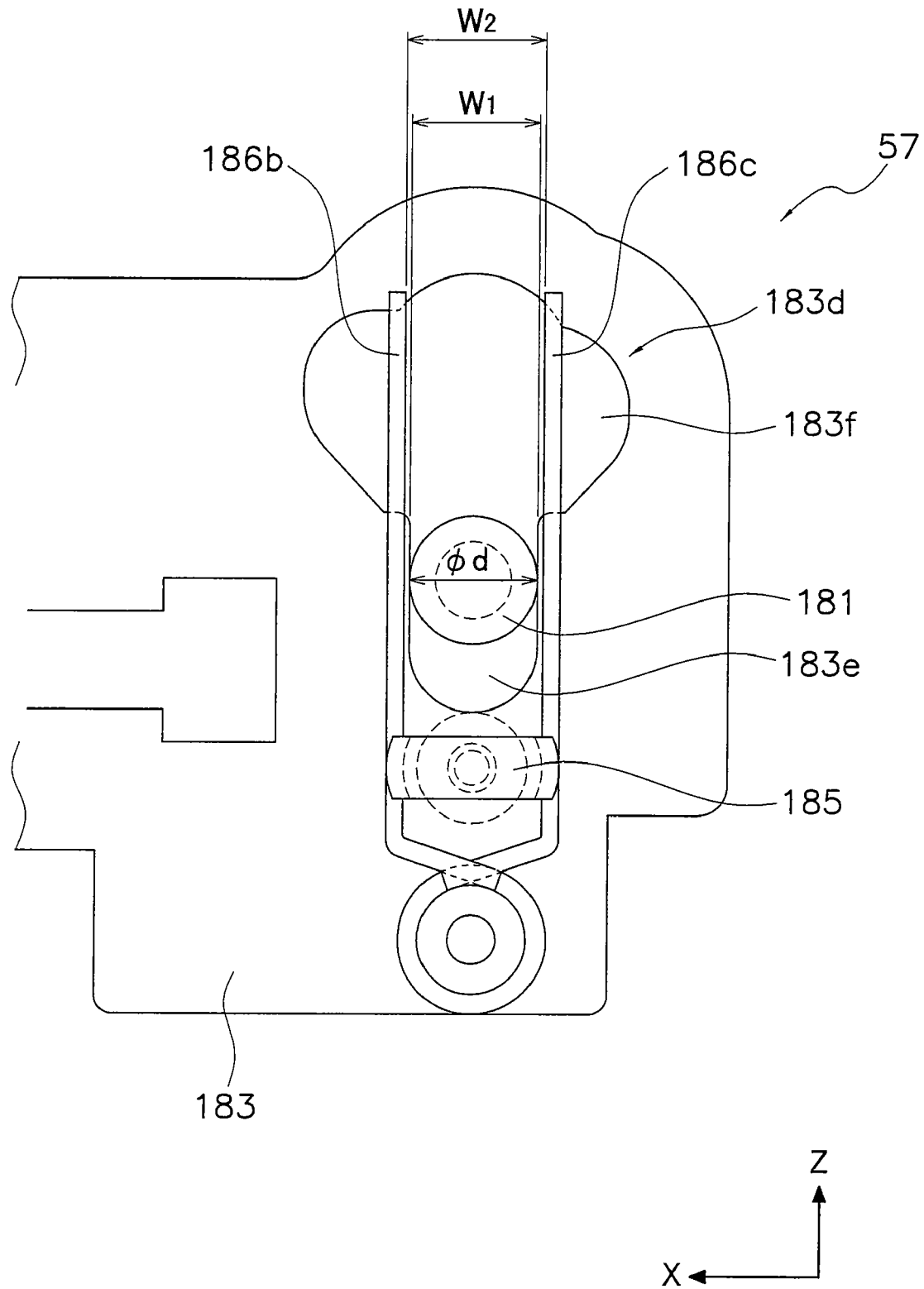
FIG. 17 is an illustration for describing the operation of the third group movement mechanism.

Out of the operations of the third group movement mechanism 57, the operation of the elastic coupling mechanism elastically coupling the ring gear 180 (refer to FIG. 11) and the rod 183 will be described with reference to FIG. 17. FIG. 17 shows the state where the ring gear pin 181 is inserted into the engagement opening 183d.

The X axis direction width W1 of the first engagement opening 183e of the engagement opening 183d is larger than the diameter d of the ring gear pin 181. Furthermore, the X axis direction width W2 of the contacting surfaces with the crimp spring 186 of the crimp spring restricting pin 185 is larger than the X axis direction width W1 of the first engagement opening 183e. Therefore, in the state where the ring gear pin 181 is inserted into the first engagement opening 183e, the arm portions 186b and 186c of the crimp spring 186 contact with the contacting surfaces on both ends in the X axis direction of the crimp spring restricting pin 185. Consequently, when the ring gear pin 181 is located in the first engagement opening 183e, the crimping force of the crimp spring 186 does not act on the ring gear pin 181.

On the other hand, when the ring gear pin 181 moves along the edge portion of the engagement opening 183d to the second engagement opening 183f having a width wider than the first engagement opening 183e in the X axis direction, the ring gear pin 181 contacts the edge portion of the second engagement opening 183f, and contacts the arm portion 186b or the arm portion 186c of the crimp spring 186. Consequently, when the ring gear pin 181 is located in the second engagement opening 183f, the crimping force of the crimp spring 186 acts on the ring gear pin 181.

More specifically, when the ring gear pin 181 is located on the X axis direction positive side of the second engagement opening 183f, the arm portion 186b on the X axis direction positive side is elastically deformed to the X axis direction positive side by the ring gear pin 181, and the arm portion 186b separates from the contacting surface of the crimp spring restricting pin 185 on the X axis direction positive side. For this reason, the crimping force of the crimp spring 186 acts on the contacting surface of the crimp spring restricting pin 185 on the X axis direction negative side from the arm portion 186c on the X axis direction negative side. As a result, the rod 183 receives a pressing force in the direction toward the X axis direction positive side, via the crimp spring restricting pin 185.

On the other hand, when the ring gear pin 181 is located on the X axis direction negative side of the second engagement opening 183f, the arm portion 186c on the X axis direction negative side is elastically deformed to the X axis direction negative side by the ring gear pin 181, and the arm portion 186c separates from the contacting surface of the crimp spring restricting pin 185 on the X axis direction negative side. For this reason, the crimping force of the crimp spring 186 acts on the contacting surface of the crimp spring restricting pin 185 on the X axis direction positive side from the arm portion 186b on the X axis direction positive side. As a result, the rod 183 receives a pressing force in the direction toward the X axis direction negative side, via the crimp spring restricting pin 185.

The operation of the ring gear 180 and the rod 183 coupled by the above described elastic coupling mechanism will be described with reference to FIGS. 18 to 22.

Figure 18:
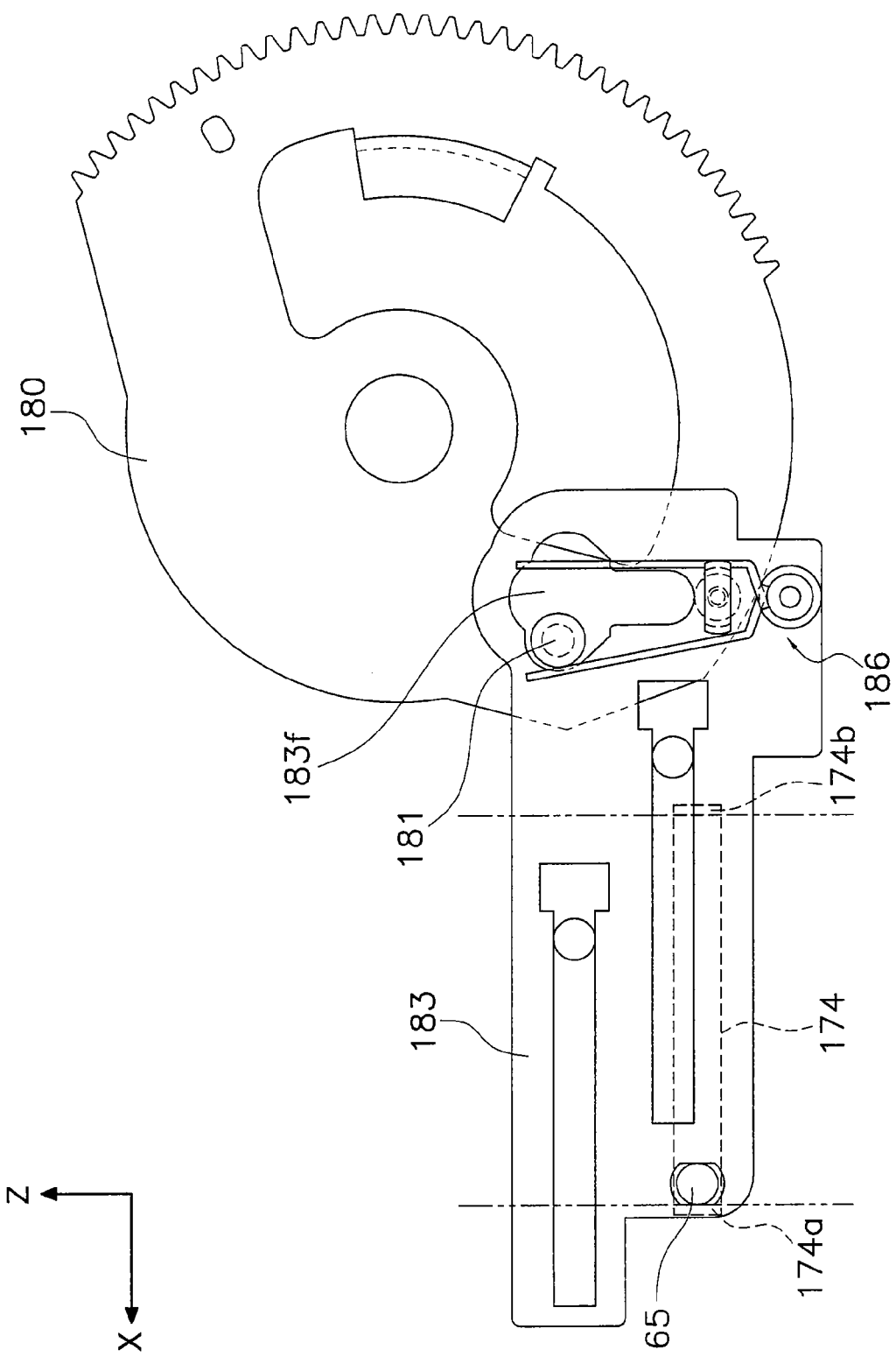
FIG. 18 is an illustration for describing the operation of the third group movement mechanism (wide angle end)
Figure 19:
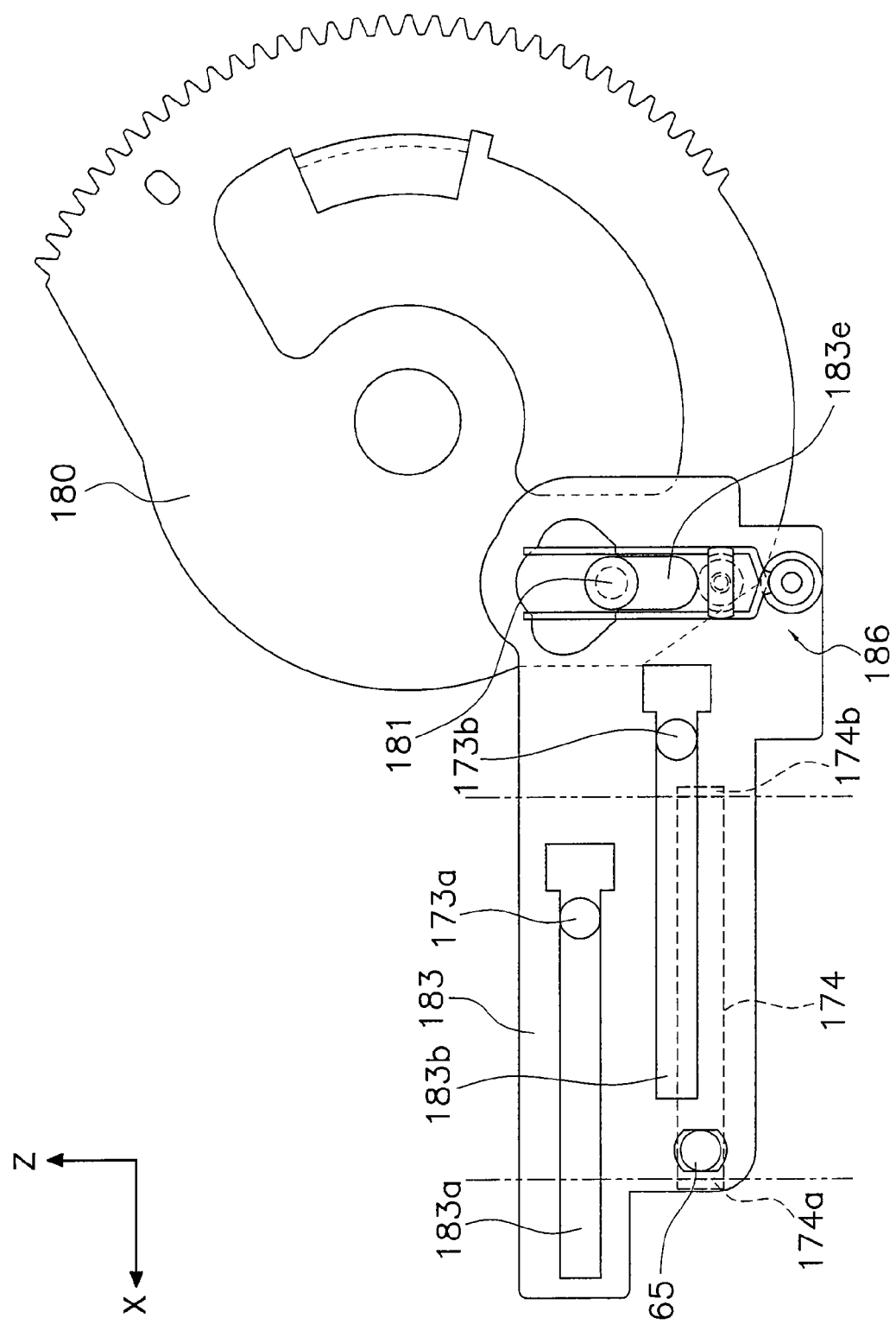
FIG. 19 is an illustration for describing the operation of the third group movement mechanism (wide angle side)
Figure 20:
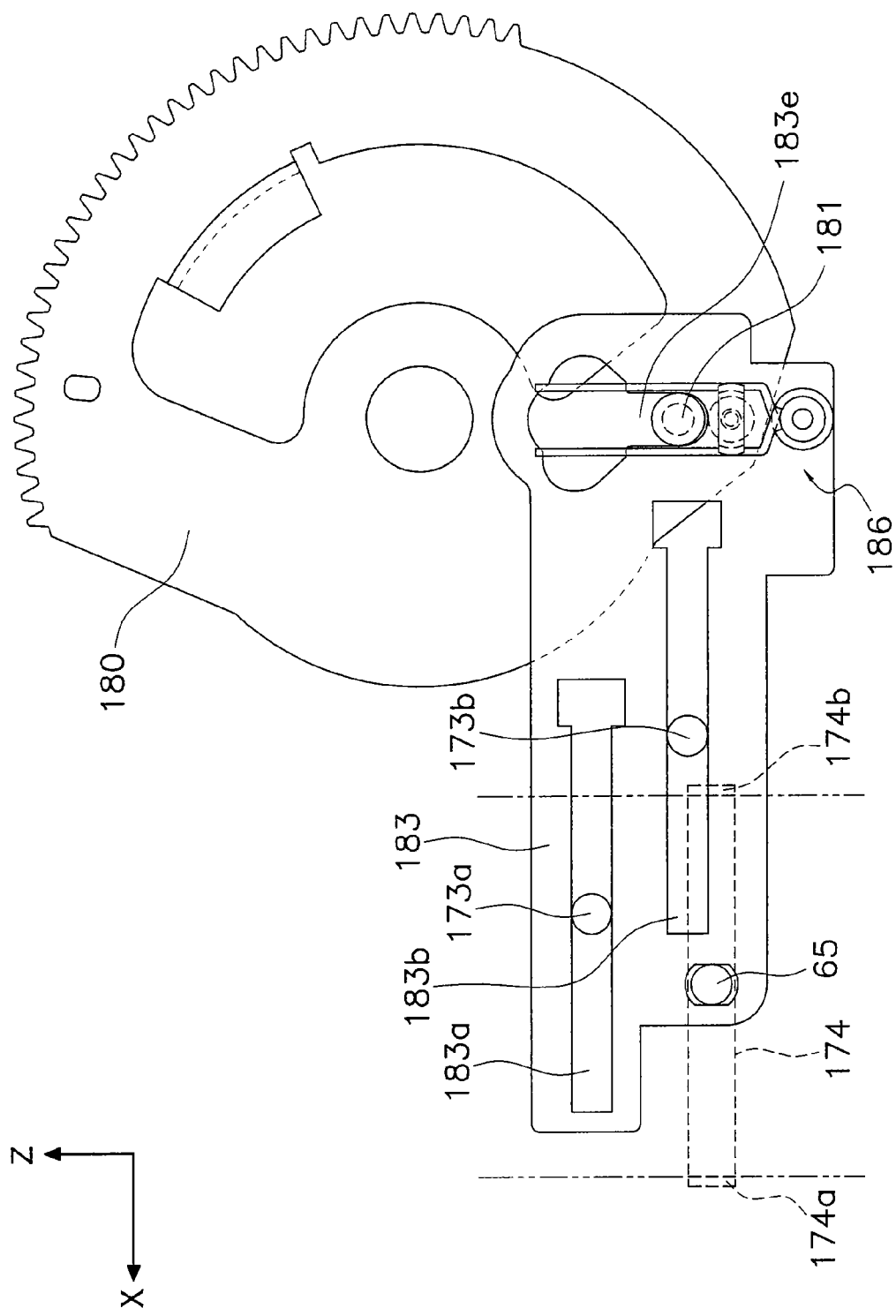
FIG. 20 is an illustration for describing the operation of the third group movement mechanism (normal position)
Figure 21:
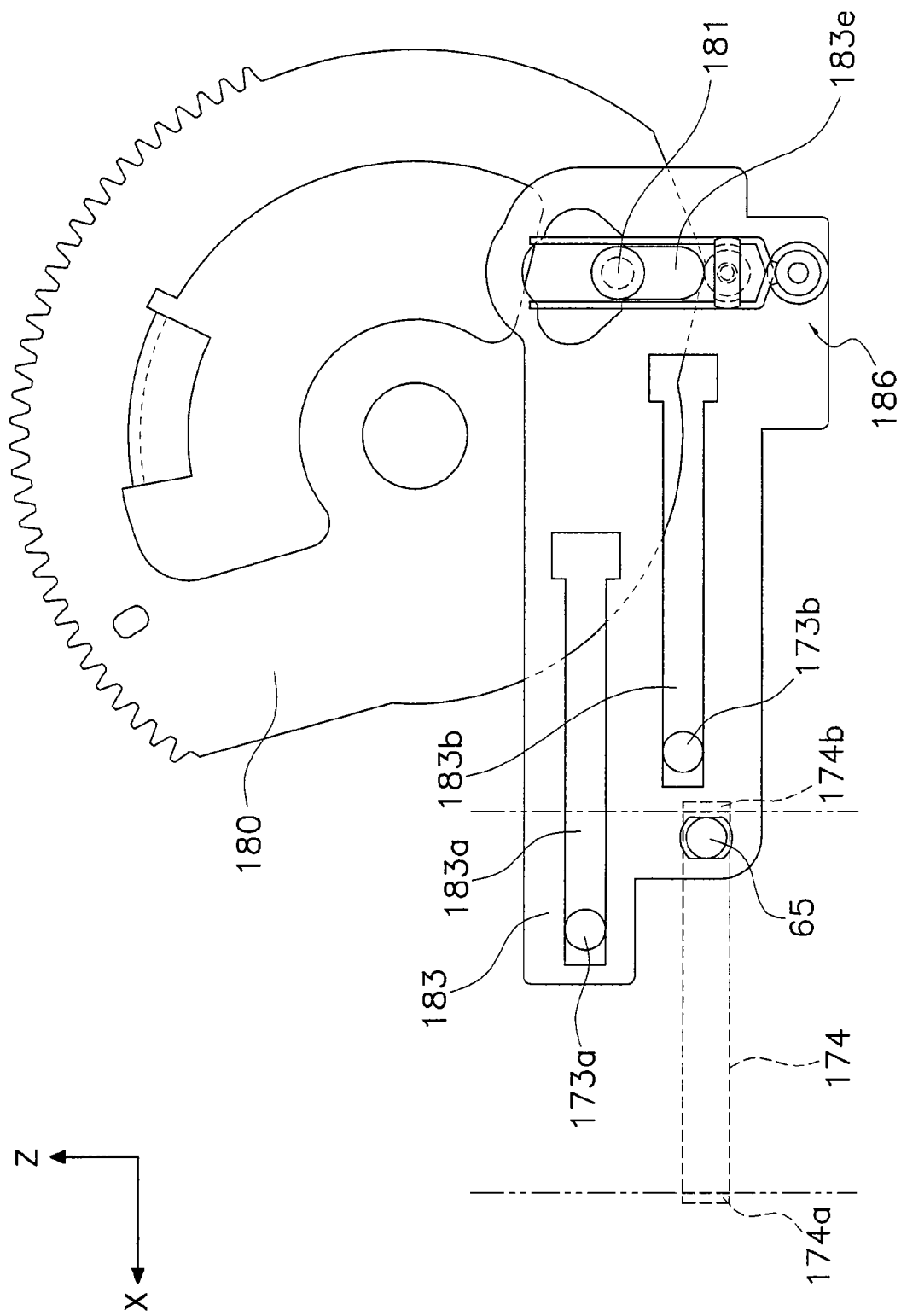
FIG. 21 is an illustration for describing the operation of the third group movement mechanism (telephoto side)
Figure 22:
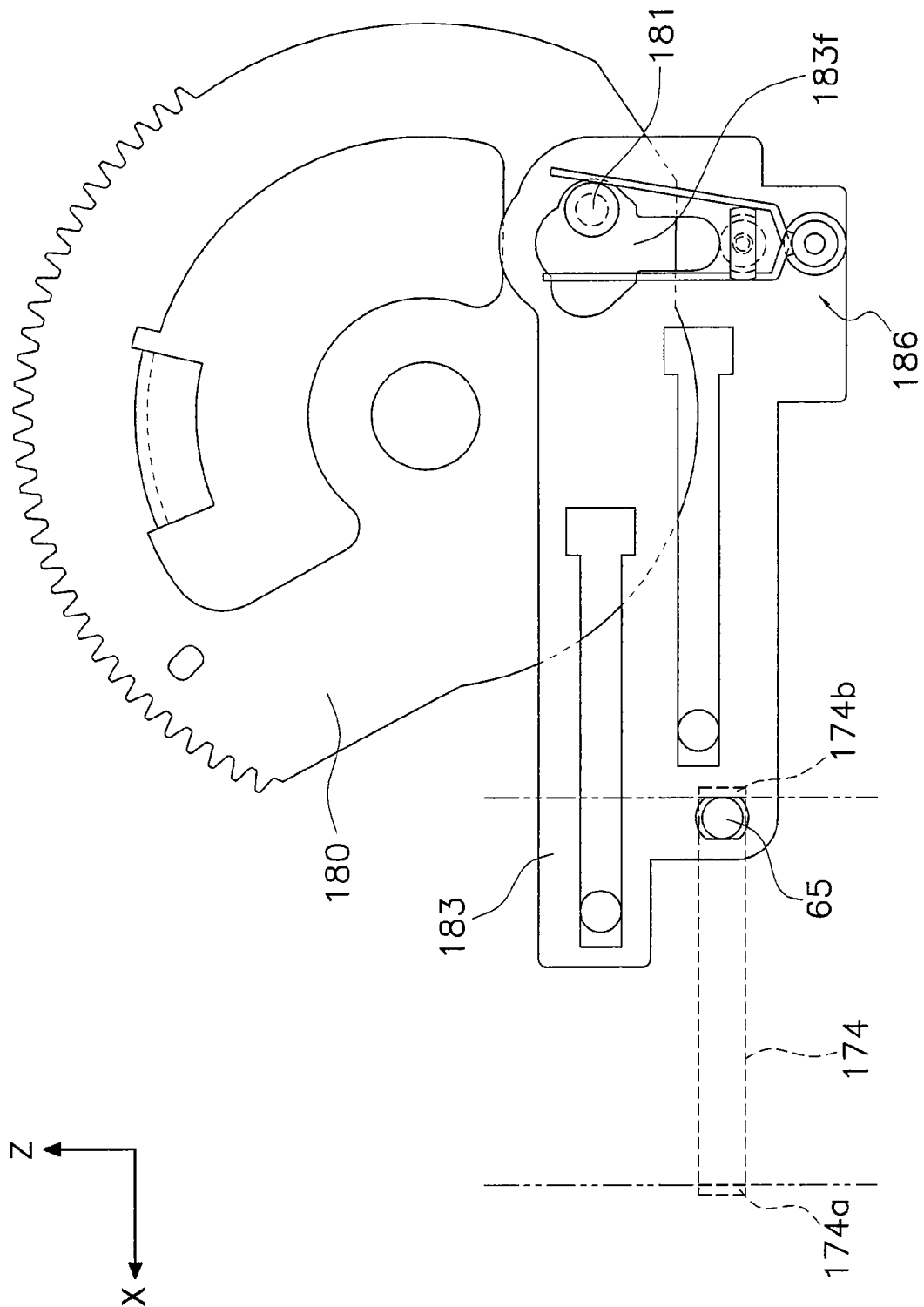
FIG. 22 is an illustration for describing the operation of the third group movement mechanism (telephoto end)

FIG. 18 shows rotational angle of the ring gear 180 when the optical system 35 is located at the wide angle end, and the operation of the elastic coupling mechanism and the operation of the rod 183 according to it. FIGS. 19 to 21 show the rotational angle of the ring gear 180 when the optical system 35 moves from the wide angle end to the telephoto end, and the operation of the elastic coupling mechanism and the operation of the rod 183 according to the rotational angle. In particular, FIG. 20 shows the rotational angle of the ring gear 180 when the optical system 35 is located in a normal position which is the middle position between the wide angle end and the telephoto end, and the operation of the elastic coupling mechanism and the operation of the rod 183 according to the rotational angle. FIG. 22 shows the rotational angle of the ring gear 180 when the optical system is located in the telephoto end, and the operation of the elastic coupling mechanism and the operation of the rod 183 according to the rotational angle.

In FIG. 18, the ring gear 180 is located at the end portion in the clockwise direction when viewed from the Y axis direction positive side. In this case, the ring gear pin 181 fixed to the ring gear 180 is located at the end portion on the positive side within the movable range to the X axis direction, and is engaged to the X axis direction positive side of the second engagement opening 183f of the rod 183. As described with reference to FIG. 17, when the ring gear pin 181 is located on the X axis direction positive side of the second engagement opening 183f, the crimp spring 186 presses the rod 183 to the X axis direction positive side. On the other hand, the protrusion portion 65 of the third group frame unit 44 inserted into the rod 183 and engaging with the restricting portion 174 of the base 55 is in contact with the end portion 174a on the X axis direction positive side of the restricting portion 174, and the movement to the X axis direction positive side is restricted. Consequently, when the optical system 35 is located at the wide angle end, movement of the rod 183 to the X axis direction positive side is restricted and the rod 183 is reliably fixed by the pressing to the X axis direction positive side.

Furthermore, in this embodiment, the state where the optical system 35 is located at the wide angle end is the same as the arrangement state (retracting state) of the optical system 35 when not using the imaging device 2. For this reason, when not using the imaging device 2, it is possible to reliably fix the rod 183.

In FIGS. 19 to 21, the ring gear 180 is driven to rotate in the counterclockwise direction from the end portion in the clockwise direction when viewed from the Y axis direction positive side. FIG. 19 shows the case which the ring gear 180 is located near the end portion in the clockwise direction when viewed from the Y axis direction positive side. FIG. 20 shows the case which the ring gear 180 is located in the center position in the movable range. FIG. 21 shows the case which the ring gear 180 is located near the end portion in the counterclockwise direction when viewed from the Y axis direction positive side.

In this case, the ring gear pin 181 fixed to the ring gear 180 engages with the first engagement opening 183e of the rod 183 and moves to the X axis direction negative side. As described with reference to FIG. 17, when the ring gear pin 181 is located at the first engagement opening 183e, the crimping force of the crimp spring 186 does not act on the ring gear pin 181. In this case, the ring gear 180 rotates in the counterclockwise direction while the ring gear pin 181 engages with the first engagement opening 183e of the rod 183, and as a result, the rod 183 is driven toward the X axis direction negative side. Since the rod 183 is driven while the guide grooves 183a and 183b engage with the guide pins 173a and 173b formed on the base 55, the rod 183 is in translational movement toward the X axis direction negative side. The protrusion portion 65 of the third group frame unit 44 fits in the rod 183. Therefore, the third group frame unit 44 moves toward the X axis direction negative side according to the movement of the rod 183.

In FIG. 22, the ring gear 180 is located on the end portion in the counterclockwise direction when viewed from the Y axis direction positive side. In this case, the ring gear pin 181 fixed to the ring gear 180 is located on the end portion on the negative side within the movable range to the X axis direction, and engages with the X axis direction negative side of the second engagement opening 183f of the rod 183. As described with reference to FIG. 17, when the ring gear pin 181 is located on the X axis direction negative side of the second engagement opening 183f, the crimp spring 186 presses the rod 183 to the X axis direction negative side. On the other hand, the protrusion portion 65 of the third group frame unit 44 inserted into the rod 183 and engages with the restricting portion 174 of the base 55 is in contact with the end portion 174b of the restricting portion 174 on the X axis direction negative side, and the movement thereof to the X axis direction negative side is restricted. Consequently, when the optical system 35 is located at the telephoto end, the movement of the rod 183 to the X axis direction negative side is restricted, and the rod 183 is reliably fixed to the X axis direction negative side by pressing.

4.4: Third Group Frame Unit

The detailed configuration of the third group frame unit 44 will be described with reference to FIG. 23.

Figure 23:
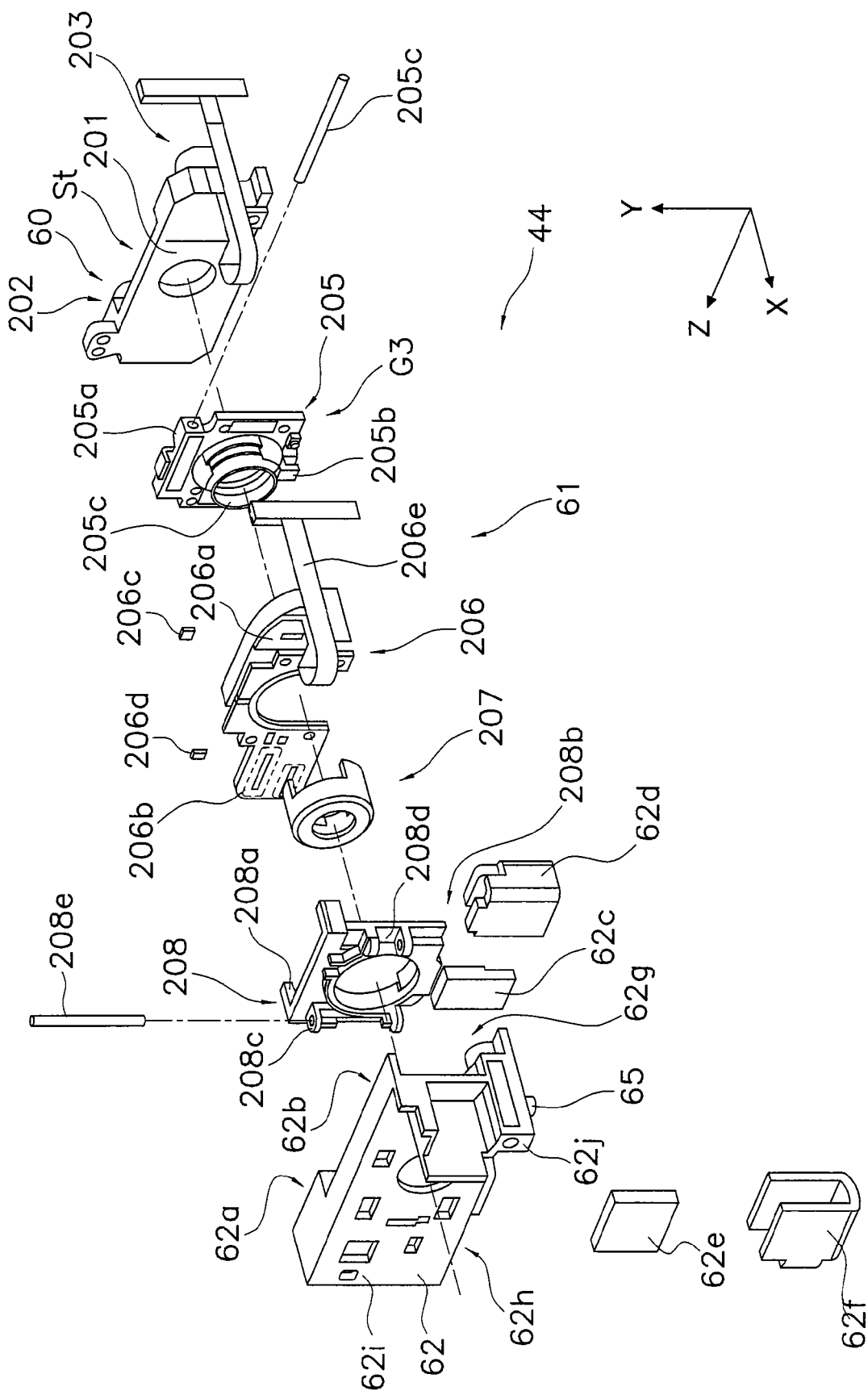
FIG. 23 is an exploded perspective view of the third group frame unit.

FIG. 23 is an exploded perspective view of the third group frame unit 44. The third group frame unit 44 is mainly made up of a shutter unit 60 provided on the second optical axis A2 and having the exposure-adjustment member St performing the shutter operation and the throttle operation, the third lens group G3, the image blur correction mechanism 61 retaining the third lens group G3 to be movable in the Y axis direction and the Z axis direction, and the third group frame 62 supporting the shutter unit 60 and the image blur correction mechanism 61.

Since details of the third lens group G3 has been described with reference to FIGS. 5 to 8, they will be omitted here.

The shutter unit 60 is mainly made up of a main body 201 provided on the second optical axis A2 and having the exposure-adjustment member St such as a throttle or shutter for controlling the exposure amount and the exposure time of the CCD 37 (refer to FIG. 9), an aperture actuator 202 provided on the Z axis direction positive side of the main body 201 to protrude out toward the X axis direction negative side, and a shutter actuator 203 disposed on the Z axis direction negative side of the main body 201 to protrude out toward the X axis direction negative side. The aperture actuator 202 and the shutter actuator 203 are provided to be spaced in the Z axis direction across the second optical axis A2. The shutter unit 60 is fixed to the third group frame 62 across the image blur correction mechanism 61 which will be described later.

The image blur correction mechanism 61 is mainly made up of a pitching movement frame 205 retaining the third lens group G3 and is movable in the Z axis direction (pitching direction) and the Y axis direction (yawing direction) with respect to the third group frame 62, an electric substrate 206 attached on the X axis direction positive side of the pitching movement frame 205, a cap 207 attached to the pitching movement frame 205 from the X axis direction positive side of the electric substrate 206, and a yawing movement frame 208 movable in the Y axis direction with respect to the third group frame 62 and retaining the pitching movement frame 205 to be movable in the Z axis direction.

The pitching movement frame 205 has a cylindrical portion 205c formed on the middle and retaining the third lens group G3, and includes a bearing portion 205a on the Y axis direction positive side, and a rotation stopper 205b on the Y axis direction negative side. The pitching shaft 205c parallel to the Z axis direction is inserted into the bearing portion 205a. The both ends of the pitching shaft 205c are supported by a fixing portion 208a of the yawing movement frame 208 which will be described later. The rotation stopper 205b engages with an engagement portion 208b of the yawing movement frame 208 which will be described later, to be movable in the Z axis direction. By doing so, the pitching movement frame 205 is slidable with respect to the yawing movement frame 208 in the direction along the pitching shaft 205c.

On the electric substrate 206, a coil 206a for driving the third lens group G3 in the Z axis direction, a coil 206b for driving it in the Y axis direction, a hall element 206c for detecting the Z axis direction position of the third lens group G3, and a hall element 206d detecting the Y axis direction position are provided. Furthermore, coils 206a and 206b are, for example, configured integrally with the electric substrate 206 as a laminated coil. The FPC 206e transfers the signals between the coils 206a, 206b and hall elements 206c, 206c attached on the electric substrate 206 and the main substrate 23 (refer to FIG. 3).

The cap 207 is attached on the X axis direction positive side of the third lens group G3, and reduces flare or ghost or the like. The cap 207 is attached to cover the cylindrical portion 205c of the pitching movement frame 205 across the electric substrate 206.

The yawing movement frame 208 is a member having the cylindrical portion 205c retaining the third lens group G3 and an opening at the middle into which the cap 207 is inserted. On the Y axis direction positive side, the fixing portion 208a supporting the both ends of the pitching shaft 205c is formed. On the Y axis direction negative side, the engagement portion 208b engaging with the rotation stopper 205b of the pitching movement frame 205 is formed. As a result, the yawing movement frame 208 supports the pitching movement frame 205 to be slidable in the Z axis direction. In addition, on the surface of the yawing movement frame 208 on the X axis direction positive side, the bearing portion 208c is formed on the Z axis direction positive side, and the rotation stopper 208d is formed on the Z axis direction negative side. The yawing shaft 208e parallel to the Y axis direction is inserted into the bearing portion 208c. The two ends of the yawing shaft 208e are supported by the fixing portion 62a of the third group frame 62 which will be described later. The rotation stopper 208d engages with the engagement portion 62b of the third group frame 62 which will be described later, to be movable in the Y axis direction. As a result, the yawing movement frame 208 is slidable in the direction along the yawing shaft 208e, with respect to the third group frame 62.

The third group frame 62 is disposed on the X axis direction positive side with respect to the yawing movement frame 208. On the surface thereof on the X axis direction negative side, the fixing portion 62a supporting the two ends of the yawing shaft 208e is formed on the Z axis direction positive side, and the engagement portion 62b engaging with the rotation stopper 208d of the yawing movement frame 208 is formed on the Z axis direction negative side. As a result, the third group frame 62 supports the yawing movement frame 208 to be movable in the Y axis direction.

On a fitting portion 62g of the third group frame 62 on the Z axis direction negative side, a yoke 62d is press fitted and fixed thereon. The yoke 62d has a section taken perpendicular to the Y axis in a square U-shape, and on the inner side thereof, a magnet 62c which has undergone dipolar magnetization in the Z axis direction is fixed. The yoke 62d is fixed such that the coil 206a of the electric substrate 206 faces the magnet 62c in the X axis direction. By doing so, an electromagnetic actuator for the pitching direction is configured. In addition, on a fitting portion 62h of the third group frame 62 on the Y axis direction negative side, a yoke 62f is press fitted and fixed. The yoke 62f has a section taken perpendicular to the Z axis in a square U-shape, and on the inner side thereof, a magnet 62e which has undergone tripolar magnetization in the Y axis direction is fixed. The yoke 62f is fixed so that the coil 206b of the electric substrate 206 faces the magnet 62e in the X axis direction. By doing so, an electromagnetic actuator in the yawing direction is configured.

According to the above configuration, when electric current flows in the coil 206a of the electric substrate 206, electromagnetic power is generated along the pitching direction (Z axis direction) by the magnet 62c and the yoke 62d. Similarly, when electric current flows in the coil 206b of the electric substrate 206, electromagnetic power is generated along the yawing direction (Y axis direction) by the magnet 62e and the yoke 62f.

As described above, with the image blur correction mechanism 61, it is possible to correct the image blur by driving the third lens group G3 in two directions (Y axis direction and Z axis direction) perpendicular to the second optical axis A2.

On the Y axis direction negative side of the third group frame 62, the protrusion portion 65 protruding out on the Y axis direction negative side is formed. The protrusion portion 65 engages with the through-hole 183c of the rod 183 (refer to FIG. 14). Therefore, the third group frame 62 receives the drive in the X axis direction from the rod unit 182.

In addition, on the third group frame 62, a bearing portion 62i and a bearing portion 62j are formed on the corner disposed on the Y axis direction positive side and Z axis direction positive side, and on the corner disposed on the Y axis direction negative side and Z axis direction negative side respectively. The third group guide pole 71 extending along the X axis direction from the master flange unit 46 (refer to FIG. 9) is inserted in the bearing portion 62i. The third group guide pole 70 extending along the X axis direction from the master flange unit 46 (refer to FIG. 9) is inserted in the bearing portion 62j. Therefore, the third group frame 62 is movable in the X axis direction along the third group guide poles 70 and 71.

Furthermore, on the third group frame 62, as described above, the image blur correction mechanism 61 is fixed, and the shutter unit 60 is attached from the X axis direction negative side thereof.

According to the above, the third group frame unit 44 integrally receives the drive to the X axis direction from the rod unit 182, and is integrally guided to the X axis direction by the third group guide poles 70 and 71 to move in the direction along the X axis direction, that is, the second optical axis A2.

4.5: Fourth Group Frame Unit

The detailed configuration of the fourth group frame unit 45 will be described with reference to FIG. 24.

Figure 24:
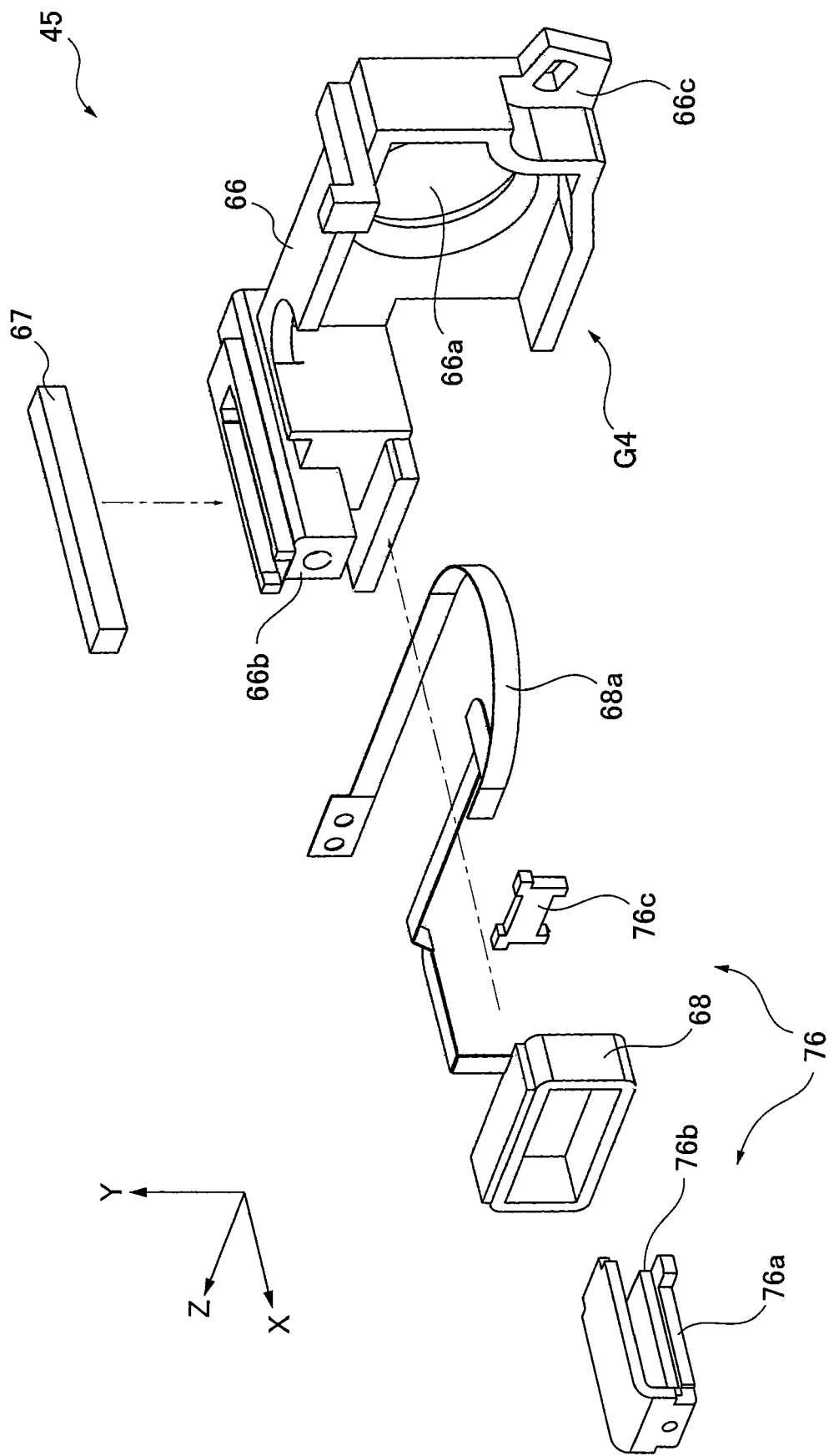
FIG. 24 is an exploded perspective view of the fourth group frame unit.

FIG. 24 is an exploded perspective view of the fourth group frame unit 45. The fourth group frame unit 45 retains the fourth lens group G4, moves along the second optical axis A2 and performs focusing operation, and corrects the out-of-focus state caused by the changes in imaging magnification due to the movement of first lens group G1 and the third lens group G3.

The fourth group frame unit 45 is mainly made up of the fourth lens group G4, the fourth group frame 66 retaining the fourth lens group G4, and sensor magnet 67 and coil 68 fixed to the fourth group frame 66.

Since the details on the fourth lens group G4 has been described with reference to FIGS. 5 to 8, they will be omitted here.

The fourth group frame 66 includes an opening 66a retaining the fourth lens group G4. The fourth lens group G4 is fixed to this opening 66a by an adhesion or caulking.

On the fourth group frame 66, a bearing portion 66b and a bearing portion 66c are formed on the corner disposed on the Y axis direction positive side and Z axis direction positive side, and on the corner disposed on the Y axis direction negative side and Z axis direction negative side respectively. The bearing portion 66b is a cylindrical bearing which is long in the X axis direction, and the fourth group guide pole 73 extending along the X axis direction from the master flange unit 46 (refer to FIG. 9) is inserted therein. In the bearing portion 66c, the fourth group guide pole 72 extending along the X axis direction from the master flange unit 46 (refer to FIG. 9) is inserted. Therefore, the fourth group frame 66 is movable in the X axis direction along the fourth group guide poles 73 and 72.

On the fourth group frame 66, the sensor magnet 67 is fixed so that the longitudinal direction thereof is along the cylindrical bearing portion 66b. The sensor magnet 67 has undergone multipolar magnetization in the X axis direction. The sensor magnet 67 is disposed to face the MR sensor 77 (refer to FIG. 9) of the master flange unit 46 in the Y axis direction. Therefore, when the sensor magnet 67 moves in the X axis direction together with the fourth group frame 66, the MR sensor 77 detects the changes in the magnetic field in the vicinity thereof. Therefore, the position of the fourth group frame unit 45 is detected.

In addition, on the X axis direction positive side of the fourth group frame 66, the coil 68 is fixed by adhesive. An FPC 68a is connected to the coil 68. The FPC 68a is electrically connected to the coil 68 and the main substrate 23 (refer to FIG. 3).

A portion of a main yoke 76a having a square U-shape section perpendicular to the Z axis and fixed to the master flange unit 46 which will be described later passes through the coil 68. A magnet 76b is fixed on the other portion of the main yoke 76a. In addition, the open end of the main yoke 76a on the X axis direction negative side is closed by a side yoke 76c in the state where the coil 68 is passed through. A magnetic member 76 including the above main yoke 76a, magnet 76b, and the side yoke 76c, and the coil 68 make up a voice coil-type linear motor. Therefore, when electric current flows in the coil 68, driving force is generated in the coil 68 in the X axis direction, and the fourth group frame unit 45 fixing the coil 68 and the coil 68 is driven in the X axis direction.

According to the above, the fourth group frame unit 45 receives the drive to the X axis direction from the voice coil-type linear motor, and is guided to the X axis direction by the fourth group guide poles 73 and 72, and thereby moves in the direction along the X axis direction, that is, the second optical axis A2.

In addition, although the case of driving the fourth group frame unit 45 using the linear motor is here shown, the fourth group frame unit 45 may be driven by another motor such as a stepping motor.

4.6: Master Flange Unit

The detailed configuration of the master flange unit 46 will be described with reference to FIG. 25.

Figure 25:
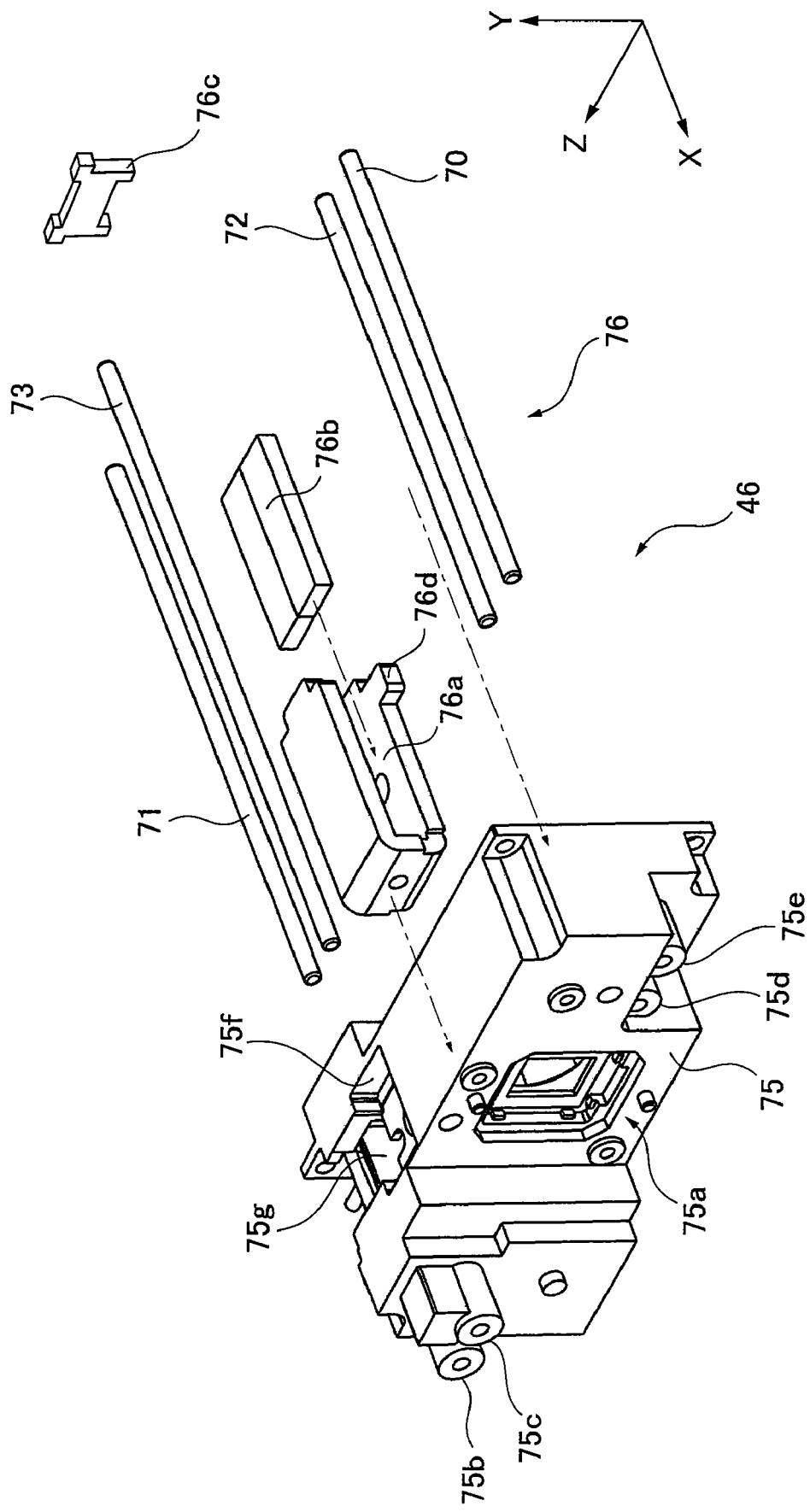
FIG. 25 is an exploded perspective view of the master flange unit.

FIG. 25 is an exploded perspective view of the master flange unit 46. The master flange unit 46 is a member including the chassis of the lens barrel 31 together with the base unit 43, and is fixed by a screw or the like in the X axis direction of the base 55.

On the master flange unit 46, the magnetic member 76 including the magnetic circuit together with the coil 68 of the fourth group frame unit 45 is fixed. More specifically, the magnetic member 76 is fixed by press fitting and fixing the press fit protrusion 76d of the main yoke 76a including the magnetic member 76 to a fitting portion (not shown in the figure) of the master flange unit 46. On the inner surface of the main yoke 76a on the Y axis direction negative side, the magnet 76b is fixed by an adhesive or the like. Furthermore, the coil 68 of the fourth group frame unit 45 passes through the main yoke 76a, and in the state where the coil 68 is passed through, the side yoke 76c is fixed on the open end of the main yoke 76a on the X axis direction negative side.

On the surface of the master flange unit 46 on the Y axis direction positive side, a fitting portion 75f for attaching the MR sensor 77 (refer to FIG. 9) is formed. One portion of the fitting portion 75f includes a penetration portion 75g penetrated with the inner side of the master flange unit 46. The MR sensor 77 is fixed to this fitting portion 75f, and faces the sensor magnet 67 (refer to FIG. 24) of the fourth group frame unit 45 located inside the master flange unit 46 in the Y axis direction via the penetration portion 75g. An FPC not shown in the figure is connected to the MR sensor 77, and the MR sensor 77 is electrically connected to the main substrate 23 (refer to FIG. 3) via the FPC.

On the corner of the master flange unit 46 on the Y axis direction positive side and the Z axis direction positive side, cylindrical guide pole support portions 75b and 75c which are adjacent in the Z axis direction are formed. The guide pole support portion 75b disposed on the Z axis direction positive side supports the end portion of the third group guide pole 71 on the X axis direction positive side. The guide pole support portion 75c disposed on the X axis direction negative side supports the end portion of the fourth group guide pole 73 on the X axis direction positive side. In addition, on the corner disposed on the Y axis direction negative side and on the Z axis direction negative side of the master flange unit 46, cylindrical guide pole support portions 75d and 75e which are adjacent in the Z axis direction are formed. The guide pole support portion 75d disposed on the Z axis direction positive side supports the end portion of the fourth group guide pole 72 on the X axis direction positive side. The guide pole support portion 75e disposed on the Z axis direction negative side supports the end portion of the third group guide pole 70 on the X axis direction positive side. In addition, end portions of the guide poles 70 to 73 on the X axis direction negative side are fixed to the second group frame unit 42.

4.7: Operation of the Lens Barrel

Figure 26A:
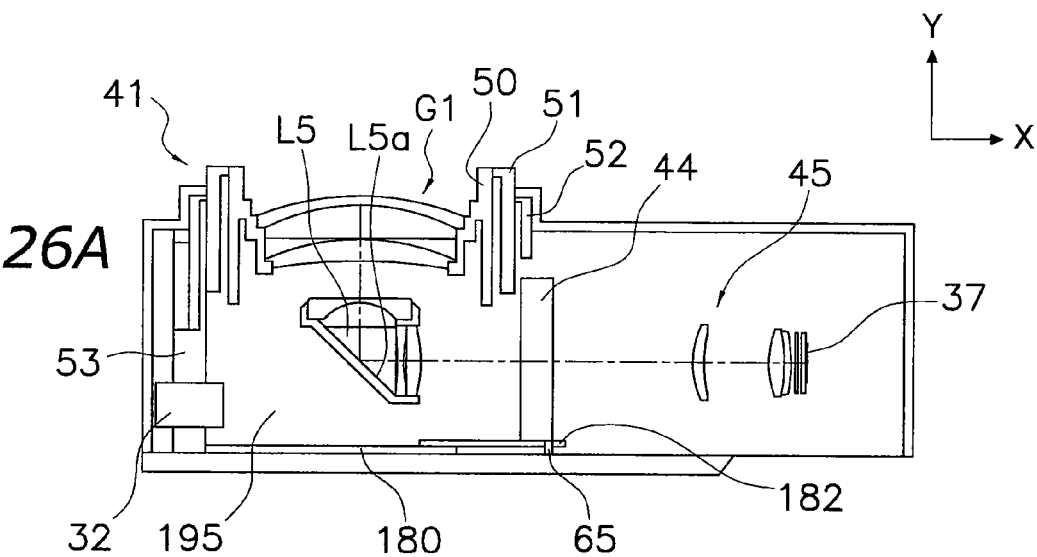
FIGS. 26A to 26C are illustrations for describing the operation of the lens barrel.
Figure 26B:
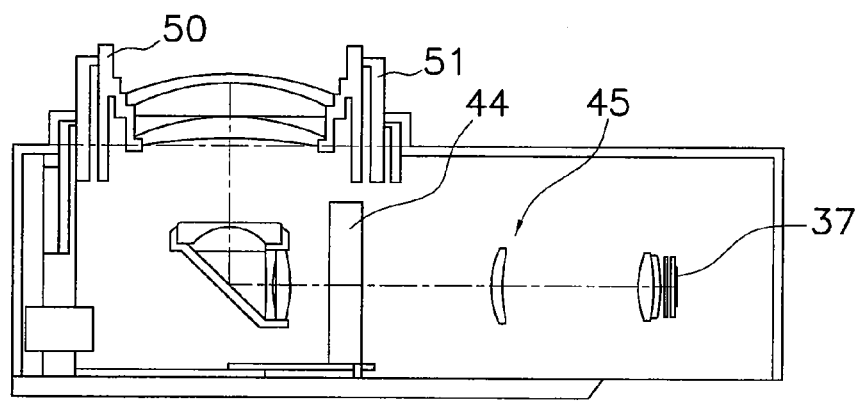
Figure 26C:
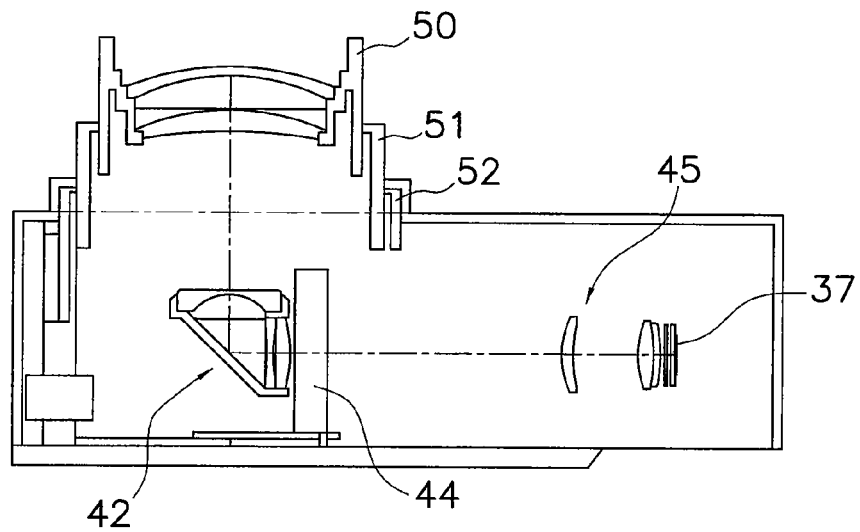

The operation of each portion of the lens barrel 31 will be described with reference to FIGS. 26A to 26C. FIGS. 26A to 26C are sections in a plane including the first optical axis A1 and the second optical axis A2 of the lens barrel 31. In the FIGS. 26A to 26C, for the convenience of explanation, a member not located on the plane including the first optical axis A1 and the second optical axis A2 is also shown. In addition, for the convenience of explanation, mainly the configurations necessary for the explanation are shown. FIG. 26A shows when the optical system 35 is located on the wide angle side. FIG. 26B shows when the optical system 35 is located in the normal position which is the middle position between the wide angle end and the telephoto end. FIG. 26C shows when the optical system 35 is located at the telephoto end.

Below, the operation of each portion when the optical system 35 is zoomed from the wide angle side to the telephoto side will be described.

First, when the motor unit 32 operates, the driving gear 53 is driven. The driving gear 53 meshes with the ring gear 180 of the base unit 43 and the driving frame 51 of the first group frame unit 41, and the rotation driving of the driving gear 53 drives the driving frame 51 and the ring gear 180 to rotate.

When the driving frame 51 is driven to rotate, the first group frame unit 41 configured as described above operates, and the first lens group G1 retained therein moves to the Y axis direction positive side.

When the ring gear 180 is driven to rotate, the drive is converted into the translational movement of the rod unit 182 to the X axis direction negative side. The protrusion portion 65 of the third group frame unit 44 engages with the rod unit 182. Therefore, the third group frame unit 44 is in translational movement to the X axis direction negative side together with the rod unit 182.

As shown in FIG. 26A, when the optical system 35 is located on the wide angle side, the third group frame unit 44 is disposed so that a portion thereof is opposite in the Y axis direction to a portion of the first group frame unit 41 on the X axis direction positive side. More specifically, a portion of the third group frame unit 44 is disposed to be opposite in the Y axis direction to a portion of the stationary frame 52 on the X axis direction positive side.

In addition, as shown in FIG. 26B, when the optical system 35 moves to the telephoto side, the first group frame 50 and the driving frame 51 move to the Y axis direction positive side, and the third group frame unit 44 moves into the space formed by this movement of the first group frame 50 and the driving frame 51 from the X axis direction positive side.

Furthermore, as shown in FIG. 26C, when the optical system 35 is located at the telephoto end, the third group frame unit 44 moves all the way to a position nearest the second group frame unit 42, within the movable range to the X axis direction.

Figure 27:
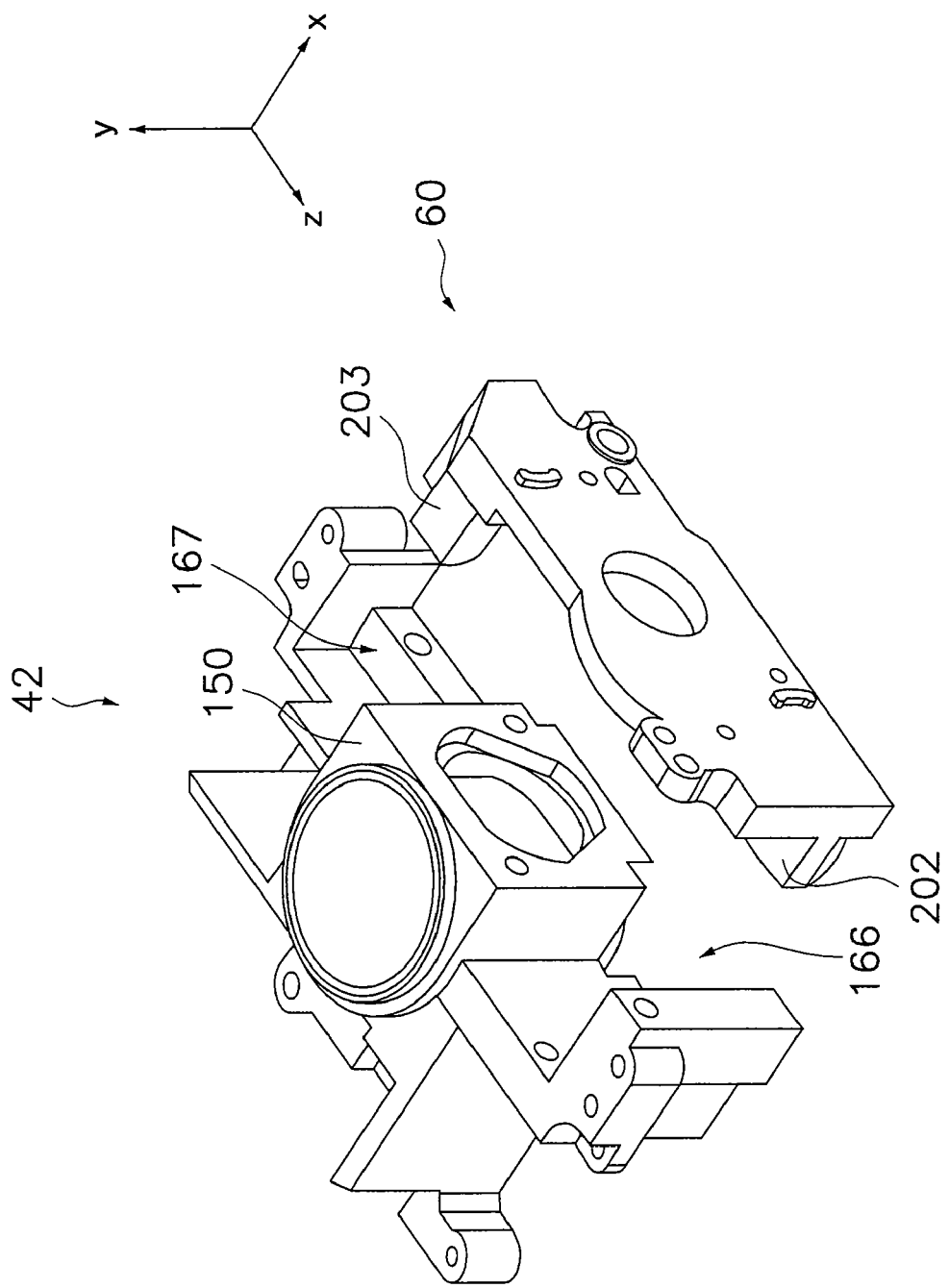
FIG. 27 is an illustration for describing the positional relationship between the second group frame unit and the third group frame unit.
Figure 28:
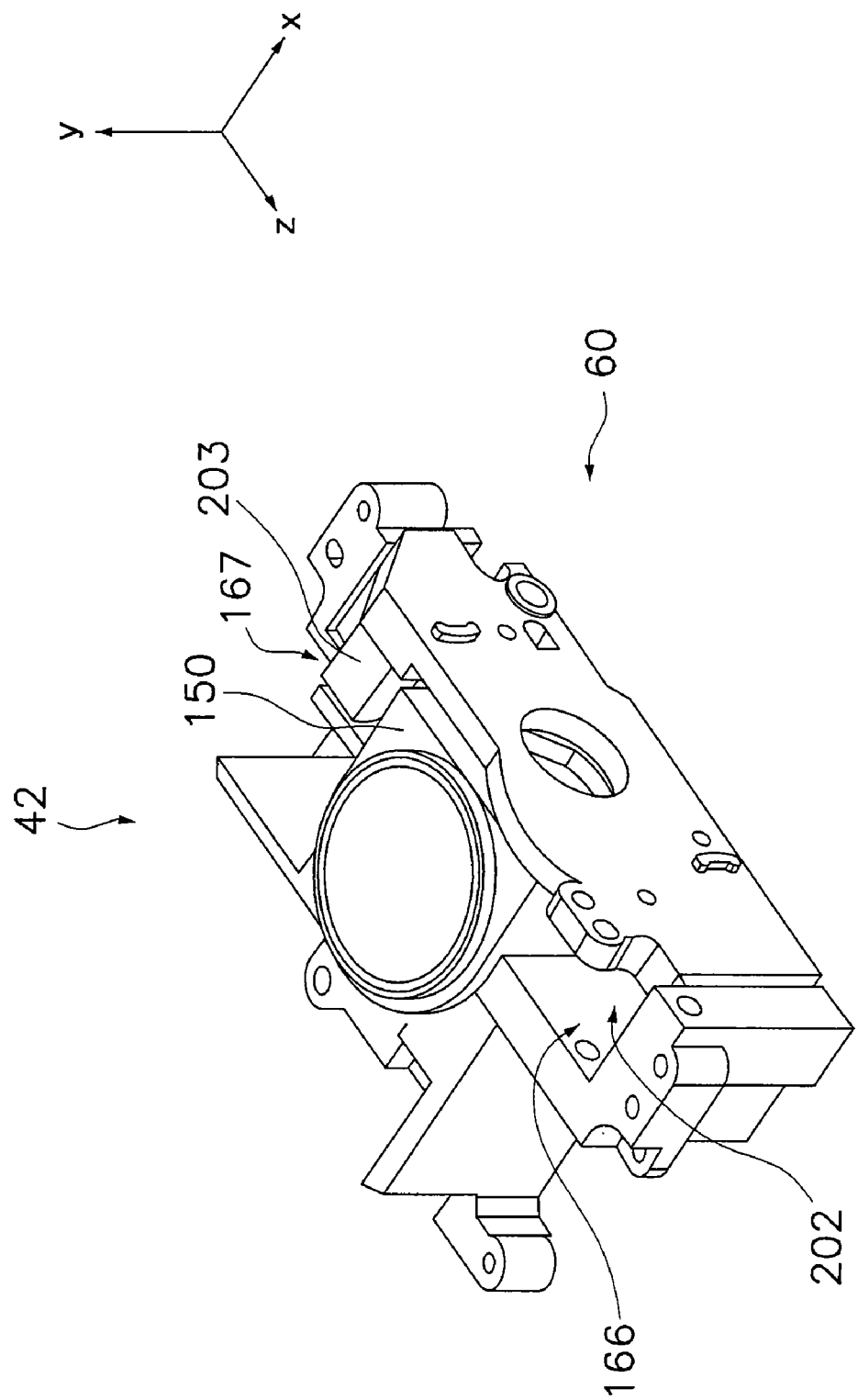
FIG. 28 is an illustration for describing the positional relationship between the second group frame unit and the third group frame unit.
Figure 29:
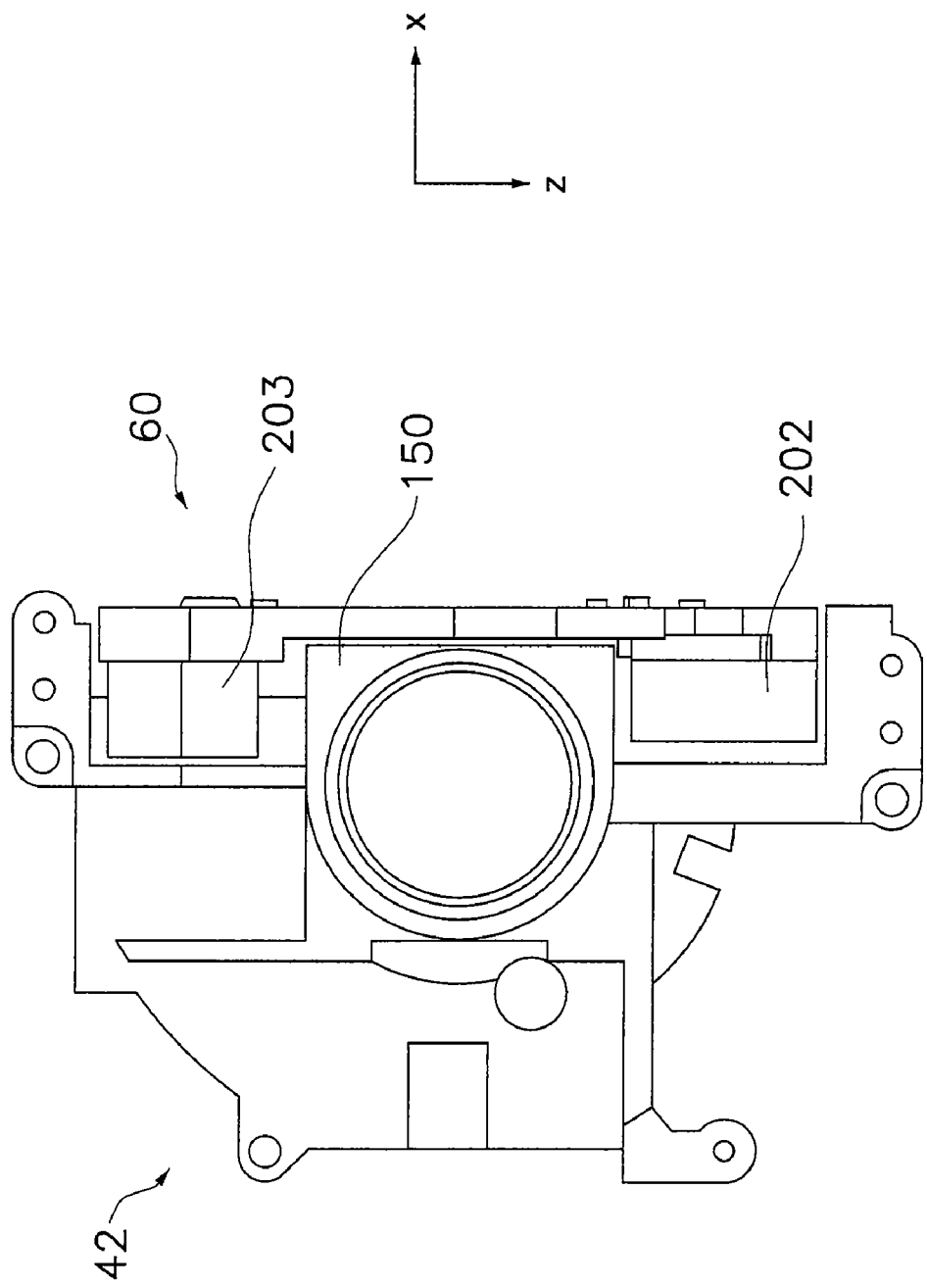
FIG. 29 is an illustration for describing the positional relationship between the second group frame unit and the third group frame unit.

Here, the positional relationship between the second group frame unit 42 and the third group frame unit 44 will be described with reference to FIGS. 27 to 29. FIG. 27 is a perspective view showing the positional relationship between the second group frame unit 42 and the shutter unit 60 of the third group frame unit 44, when the optical system 35 is located at the wide angle end. FIG. 28 is a perspective view showing the positional relationship between the second group frame unit 42 and the shutter unit 60 of the third group frame unit 44, when the optical system is located at the telephoto end. FIG. 29 is a plan view seen from the Y axis direction positive side showing the positional relationship between the second group frame unit 42 and the shutter unit 60 of the third group frame unit 44 when the optical system is located at the telephoto end.

As shown in FIG. 27, on the second group frame unit 42, concaved space 166 and concaved space 167 are formed toward the X axis direction positive side, that is, toward the side of the third group frame unit 44. The concaved space 166 and the concave space 167 are each formed in positions facing the X axis direction with respect to aperture actuator 202 and shutter actuator 203 disposed protruding out to the X axis direction negative side from the third group frame unit 44. Therefore, as shown in FIG. 28, when the optical system 35 moves to the telephoto side and the shutter unit 60 moves all the way to the position nearest to the side of the second group frame unit 42, the aperture actuator 202 fits in the concaved space 166, and the shutter actuator 203 fits in the concaved space 167.

In addition, as shown in FIG. 29, the aperture actuator 202 and the shutter actuator 203 are provided to be spaced in the Z axis direction across the second optical axis A2, and this gap is larger than the Z axis direction width of the second group frame 150. Therefore, when the shutter unit 60 moves all the way to the position nearest to the side of the second group frame unit 42, the second group frame 150 fits in the center portion in the Z axis direction between the aperture actuator 202 and the shutter actuator 203.

Since the second group frame unit 42 and the third group frame unit 44 are configured as described above, it becomes possible to enlarge the movable range of the third lens group G3 in the X axis direction. In other words, while forming the lens barrel 31 to be compact in the X axis direction, it is possible to make the maximum distance in the X axis direction between third lens group G3 and the CCD 37 larger.

By the cooperation between the first group frame unit 41 and the third group frame unit 44 described above, the optical system 35 changes the imaging magnification to the CCD 37 (refer to FIGS. 26A to 26C). The fourth group frame unit 45 corrects out-of-focus state caused by the change in this imaging magnification. The correction is realized (refer to FIG. 24) by driving the fourth group frame unit 45 in the X axis direction via voice coil-type linear motor made up of coil 68 of the fourth group frame unit 45 and the magnetic member 76 of the master flange unit 46.

Furthermore, as shown in FIGS. 26A to 26C, on the X axis direction negative side of the second group frame unit 42, motor unit 32 is disposed, using space 195 formed on the Y axis direction negative side of the first group frame unit 41. Therefore, a member having the optical system 35 is not disposed, and it becomes possible to arrange a member having the imaging device 2 by effectively using a space which does not affect the optical system 35, and it is possible to improve the space usage efficiency.

5: Effects 5.1

The imaging device 2 includes multistage retractable first group frame unit 41 extendable and retractable in multistage in the first optical axis A1 direction. Furthermore, the bending optical system is adopted as the optical system 35. Therefore, while configuring the imaging device 2 to be compact, the optical path length from the first lens group G1 to the CCD 37 can be longer, and it becomes possible to configure a high magnification zoom lens system.

5.2

With the imaging device 2, the relative positions of the first lens group G1 and the third lens group G3 on the optical path with respect to the CCD 37 change. Therefore, it becomes possible to configure an even more optically high performance zoom lens system.

5.3

The driving frame 51 moves in the direction along the first optical axis A1 with respect to the second group frame unit including the prism L5 by being driven to rotate around the first optical axis A1 via the zoom motor 36. Furthermore, the first group frame 50 moves in the direction along the first optical axis A1 with respect to the driving frame 51, via the drive of the driving frame 51. With the imaging device 2, the driving force from the zoom motor 36 is transmitted to the first group frame 50 via the driving frame 51. Therefore, it is not necessary to have a special motor for driving the first group frame 50, and it becomes possible to configure the imaging device 2 more simply.

5.4

The stationary frame 52 of the first group frame unit 41 is directly fixed to the second group frame unit 42 which fixes the prism L5. The stationary frame 52 supports the first group frame 50 and the driving frame 51 to be movable in the first optical axis A1 direction. Therefore, it becomes possible to position the first lens group G1 with respect to the prism L5, in particular, to position in the direction perpendicular to the first optical axis A1, with high precision.

5.5

With the imaging device 2, the driving frame 51 is disposed on the inner peripheral side of the stationary frame 52, and the first group frame 50 is disposed on the inner peripheral side of the driving frame 51. The driving frame 51 is movable in the first optical axis A1 direction, while engaging cam pins 111a to 111c with cam grooves 128a to 128c of the stationary frame 52. The first group frame 50 is movable in the first optical axis A1 direction, while engaging cam pins 104a to 104c with cam grooves 128a to 128c of the driving frame 51, and furthermore, engaging end portions 107a and 107b with straight-movement grooves 129a and 129b. In particular, in order to engage the end portions 107a and 107b straight through the straight-movement grooves 129a and 129b, the first group frame 50 is prevented from rotating around the first optical axis A1. Therefore, with the imaging device 2, it is not necessary to provide a straight-movement frame to make the first group frame 50 move straight, and it becomes possible to configure the imaging device 2 more simply.

5.6

In the stationary frame 52, the extension portions 126a and 126b are provided only on the X axis direction negative side of the cylindrical portion 125. Therefore, as described with reference to FIGS. 26A to 26C, the third group frame unit 44 does not interfere with the stationary frame 52, and is movable in the X axis direction.

5.7

The imaging device 2 includes the third group movement mechanism 57 moving the third group frame unit 44 which retains the third lens group G3 in the direction along the second optical axis A2. The first group frame unit 41 and the third group movement mechanism 57 are functionally coupled via the driving gear 53 driven by the zoom motor 36. Therefore, it is not necessary to have mechanisms to drive each of the first group frame unit 41 and the third group movement mechanism 57, and it becomes possible to configure the imaging device 2 even more simply. In addition, this also makes the imaging device 2 more silent. Furthermore, since each of the ring gear 112 of the driving frame 51 of the first group frame unit 41 and the ring gear 180 of the third group movement mechanism 57 is driven to mesh with the driving gear 53, it becomes possible to easily cooperate the first group frame unit 41 with the third group movement mechanism 57.

5.8

The third group movement mechanism 57 includes the ring gear 180 and the ring gear pin 181 which convert the rotational drive from the zoom motor 36 into the drive in the direction along the second optical axis A2, and the rod unit 182 engaging with the ring gear pin 181 and moving in the direction along the second optical axis A2. Therefore, it becomes possible to drive the first group frame unit 41 moving the first lens group G1 in the direction along the first optical axis A1, and the third group movement mechanism 57 moving the third lens group G3 in the direction along the second optical axis A2 with the same driving unit.

5.9

In the imaging device 2, the crimp spring 186, the spring pin 187, and the crimp spring restricting pin 185 include the elastic coupling mechanism elastically coupling the ring gear 180 and the rod 183. The elastic coupling mechanism presses the rod 183 towards the X axis direction positive side, when the rod 183 is located at the end portion on the X axis direction positive side. In addition, it presses the rod 183 towards the X axis direction negative side, when the rod 183 is located on the end portion to the X axis direction negative side. By doing so, it is possible to prevent the third group frame unit 44 which moves integrally with the rod 183 and the rod 183 from shaking. In particular, it is possible to prevent the third group frame unit 44 from shaking, when the optical system is located at the wide angle end or the telephoto end, or in a state where the imaging device is not used (retracting state).

5.10

One end of the third group guide poles 70 and 71 guiding the movement of the third group frame unit 44 in the X axis direction is fixed to the second group frame unit 42 including the second lens group G2. Therefore, it becomes possible to position the third group frame unit 44 with respect to the second group frame unit 42, in particular to position in the direction perpendicular to the second optical axis A2, with high precision.

5.11

As shown in FIGS. 26A to 26C, a portion of the motor unit 32 is disposed in a space on the opposite side of the third group frame unit 44 across the reflecting surface L5a of the prism L5. Therefore, a member including the optical system 35 is not disposed, and it becomes possible to provide a member having the imaging device 2 with effectively using a space which does not affect the optical system 35, and it is possible to improve the space usage efficiency.

5.12

On the shutter unit 60, the aperture actuator 202 and the shutter actuator 203 are formed to protrude out to the side of the second group frame unit 42. The second group frame 150 of the second group frame unit 42 fits in the middle portion in the Z axis direction between the aperture actuator 202 and the shutter actuator 203, when the shutter unit 60 moves near the second group frame unit 42. Therefore, it becomes possible to make the sizes of the imaging device 2 in the direction along the second optical axis smaller.

5.13

In the second group frame unit 42, the sixth lens L6 and the seventh lens L7 are supported on the X axis direction negative side, by fixing the opening member 159 to the second group frame 150. The opening member 159 blocks off unwanted lights going toward unwanted directions, out of the light outputted from the seventh lens L7, and supports the sixth lens L6 and the seventh lens L7 on the X axis direction negative side. Therefore, members having the imaging device 2 can be reduced, and it becomes possible to reduce the cost.

5.14

The digital camera 1 provides the same effects as the above described imaging device 2, since the digital camera 1 includes the imaging device 2.

5.15

With the digital camera 1, the direction along the second optical axis A2 is substantially the same as the horizontal direction, when an image is captured so that the vertical top and bottom of the object coincides the top and bottom in the short side direction of the object image to be captured. Therefore, with the digital camera 1, it becomes possible to capture an image with coinciding the longitudinal direction of the digital camera 1 with the horizontal direction, under the normal imaging state where capturing an image so that the top and bottom vertical direction of the object coincide with the top and bottom in the short side direction of the object image to be captured. In addition, compared to a digital camera in which image is captured with coinciding the short side direction of the digital camera with the horizontal direction under the normal imaging state, it is possible to make the sizes in the vertical direction under normal imaging state smaller.

5.16

In the digital camera 1, the direction along the second optical axis A2 is substantially parallel to the long side direction of the image display portion 18. The long side direction of the image display portion 18 is substantially parallel to the longitudinal direction of the outer case 11. Therefore, under the normal imaging state in which image is captured with substantially coinciding the long side direction of the image display portion 18 with the horizontal direction, it becomes possible to capture an image with substantially coinciding the longitudinal direction of the outer case 11 with the horizontal direction. In addition, compared to a digital camera in which the direction along the second optical axis A2 is substantially parallel to the short side direction of the image display portion 18, it becomes possible to make the sizes in the short side direction of the image display portion 18 smaller.

5.17

In the digital camera 1, a grip portion 12 is formed on the X axis direction positive side. Therefore, it becomes possible to secure the X axis direction distance between the grip portion 12 and the first group frame unit 41 disposed on the X axis direction negative side of the digital camera 1. Therefore, it is possible to prevent a finger from getting in the way in the first lens group G1 when capturing an image.

5.18

In the digital camera 1, the first group frame unit 41 protrudes out on the object side (Y axis direction positive side) from the outer case 11, when capturing an image. It becomes possible to prevent a finger from getting in the way in the first lens group G1 when capturing an image.

5.19

The image blur correction mechanism 61 is included in the digital camera 1. Therefore, it becomes possible to capture the image with a higher quality.

5.20

The Z axis direction width (Wz) of the imaging device 2 is formed larger than the Y axis direction width (Wy). Therefore, it is possible to form the thickness of the digital camera 1 in the direction along the first optical axis A1 thin.

6: Other Matter

Although the embodiment of the present invention is described above, the present invention is not limited to the above described embodiment, and various modifications are possible without exceeding the gist of the invention.

6.1

The digital camera 1 and the outside and the configuration of the main body 3 described with reference to FIGS. 1 to 3 in the above described embodiment are not limited to those described.

For example, members having the digital camera 1 and the arrangements thereof are not limited to those described above.

Figure 30A:
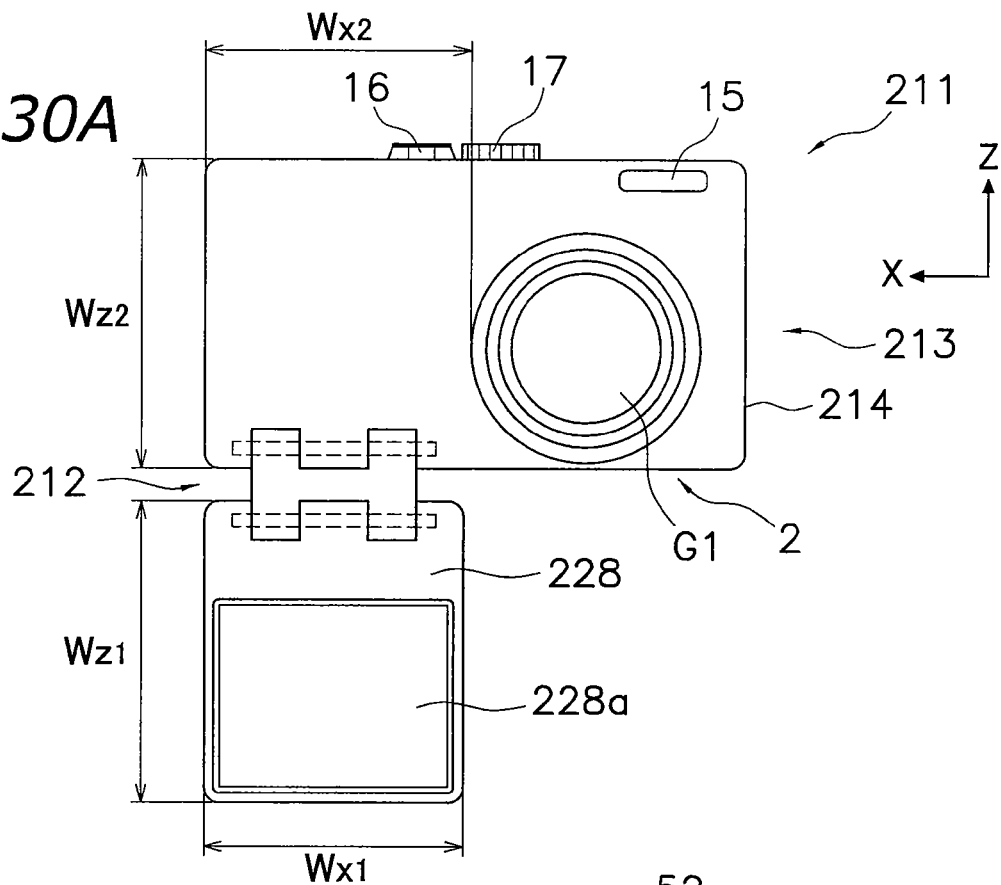
FIGS. 30A to 30C are elevation views and a perspective plan showing the outside and the configuration of the digital camera as a modification.
Figure 30B:
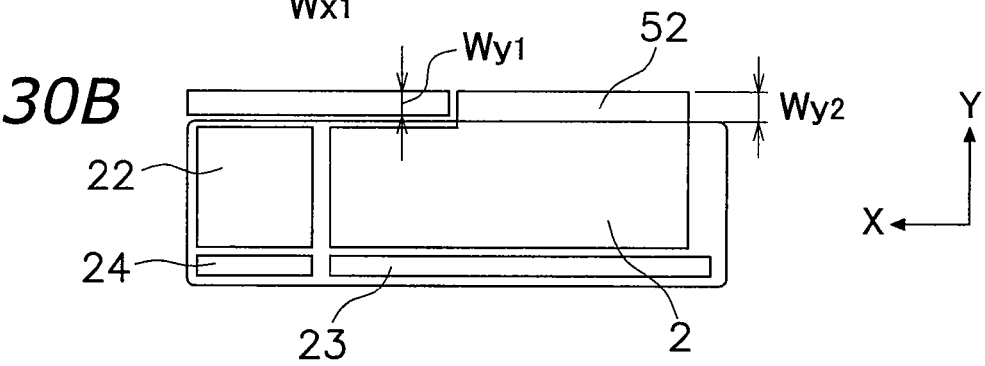
Figure 30C:
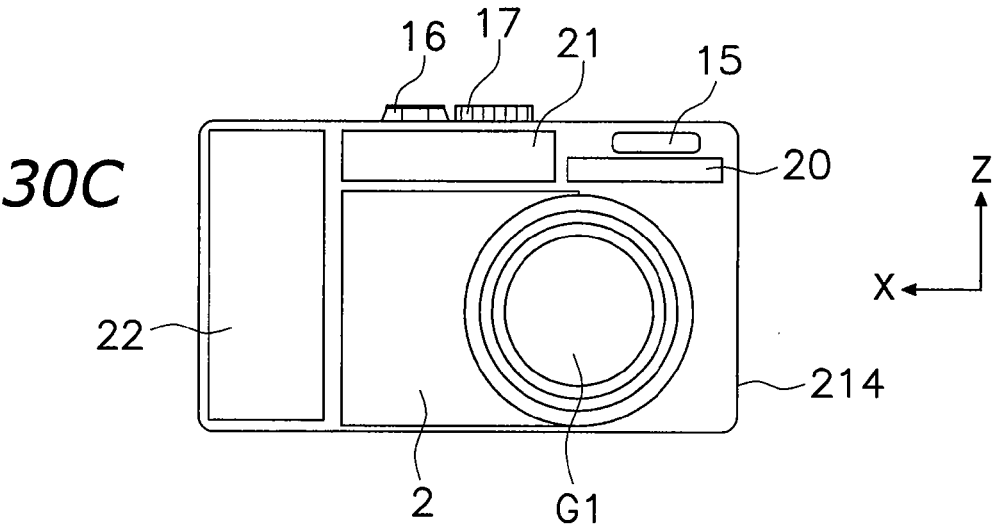

Furthermore, for example, the outside and the configuration of the digital camera may be those shown in FIGS. 30A to 30C. In addition, in FIGS. 30A to 30C, the parts same as each of the parts described with reference to FIGS. 1 to 3 are given the same numerals, and descriptions thereof are omitted.

FIG. 30A shows the outside of a digital camera 211 on the Y axis direction positive side. The digital camera 211 includes the above described imaging device 2, a main body 213 having an outer case 214 having an outside in a rectangular parallelepiped shape, and an image display portion 228 coupled to the outer case 214 via a coupling mechanism 212.

The image display portion 228 is attached to be rotatable around an axis extending in the X axis direction, via the coupling mechanism 212, and can be folded to the Y axis direction positive side and the Y axis direction negative side of the outer case 214. In addition, in the state where folded to the Y axis direction negative side of the outer case 214, on the surface of the image display portion 228 facing the Y axis direction negative side, a liquid crystal portion 228*a* is disposed for displaying an image. In other words, in the state where folded to the Y axis direction positive side, the liquid crystal portion 228*a* is disposed on the surface of the image display portion 228 facing the Y axis direction positive side. Therefore, when not using the digital camera 211, it is possible to fold the image display portion 228 to the Y axis direction negative side of the outer case 214, and it is possible to protect the liquid crystal portion 228*a* when not using the digital camera 211. In addition, when using the digital camera 211, it is possible to fold the image display portion 228 to the Y axis direction positive side of the outer case 214, and in this state, it is possible to view the image to be captured via the liquid crystal portion 228*a* facing the Y axis direction positive side.

The Z axis direction size Wz1 of the image display portion 228 is substantially the same as the Z axis direction size Wz2 of the outer case 214, and the X axis direction size Wx1 is substantially the same as the X axis direction size Wx2, which is from the end portion of the imaging device 2 on the X axis direction positive side protruding out to the Y axis direction positive side from the outer case 214 to the end portion of the outer case 214 on the X axis direction positive side. Therefore, if the image display portion 228 is folded to the Y axis direction positive side of the outer case 214, the image display portion 228 does not protrude out in the X axis direction and the Z axis direction of the outer case 214.

FIG. 30B shows the state where the image display portion 228 is folded to the Y axis direction positive side of the outer case 214, and it is a perspective plan showing a member disposed on the X axis direction negative side inside the outer case 214.

As shown in FIG. 30B, the Y axis direction size Wy1 of the image display portion 228 is substantially the same as the Y axis direction size Wy2 of the stationary frame 52 of the imaging device 2 protruding out from the outer case 214. Therefore, in the state where the image display portion 228 is folded to the Y axis direction positive side of the outer case 214, the Y axis direction positions of the end portion of the stationary frame 52 on the Y axis direction positive side and the surface of the image display portion 228 on the Y axis direction positive side substantially coincide. In addition, as well as shown in FIG. 3(*b*), the main substrate 23, the battery 22, and the memory card 24 are disposed inside the outer case 214, the imaging device 2.

FIG. 30(*c*) is a perspective plan showing a member disposed on the Y axis direction positive side inside the outer case 214. As well as shown in FIG. 3(*a*), the flash lamp 15, the main condenser 20, the sub-substrate 21, the imaging device 2, and the battery 22 are disposed in the outer case 214.

6.2

The configuration of the optical system 35 is not limited to the configuration described. For example, each of the lens groups G1 to G5 may be formed by combining other lenses.

6.3

The configuration of the first group frame unit 41 is not limited to the configuration described. For example, cam pins and cam grooves formed on each of the first group frame 50, driving frame 51, and stationary frame 52 may be formed with other configurations, as long as the same function is achieved.

6.4

The configuration of the second group frame unit 42 is not limited to the configuration described. For example, the second group frame 150 may have another configuration, as long as the second lens group G2 can be retained.

6.5

6.5.1: Summary

The configuration of the third group movement mechanism 57 and members in proximity thereof are not limited to the configuration described. For example, it may be a configuration to be described with reference to FIGS. 31 to 37.

Figure 31:
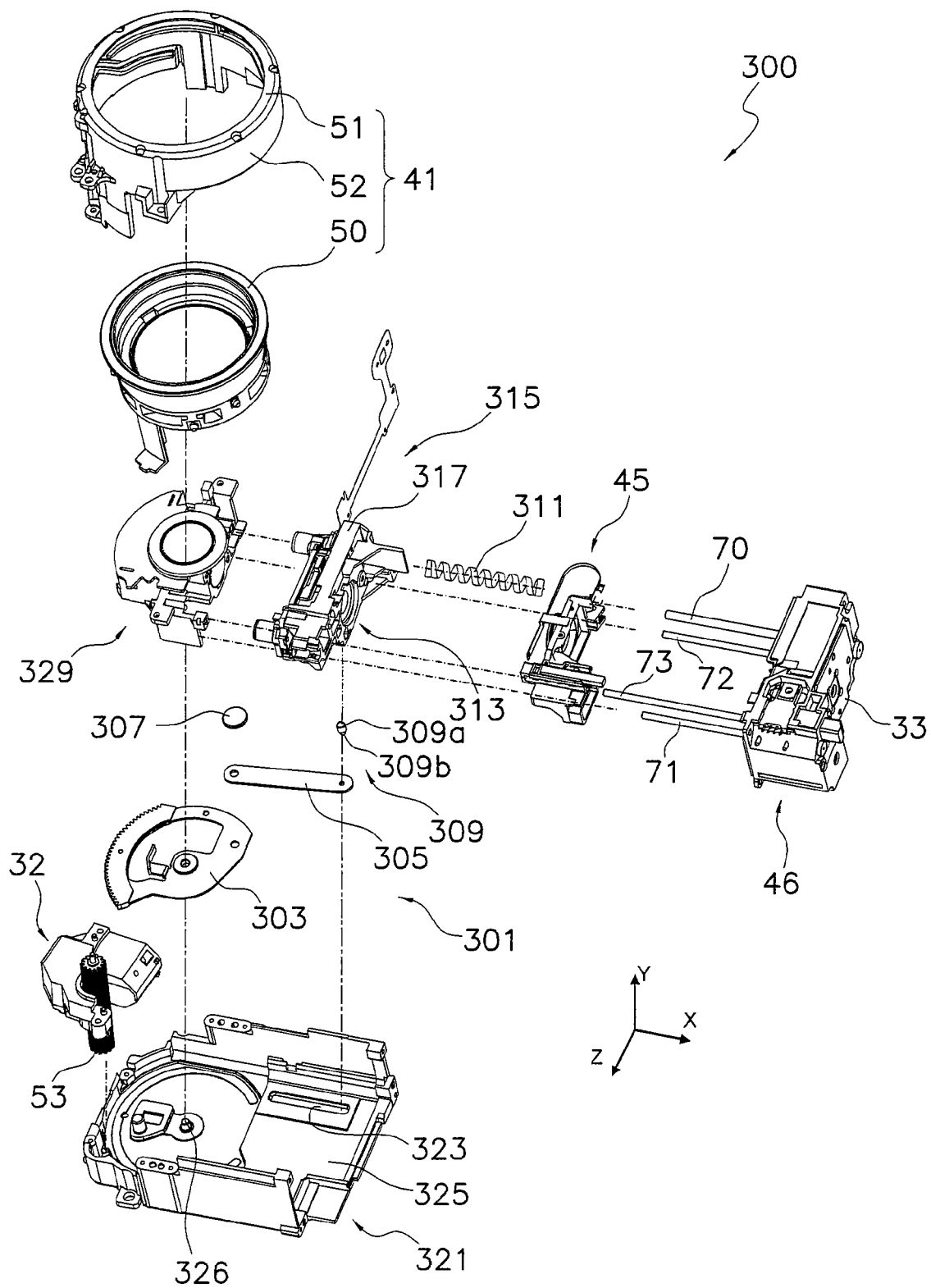
FIG. 31 is an exploded perspective view of the lens barrel as a modified embodiment.

More specifically, the third group movement mechanism 301 shown in FIG. 31 includes a link 305 coupled to a ring gear 303 to be rotatable, and link pin 309 provided on the link 305 is characterized in that it is configured to engage with a third group frame 317 of the third group frame unit 315. In addition, in the lens barrel 300 shown in FIG. 31, an elastic member 311 such as a spring is disposed between the third group frame unit 315 and the master flange unit 46, and the elastic member 311 is characterized in that it biases the third group frame unit 315 to a direction away from the master flange unit 46.

Detailed descriptions on these characteristics will be added with reference to FIGS. 31 to 37 below. In addition, below, members with the same functions as those described in the above embodiment will be given the same names, and the descriptions on the same configurations will be omitted, while descriptions on differed configurations will be added.

6.5.2: Configuration

The third group movement mechanism 301 shown in FIG. 31 mainly includes a ring gear 303, a link 305, a gear pin 307, and a link pin 309. The ring gear 303 is a member transmitting the rotational drive transmitted from the motor unit 32 via the driving gear 53, and is a member in a plate shape formed with teeth on the outer periphery in circular shape to mesh with the driving gear 53. The link 305 is a member in oval shape, and one end thereof is coupled to be rotatable to the ring gear 303 via the link pin 309. The gear pin 309 is fixed to the other end of the link 305, and includes a head portion 309a protruding out on the Y axis direction positive side, and a leg portion 309b penetrating the link 305.

In the rear side 325 of the base 321, a link groove 323 extending in the X axis direction is formed. In the link groove 323, the leg portion 309b of the link pin 309 protruding out to the Y axis direction negative side of the link 305 is accommodated.

In the side face of the third group frame 317 on the Y axis direction negative side, a fitting opening 313 extending towards the Y axis direction positive side is formed. The head portion 309a of the link pin 309 is inserted from the Y axis direction negative side into the fitting opening 313, and fits therein to be rotatable.

On the third group frame 317, the third group guide poles 70 and 71 which extend in the X axis direction and fixed to the master flange unit 46 are inserted. Therefore, the operation of the third group frame 317 is restricted in the direction along the third group guide poles 70 and 71, that is, in the X axis direction.

According to the above configuration, when the ring gear 303 is driven via the driving gear 53, the drive is transmitted to the third group frame 317 via the link 305 and the link pin 309. The operation of the third group frame 317 is restricted by the guide poles 70 and 71. Thus, the third group frame 317 is driven in the X axis direction by the drive transmitted to the third group frame 317.

The elastic member 311 such as a spring or the like is disposed between the third group frame unit 315 and the master flange unit 46. More specifically, the third group guide pole 70 fixed to the master flange unit 46 is inserted in the elastic member 311, and furthermore, the third group guide pole 70 is inserted in the third group frame unit 315. Therefore, the third group frame unit 315 is biased to the direction away from the master flange unit 46, or to the X axis direction negative side. On the other hand, the X axis direction position of the third group frame unit 315 is restricted by the link pin 309, and the biasing force of the elastic member 311 acts to press the link pin 309 to the X axis direction negative side. As a result, shaking of the third group frame unit 315 in the X axis direction is suppressed.

6.5.3: Assembling Method

The assembling method (manufacturing method) of the lens barrel 300 (refer to FIG. 31) will be described with reference to FIGS. 32 to 35.

Figure 32:
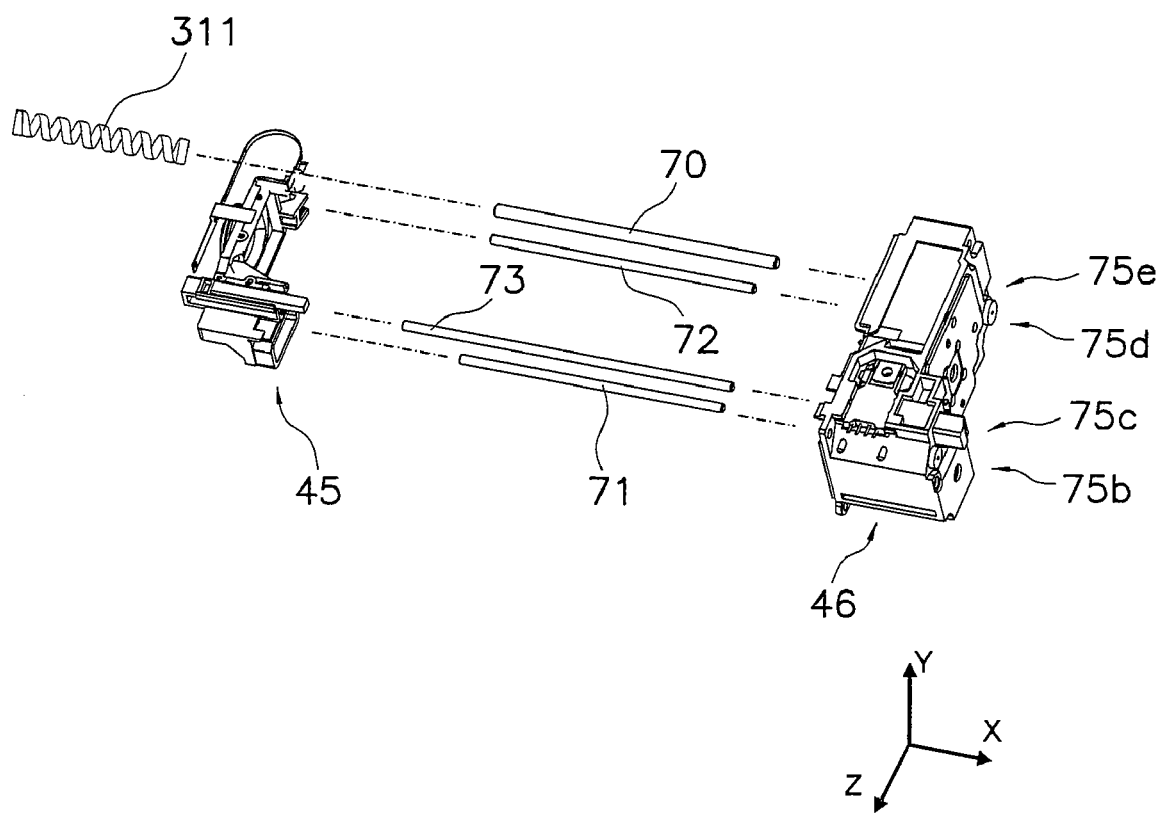
FIG. 32 is an exploded perspective view for describing the assembly of the lens barrel.

FIG. 32 is a drawing for describing the assembling of the master flange unit 46, the third group guide poles 70 and 71 and the fourth group guide poles 72 and 73, the fourth group frame unit 45, and the elastic member 311. As shown in FIG. 32, each of the guide poles 70 to 73 is press fitted and fixed to the guide pole support portions 75b to 75d provided on the master flange unit 46. Furthermore, the fourth group guide poles 72 and 73 are inserted into the fourth group frame unit 45. In addition, the third group guide pole 70 is inserted into the coil shape elastic member 311. In addition, the fourth group frame unit 45 is formed not to interfere with the elastic member 311.

Figure 33:
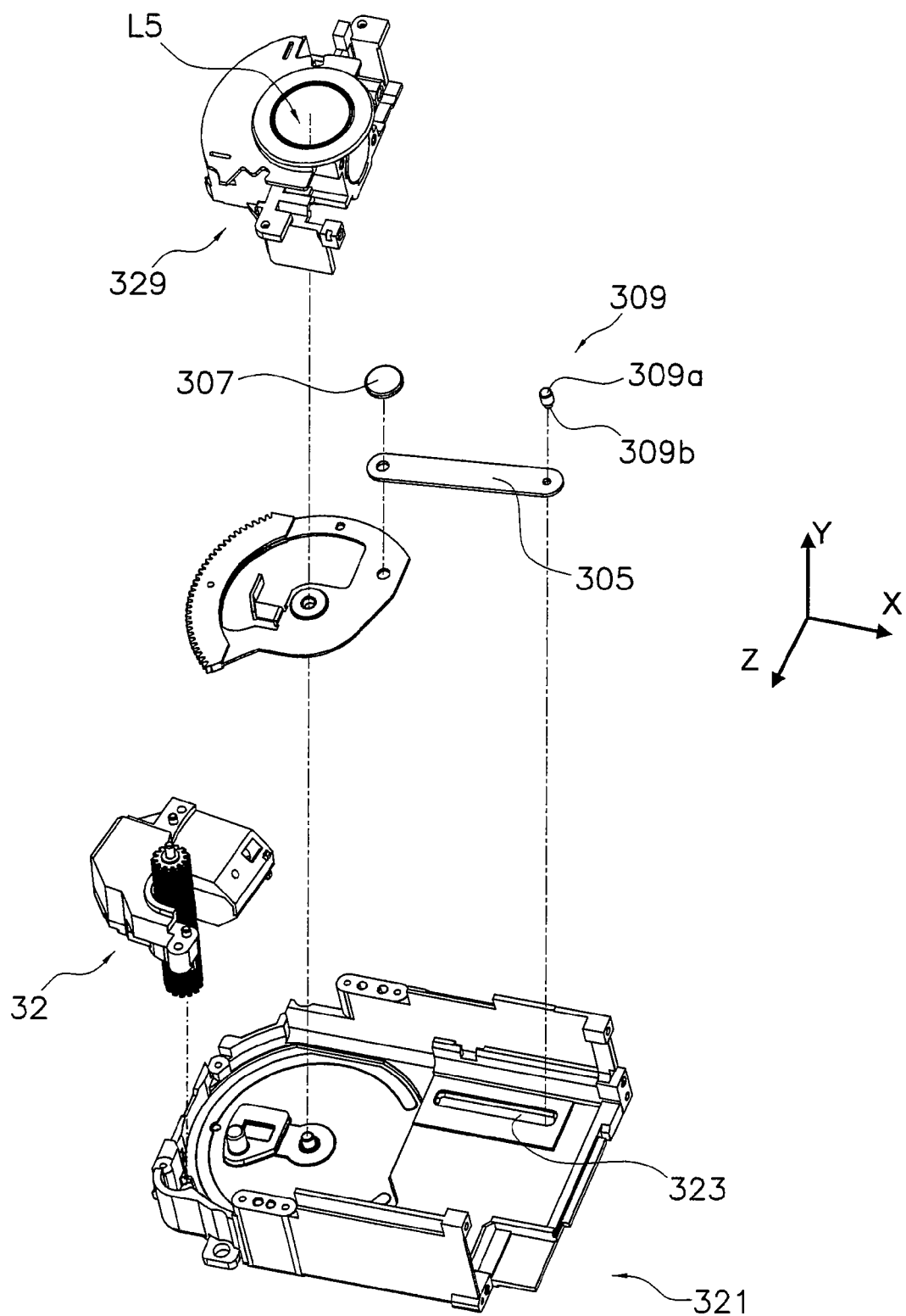
FIG. 33 is an exploded perspective view for describing the assembly of the lens barrel.

Next, as shown in FIG. 33, the ring gear 303, link 305, gear pin 307, and link pin 309 are disposed on the base 321.

In this case, the ring gear 303 and the link 305 may be coupled by the gear pin 307 in advance, or they may be coupled by the gear pin 307 after being disposed separately. In addition, the leg portion of the gear pin 307 penetrates the link 305, and the gear pin 307 is attached to be fixed to the ring gear 303. Therefore, the link 305 is fixed to be rotatable with respect to the ring gear 303.

In addition, when the link pin 309 is arranged, the link pin 309 may be fixed to the link 305 in advance, or may be fixed after the link 305 is attached to the ring gear 303. In addition, the link pin 309 is disposed on the base 321 so that the leg portion 309b of the link pin 309 is accommodated in the link groove 323.

Furthermore, the motor unit 32, the second group frame unit 329, and the first group frame unit 41 (refer to FIG. 31) are attached to the base 321 from the Y axis direction positive side. In this case, the first group frame unit 41 is fixed to the second group frame unit 329 retaining the prism L5.

Figure 34:
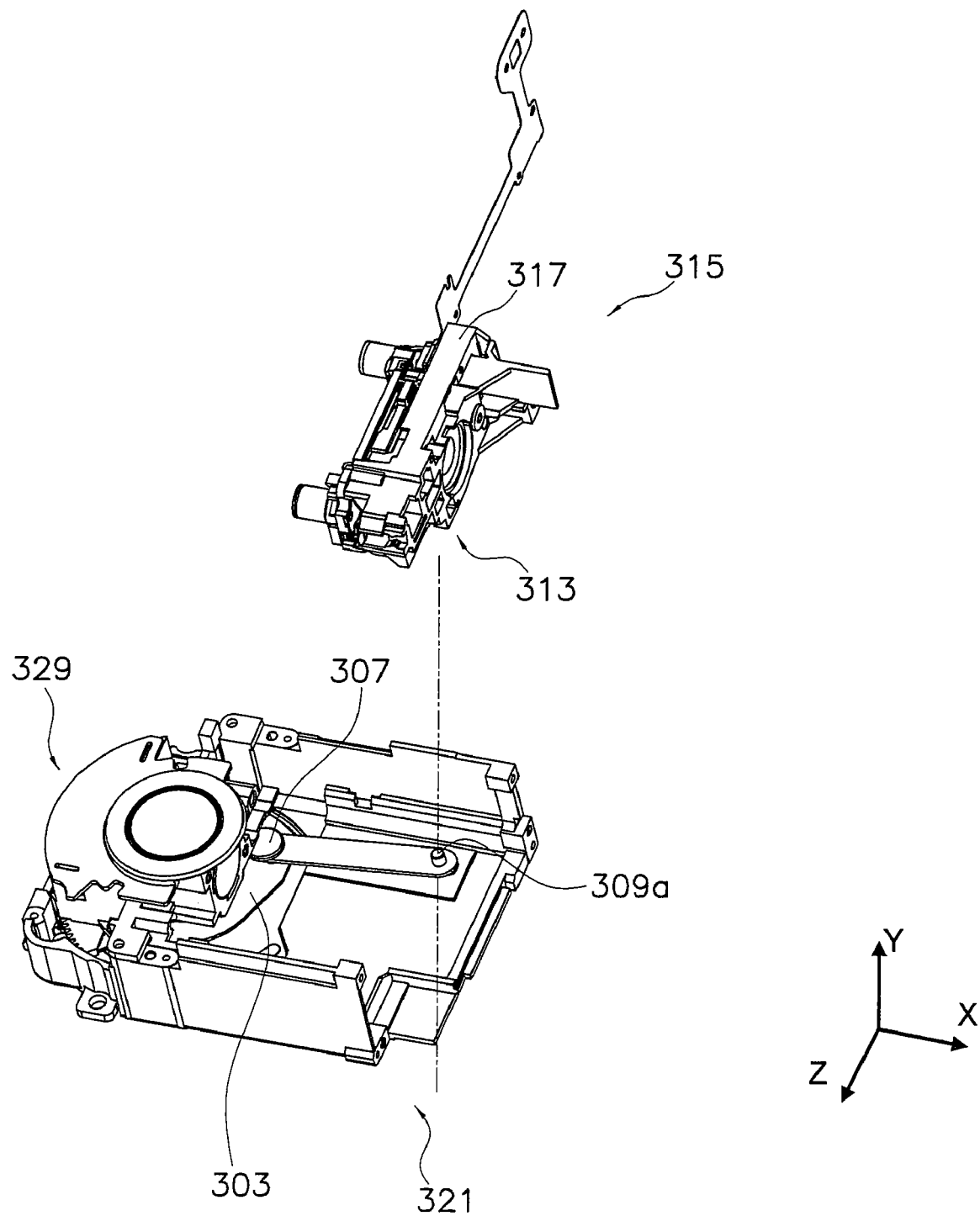
FIG. 34 is an exploded perspective view for describing the assembly of the lens barrel.

Next, as shown in FIG. 34, the third group frame unit 315 is attached to the base 321 from the Y axis direction positive side. In this case, it is attached so that the head portion 309a of the link pin 309 fits in the fitting opening 313 formed on the third group frame 317.

Figure 35:
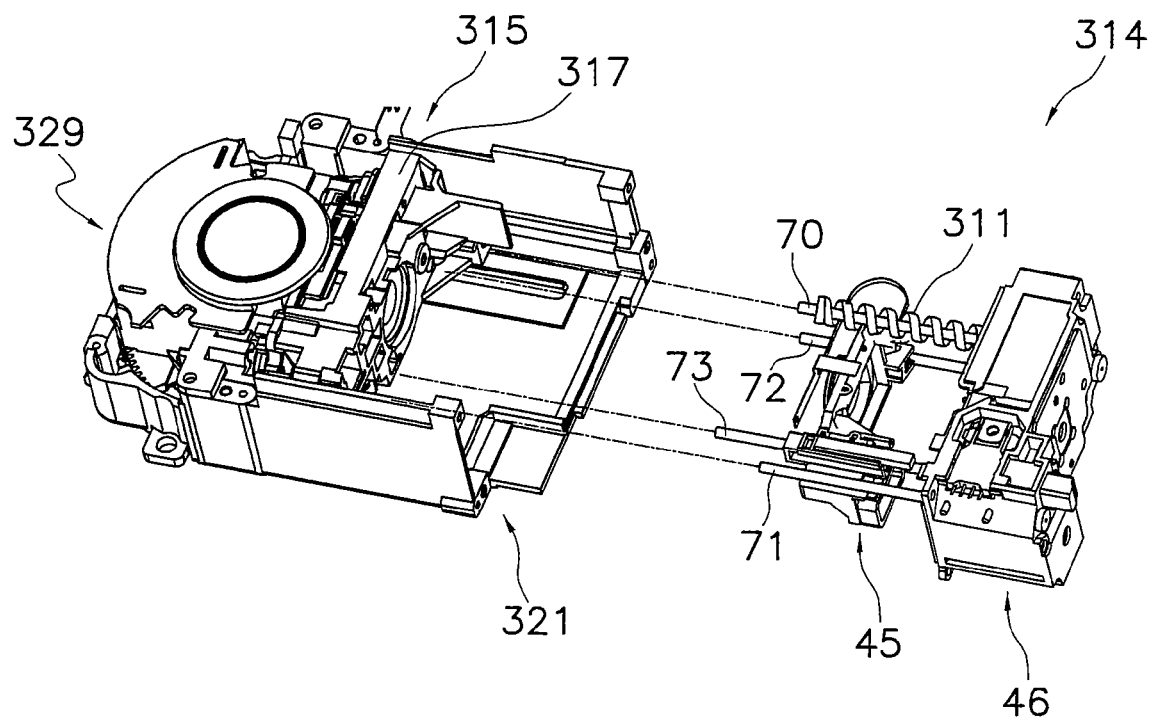
FIG. 35 is an exploded perspective view for describing the assembly of the lens barrel.
Figure 35:
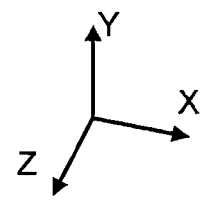

Next, as shown in FIG. 35, the master flange unit 46 described with reference to FIG. 32, the guide poles 70 to 73, the fourth group frame unit 45, and the assembly body 314 of the elastic member 311 are attached on the base 321. This assembly body 314 is attached on the base 321 from the direction perpendicular to the direction in which the third group frame unit 315 is attached, that is, from the X axis direction positive side.

When the assembly body 314 is attached, the third group guide poles 70 and 71 are inserted into a bearing portion which has opening formed on the third group frame 317 in the X axis direction. Furthermore, the end portions of the third group guide poles 70, 71, the fourth group guide poles 72 and 73 on the X axis direction negative side are inserted into and fixed to a fixing portion which has opening formed on the second group frame unit 329 in the X axis direction.

Furthermore, when the third group guide poles 70 and 71 are inserted into the third group frame 317, the third group frame unit 315 is positioned on a plane perpendicular to the X axis. More specifically, the position of the bearing portion of the third group frame 317 needs to be kept in a position corresponding to the third group guide poles 70 and 71. With regard to this, the third group frame unit 315 may be positioned by chucking. In addition, assembling may be realized with process in which a plurality of insertion openings for pins used for positioning are provided on the base 321, process in which the third group frame unit 315 is positioned at a predetermined position by the pins used for positioning which are inserted from the insertion openings, and process in which the pins are removed after inserting the third group guide poles 70 and 71.

Furthermore, as shown in FIG. 35, when inserting the third group guide poles 70 and 71 into the third group frame 317, it is preferable that the third group frame unit 315 is located near the side of the second group frame unit 329. By doing so, when attaching the assembly body 314, for example, the third group guide poles 70, 71 and the elastic member 311 press the third group frame unit 315 to the X axis direction negative side (second group frame unit 329 side), it is possible to prevent the third group frame unit 315 from crashing to the side of the second group frame unit 329.

In addition, in FIGS. 34 and 35, the motor unit 32 is omitted.

Note that, attaching the motor unit 32 and the first group frame unit 41 (refer to FIG. 31) described with reference to FIG. 33 is not limited to that described above. More specifically, first, as shown in FIG. 33, after the ring gear 303, the link 305, the gear pin 307, and the link pin 309 are disposed on the base 321, the second group frame unit 329 is attached from the Y axis direction positive side. Next, as shown in FIGS. 34 and 35, the third group frame unit 315 and the assembly body 314 are attached. Lastly, the motor unit 32 and the first group frame unit 41 are attached.

When attaching the first group frame unit 41, the first group frame unit 41 may be attached to the second group frame unit 329 from the Y axis direction positive side, in the state where the two ends of the driving gear 53 are supported by the stationary frame 52. In addition, the first group frame unit 41 may be directly attached to the base 321 instead of the second group frame unit 329.

In addition, the motor unit 32 may be attached to mesh with the driving gear 53 from the X axis direction negative side of the lens barrel 300, after the assembly of the lens barrel 300.

6.5.4: Operation

The operation of the third group movement mechanism 301 will be described with reference to FIGS. 36 and 37.

Figure 36:
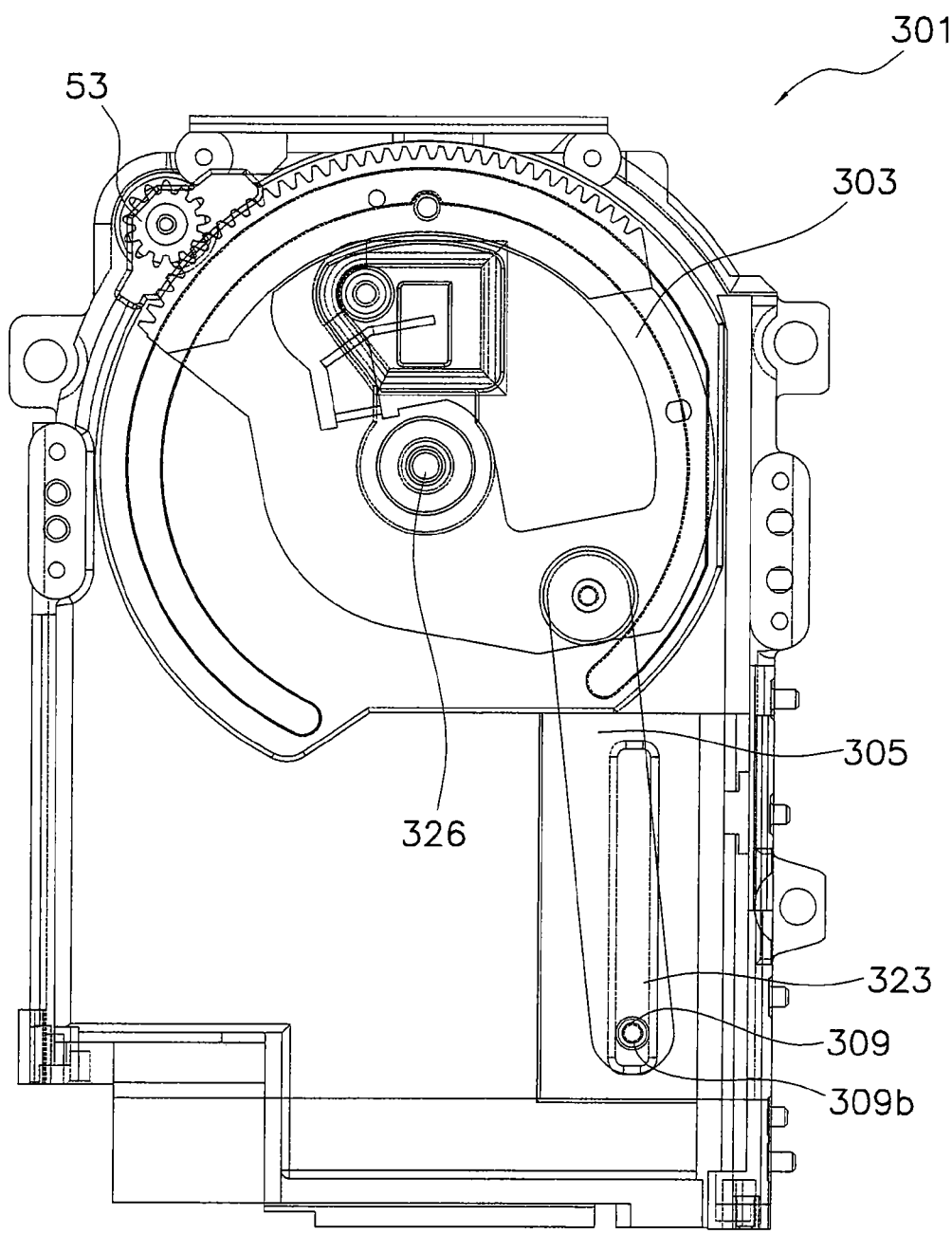
FIG. 36 is an illustration for describing the operation of the third group movement mechanism (wide angle side)

FIG. 36 shows the arrangement of the third group movement mechanism 301 when the optical system is located on the wide angle side (Wide position). FIG. 37 shows the arrangement of the third group movement mechanism 301 when the optical system is located on the telephoto side (Tele position).

In the case that the third group movement mechanism 301 is in the state shown in FIG. 36, when the driving gear 53 is driven to rotate in the clockwise direction when viewed from the Y axis direction positive side via the motor unit 32 (not shown in the figure), the ring gear 303 meshing with the driving gear 53 is driven to rotate in the counterclockwise direction around the ring gear shaft 326. As a result, in the ring gear 303, the link 305 fixed on the Z axis direction negative side of the ring gear shaft 326 is driven to the X axis direction negative side. The link pin 309 fixed to the link 305 is inserted to be rotatable in the fitting opening 313 (refer to FIG. 31) of the third group frame unit 315 guided to the X axis direction by the guide poles 70 and 71. Thus, when the link 305 is driven to the X axis direction negative side, the link pin 309 and the third group frame unit 315 move linearly along the X axis direction.

Figure 37:
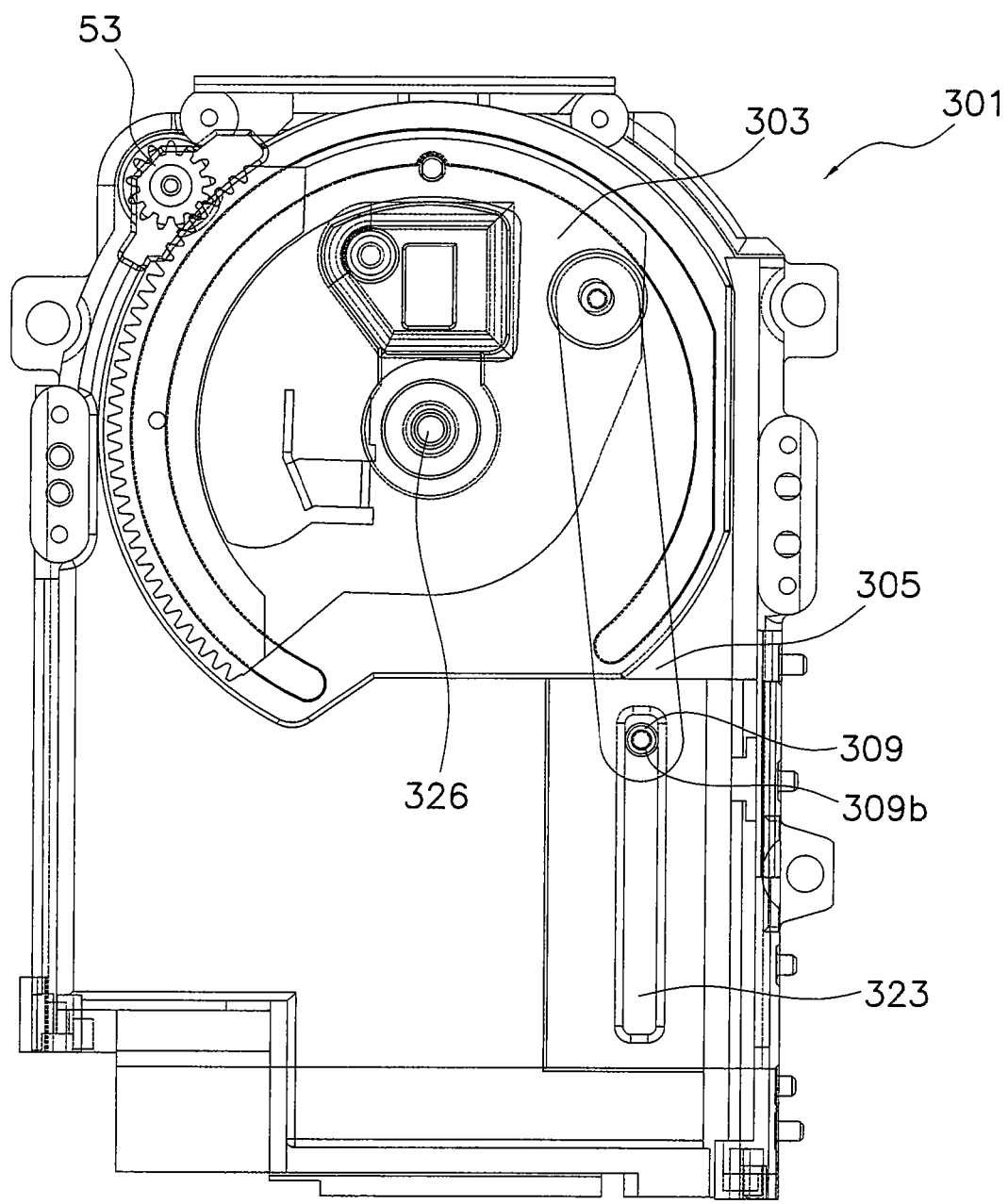
FIG. 37 is an illustration for describing the operation of the third group movement mechanism (telephoto side).

By doing so, the third group movement mechanism 301 moves as shown in FIG. 37.

6.5.4: Effects (1)

The third group movement mechanism 301 includes the link 305 coupled to the ring gear 303 to be rotatable, and the link pin 309 provided on the link 305 engages with the third group frame 317 of the third group frame unit 315. The operation of the third group frame 317 is restricted in the X axis direction.

When the third group movement mechanism 301 operates, the link pin 309 forms a turning pair with the fitting opening 313 of the third group frame 317. In the third group movement mechanism 57 (refer to FIG. 11) shown in the above described embodiment, compared to the area in contact when the base 55 and the rod unit 182 slide against each other, the area in contact between the link pin 309 in the third group movement mechanism 301 and the fitting opening 313 is smaller. Thus, it is possible to reduce the sliding load. As a result, it is possible to effectively transmit the driving force from the motor unit 32 to the third group frame unit 315. In addition, it is possible to configure the third group frame movement mechanism 301 even more simply and further miniaturize the lens barrel 300.

(2)

The elastic member 311 is disposed between the third group frame 317 and the master flange unit 46. The elastic member 311 biases the third group frame unit 315 in the direction (X axis direction negative side) away from the master flange unit 46. On the other hand, the X axis direction position of the third group frame unit 315 is also restricted by the link pin 309 engaging with the third group frame 317. Therefore, for example, even if an error occurs in the sizes or the like between the fitting opening 313 formed on the third group frame 317 and the link pin 309, the position of the third group frame unit 315 is reliably restricted by the position of the end portion of the link pin 309 on the X axis direction positive side. Therefore, when driving third group frame unit 315, or when carrying the digital camera having the lens barrel 300, it is possible to suppress the shaking of the third group frame unit 315.

In addition, it is possible to obtain the same effects with a simpler configuration compared to the third group movement mechanism 57, and the assembly becomes easy, and it is possible to reduce the cost.

(3)

In the assembly of the lens barrel 300, the third group movement mechanism 301, the third group frame unit 315 or the like are attached to the base 321 from the Y axis direction positive side. Furthermore, the master flange unit 46, on which the guide poles 70 to 73 are fixed, is attached to the base 321 from the X axis direction positive side perpendicular to the Y axis direction.

An assembly process different from the present invention, for example, in the case of adopting a process in which the third group frame unit 315 is assembled to the master flange unit 46, the guide poles 70 to 73 and the assembly body of the fourth group frame unit 45, and then this assembly body is disposed from the X axis direction positive side on the base 321, the third group frame unit 315 and the link pin 309 interfere with each other and the assembly is not possible. In addition, a coupling mechanism can be designed for the link 305 and the third group frame unit 315 in order for the assembly of this assembly body to be possible from the X axis direction positive side. However, since this kind of mechanism is complicated, the assembly becomes difficult, and the mechanism increases cost and makes sizes thereof larger.

Consequently, like the present invention, by attaching the third group frame unit 315 guided by the guide poles 70 and 71 with a different process from a direction different from attaching the guide poles 70 and 71, the attaching process in which the third group frame unit 315 is attached to the link pin 309 is especially easy, and it is possible to improve the way of assembling of the lens barrel 300. In addition, since the mechanism for coupling the link 305 and the third group frame unit 315 can be realized with a simple configuration, it is possible to miniaturize the lens barrel 300.

(4)

In the lens barrel 300, the first group frame unit 41 is assembled based on the second group frame unit 329. More specifically, the first group frame unit 41 is fixed on the upper side of the second group frame unit 329 in the Y axis direction. In addition, the third group frame unit 315, the fourth group frame unit 45, and the master flange unit 46 are also assembled based on the second group frame unit 329. More specifically, the master flange unit 46, the third group frame unit 315, and the fourth group frame unit 45 are attached to each of the guide poles 70 to 73, and each of the guide poles 70 to 73 is fixed to the second group frame unit 329.

Generally, in an imaging device, each of the lenses is needed to be assembled so that the position and the inclination thereof are highly accurate with respect to imaging unit such as a CCD. In a conventional bending optical system, lenses closer to the object than the bending unit such as a prism are assembled integrally with the bending unit. Therefore, conventional devices are assembled so that the relative positional accuracy between the imaging unit and the unit integrally including the lenses and the bending unit is ensured.

On the other hand, in the present invention, since the first lens group G1 closer to the object than the prism L5 moves in the first optical axis A1 direction, the lenses and the bending unit are difficult to be positioned as a unit with respect to the imaging unit like the conventional devices.

However, according to the present invention, since the optical system is disposed on the incoming side and the outgoing side of the second group frame unit 329 based on the second group frame unit 329 retaining the prism L5, it is possible to assemble the overall optical system with high precision.

6.5.5: Other Matter (1)

In the lens barrel 300, it has been described that the elastic member 311 is disposed between the third group frame unit 315 and the master flange unit 46. However, the elastic member 311 may be disposed between the third group frame unit 315 and the second group frame unit 329.

(2)

The leg portion 309b of the link pin 309 may engage with the link groove 323 and slide linearly. In this case, the operation of the link pin 309 is restricted by the link groove 323 extending in the X axis direction, and this allows the operation of the third group frame unit 315 in the X axis direction to be restricted. In addition, although the link groove 323 accommodates the leg portion 309b of the link pin 309 in the above described embodiment, when the leg portion 309b does not protrude out to the Y axis direction negative side of the link 305, the link groove 323 does not have to be formed.

(3)

In the lens barrel 300, it has been described that the link pin 309 is fixed to the third group movement mechanism 301, and on the third group frame 317, the fitting opening 313 in which the link pin 309 fits is formed. However, the configuration is not limited to this kind of configuration, and it may be a configuration such that a protrusion portion extending to the Y axis direction negative side is formed on the third group frame 317, and this protrusion portion fits in the fitting opening formed on the link 305.

INDUSTRIAL APPLICABILITY

In the present invention, it is possible to provide an imaging device and a camera having simultaneously a high magnification zoom lens system and with the device thereof miniaturized. Therefore, the imaging device and the camera of the present invention are useful in fields which require the simultaneous realization of both a high magnification zoom lens system and the miniaturization of the device.

The invention claimed is:

1. An imaging device comprising:
a first lens group arranged to receive a light flux incident in a first direction along a first optical axis;
a bending unit arranged to reflect the light flux incident in the first direction to a second direction along a second optical axis intersecting with the first optical axis;
a first movement mechanism retaining the first lens group and arranged to move the first lens group with respect to the bending unit in the first direction;
a driving unit configured to drive the first movement mechanism;
a second lens group arranged to receive the light flux reflected by the bending unit; and
an imaging unit arranged to receive the light flux passing through the second lens group, the distance between the imaging unit and the bending unit being constant,
the first movement mechanism including
a first movement body movable with respect to the bending unit in the first direction and
a second movement body retaining the first lens group and being movable with respect to the first movement body in the first direction.

2. The imaging device according to claim 1, wherein the first lens group and the second lens group are included in a zoom lens system with variable imaging magnification in the imaging unit by changing relative positions with respect to the imaging unit on the pathway of the light flux.

3. The imaging device according to claim 1, wherein the first movement body is arranged to move with respect to the bending unit in the first direction by being driven to rotate around the first optical axis via the driving unit, and supporting the second movement body to be movable with respect to the first movement body in the first direction.

4. The imaging device according to claim 1, wherein the first movement mechanism further includes a fixing member coupled to the bending unit and supporting the first movement body to be movable in the first direction with respect to the bending unit.

5. The imaging device according to claim 4, wherein the fixing member includes a first cam groove arranged to guide the first movement body in the first direction with respect to the bending unit, and a straight-movement groove extending in the first direction,
the first movement body includes a first engagement portion engaging with the first cam groove, and a second cam groove arranged to guide the second movement body in the first direction with respect to the bending unit, and
the second movement body includes a second engagement portion engaging with the second cam groove, and a third engagement portion engaging with the straight-movement groove.

6. The imaging device according to claim 4, wherein the fixing member includes a cut-out portion disposed on the second lens group side and being cut out not to interfere with a movement portion integrally movable in the second direction with the second lens group.

7. The imaging device according to claim 1, further comprising
a second movement mechanism supporting the second lens group to be movable with respect to the bending unit in the second direction,
wherein the driving unit is arranged to drive the first movement mechanism and the second movement mechanism.

8. The imaging device according to claim 7, wherein the second movement mechanism includes a third movement body retaining the second lens group and being movable in the second direction, and a conversion mechanism arranged to convert a rotational driving power transmitted from the driving unit to a driving power to move the third movement body in the second direction with respect to the bending unit.

9. The imaging device according to claim 8, wherein the second movement mechanism further includes an elastic coupling mechanism arranged to elastically couple the conversion mechanism to the third movement body, and when the third movement body is located in proximity to a first end of a movable range along the second optical axis, the elastic coupling mechanism elastically presses the third movement body towards the first end.

10. The imaging device according to claim 9, wherein when the third movement body is located in proximity to a second end of the movable range along the second optical axis, the elastic coupling mechanism elastically presses the third movement body towards the second end.

11. The imaging device according to claim 9, wherein when the third movement body is located on the first end side, the first lens group is located at a position nearest to the bending unit, within the movable range along the first optical axis.

12. The imaging device according to claim 9, wherein when the third movement body is located on the first end side, the first lens group is located at a position farthest from the bending unit, within the movable range along the first optical axis.

13. The imaging device according to claim 8, further comprising an elastic member disposed between the third movement body and either the bending unit or the imaging unit, and biasing the third movement body in the second optical axis direction with respect to the bending unit or the imaging unit.

14. The imaging device according to claim 1, further comprising a guiding unit substantially fixed to the bending unit, and arranged to guide the second lens group in the second direction.

15. The imaging device according to claim 1, wherein at least a portion of the driving unit is disposed in a space on the opposite side from the second lens group across the bending unit.

16. The imaging device according to claim 1, further comprising an exposure-adjustment mechanism arranged to adjust exposure and disposed between the bending unit and the second lens group to be movable integrally with the second lens group, wherein the exposure-adjustment mechanism includes a main body, and two protruding portions separated in a direction perpendicular to the first optical axis and the second optical axis and protruding out from the main body to the side of the bending unit, and wherein a portion of the bending unit fits in between the two protruding portions when the main body of the exposure-adjustment mechanism is located at a position nearest to the bending unit.

17. The imaging device according to claim 1, wherein the bending unit includes a bending member having a reflecting surface arranged to reflect the light flux incident in the first direction to the second direction, a third lens group having at least one piece of a lens element located on the second optical axis, a retaining member retaining the bending member and the lens element, and an opening member having an opening disposed on the second optical axis, and fixed to the retaining member, wherein the third lens group is retained between the bending member and the opening member in the second direction.

18. A camera, comprising:

an imaging device according to claim 1;

a visual unit configured to display an image to be captured by the imaging device;

a control unit configured to control the imaging device; and a chassis accommodating the imaging device.

* * * * *